United States Patent
Ko et al.

(10) Patent No.: US 12,260,046 B2
(45) Date of Patent: Mar. 25, 2025

(54) DRIVING CIRCUIT, DISPLAY DEVICE INCLUDING THE SAME, AND ELECTRONIC DEVICE INCLUDING DISPLAY DEVICE

(71) Applicant: Samsung Display Co., LTD., Yongin-si (KR)

(72) Inventors: Jun Young Ko, Yongin-si (KR); Tae Hyeon Yang, Yongin-si (KR); Han Su Cho, Yongin-si (KR); Tae Joon Kim, Yongin-si (KR); Hyun Wook Cho, Yongin-si (KR); Jae Woo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/341,729

(22) Filed: Jun. 26, 2023

(65) Prior Publication Data
US 2024/0143114 A1 May 2, 2024

(30) Foreign Application Priority Data

Oct. 26, 2022 (KR) .................. 10-2022-0139660

(51) Int. Cl.
  *G06F 3/041* (2006.01)
  *G09G 3/3275* (2016.01)

(52) U.S. Cl.
  CPC ...... *G06F 3/04184* (2019.05); *G06F 3/04164* (2019.05); *G09G 3/3275* (2013.01); *G09G 2310/08* (2013.01); *G09G 2354/00* (2013.01)

(58) Field of Classification Search
  CPC ............ G06F 3/04184; G06F 3/04164; G09G 3/3275; G09G 2310/08; G09G 2354/00
  See application file for complete search history.

(56) References Cited

U.S. PATENT DOCUMENTS

| | | | |
|---|---|---|---|
| 9,104,267 B2 | 8/2015 | Choi et al. | |
| 9,926,896 B2 | 3/2018 | Nakashima et al. | |
| 10,430,918 B2 | 10/2019 | Kim et al. | |
| 11,592,939 B1* | 2/2023 | Kim | G09G 3/32 |
| 2007/0200843 A1* | 8/2007 | Bae | G09G 5/18 345/213 |
| 2013/0286302 A1* | 10/2013 | Fujioka | G02F 1/13338 349/12 |
| 2022/0326833 A1* | 10/2022 | Cho | G06F 3/0446 |
| 2022/0391069 A1* | 12/2022 | Cho | G06F 3/04164 |

FOREIGN PATENT DOCUMENTS

| | | |
|---|---|---|
| KR | 10-2014-0071050 A | 6/2014 |
| KR | 10-2022-0141365 A | 10/2022 |
| KR | 10-2022-0165886 A | 12/2022 |
| KR | 10-2023-0026593 A | 2/2023 |

* cited by examiner

*Primary Examiner* — Amare Mengistu
*Assistant Examiner* — Jennifer L Zubajlo
(74) *Attorney, Agent, or Firm* — Womble Bond Dickinson (US) LLP

(57) ABSTRACT

A driving circuit includes: a display driver to generate a horizontal synchronization signal and a vertical synchronization signal according to a first clock signal of a first oscillator; a sensor driver to generate a touch signal according to a second clock signal of a second oscillator; and a determination circuit to detect a cycle of at least one of the horizontal synchronization signal or the vertical synchronization signal according to the second clock signal, and output a detection signal when the cycle is out of a range. The determination circuit is a part of the display driver or the sensor driver.

23 Claims, 24 Drawing Sheets

DRIVING CIRCUIT, DISPLAY DEVICE INCLUDING THE SAME, AND ELECTRONIC DEVICE INCLUDING DISPLAY DEVICE

CROSS-REFERENCE TO RELATED APPLICATION

This application claims priority to and the benefit of Korean patent application number 10-2022-0139660, filed on Oct. 26, 2022, the entire disclosure of which is incorporated by reference herein.

BACKGROUND

1. Field of Invention

Aspects of embodiments of the present disclosure relate to a driving circuit, a display device including the driving circuit, and an electronic device including the display device.

2. Description of Related Art

With the development of information technology, the importance of a display device, which is a connection medium between a user and information, has been emphasized. Due to the importance of display devices, the use of various kinds of display devices, such as a liquid crystal display device and an organic light-emitting display device, has increased.

The display devices may include a display component configured to display an image, and a sensor component configured to sense a touch position. The display component may display an image in response to a driving signal. The sensor component may sense an external input in response to a touch signal.

The above information disclosed in this Background section is for enhancement of understanding of the background of the present disclosure, and therefore, it may contain information that does not constitute prior art.

SUMMARY

The frequency of the touch signal may be set not to interfere with the frequency of the driving signal. However, the frequency of the driving signal and/or the frequency of the touch signal may be changed by the temperature or the like, so that a harmonic may occur between the frequency of the driving signal and the frequency of the touch signal. If the harmonic occurs between the frequency of the driving signal and the frequency of the touch signal, jitter noise may increase, and a probability of an occurrence of a ghost touch or the like may increase.

Embodiments of the present disclosure are directed to a driving circuit capable of detecting a defect, a display device including the driving circuit, and an electronic device including the display device. According to one or more embodiments, the driving circuit may use a second clock signal of a second oscillator to count cycles of a vertical synchronization signal Vsync and a horizontal synchronization signal Hsync that are generated by a first clock signal of a first oscillator, and may detect a defect in response to a result of the count.

Embodiments of the present disclosure are directed to a driving circuit capable of preventing or substantially preventing a harmonic from occurring between a frequency of a driving signal and a frequency of a touch signal, a display device including the driving circuit, and an electronic device including the display device. According to one or more embodiments, the driving circuit may control the frequency of the first oscillator and/or the frequency of the second oscillator when cycles of the vertical synchronization signal and the horizontal synchronization signal are out of a range (e.g., a preset or predetermined range), and thus, may prevent or substantially prevent the harmonic from occurring between the frequency of the driving signal and the frequency of the touch signal.

According to one or more embodiments of the present disclosure, a driving circuit includes: a display driver configured to generate a horizontal synchronization signal and a vertical synchronization signal according to a first clock signal of a first oscillator; a sensor driver configured to generate a touch signal according to a second clock signal of a second oscillator; and a determination circuit configured to detect a cycle of at least one of the horizontal synchronization signal or the vertical synchronization signal according to the second clock signal, and output a detection signal when the cycle is out of a range. The determination circuit is a part of the display driver or the sensor driver.

In an embodiment, the determination circuit may be configured to detect the cycle of the horizontal synchronization signal according to a first count value of the second clock signal included in a high level section of the horizontal synchronization signal, and a second count value of the second clock signal included in a low level section of the horizontal synchronization signal.

In an embodiment, the determination circuit may be configured to output the detection signal when the first count value or the second count value is out of the range.

In an embodiment, the determination circuit may be configured to detect the cycle of the vertical synchronization signal according to a third count value of the second clock signal included in a high level section of the vertical synchronization signal, and a fourth count value of the second clock signal included in a low level section of the vertical synchronization signal.

In an embodiment, the determination circuit may be configured to output the detection signal when the third count value or the fourth count value is out of the range.

In an embodiment, the determination circuit may include: a counter configured to: count, according to the second clock signal, at least one section from among a high level section of the horizontal synchronization signal, a low level section of the horizontal synchronization signal, a high level section of the vertical synchronization signal, or a low level section of the vertical synchronization signal; and generate a count value according to the count; storage configured to store threshold values of the range; and a controller configured to receive the count value and the threshold values, and output the detection signal when the cycle is out of the range.

In an embodiment, the driving circuit may further include a frequency controller connected to the second oscillator, and configured to change a frequency of the second clock signal in response to the detection signal.

In an embodiment, when the frequency of the second clock signal is changed by the frequency controller, the count value may be changed to be included in the range.

In an embodiment, the sensor driver may include a touch controller configured to supply the touch signal to sensors.

In an embodiment, the sensor driver may include the determination circuit and the frequency controller.

In an embodiment, the driving circuit may further include a first frequency controller connected to the first oscillator, and configured to change a frequency of the first clock signal in response to the detection signal.

In an embodiment, when the frequency of the first clock signal is changed by the first frequency controller, the count value may be changed to be included in the range.

In an embodiment, the display driver may include: a data driver configured to supply a data signal to data lines; and a timing controller configured to control the data driver.

In an embodiment, the display driver may include the determination circuit and the first frequency controller.

In an embodiment, the first frequency controller may be configured to supply a control signal to the timing controller in response to the detection signal, and the timing controller may be configured to supply an oscillation change signal to the sensor driver in response to the control signal.

In an embodiment, the sensor driver may include a second frequency controller connected to the second oscillator, and configured to change a frequency of the second clock signal in response to the oscillation change signal, and when the frequency of the second clock signal is changed by the second frequency controller, the count value may be changed to be included in the range.

According to one or more embodiments of the present disclosure, a display device includes: a display component including pixels connected to scan lines and data lines; a sensor component including first sensors and second sensors configured to sense an external input; a display driver configured to divide a first clock signal of a first oscillator, generate a horizontal synchronization signal and a vertical synchronization signal, and supply a data signal to the data lines; a sensor driver configured to divide a second clock signal of a second oscillator, and generate a touch signal to be supplied to the first sensors and/or the second sensors; and a determination circuit configured to detect a cycle of at least one of the horizontal synchronization signal or the vertical synchronization signal according the second clock signal, and output a detection signal when the cycle is out of a range.

In an embodiment, the determination circuit may include: a counter configured to count a cycle of at least one of the horizontal synchronization signal or the vertical synchronization signal according to the second clock signal, and generate a count value; storage configured to store threshold values of the range; and a controller configured to receive the count value and the threshold values, and output the detection signal when the cycle is out of the range.

In an embodiment, the display device may further include a frequency controller connected to the second oscillator, and configured to change a frequency of the second clock signal in response to the detection signal, and when the frequency of the second clock signal is changed by the frequency controller, the count value may be changed to be included in the range.

In an embodiment, the sensor driver may include the determination circuit and the frequency controller.

In an embodiment, the display device may further include a frequency controller connected to the first oscillator, and configured to change a frequency of the first clock signal in response to the detection signal, and when the frequency of the first clock signal is changed by the frequency controller, the count value may be changed to be included in the range.

In an embodiment, the display driver may include: a data driver configured to supply a data signal to the data lines; and a timing controller configured to control the data driver.

In an embodiment, the display driver may include the determination circuit and the frequency controller.

In an embodiment, the frequency controller may be configured to supply a control signal to the timing controller in response to the detection signal, and the timing controller may be configured to supply an oscillation change signal to the sensor driver in response to the control signal.

In an embodiment, the sensor driver may include a second frequency controller connected to the second oscillator, and configured to change a frequency of the second clock signal in response to the oscillation change signal, and when the frequency of the second clock signal is changed by the second frequency controller, the count value may be changed to be included in the range.

According to one or more embodiments of the present disclosure, an electronic device includes: a processor; a display panel configured to be controlled by the processor to display an image; an input sensor configured to sense an external input; a controller configured to receive data corresponding to the image via an interface, divide a first clock signal of a first oscillator, and generate a horizontal synchronization signal and a vertical synchronization signal; and a touch control circuit configured to divide a second clock signal of a second oscillator, and supply a touch signal to the input sensor. At least one of the controller or the touch control circuit includes a determination circuit configured to detect a cycle of at least one of the horizontal synchronization signal or the vertical synchronization signal according to the second clock signal, and output a detection signal when the cycle is out of a range.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
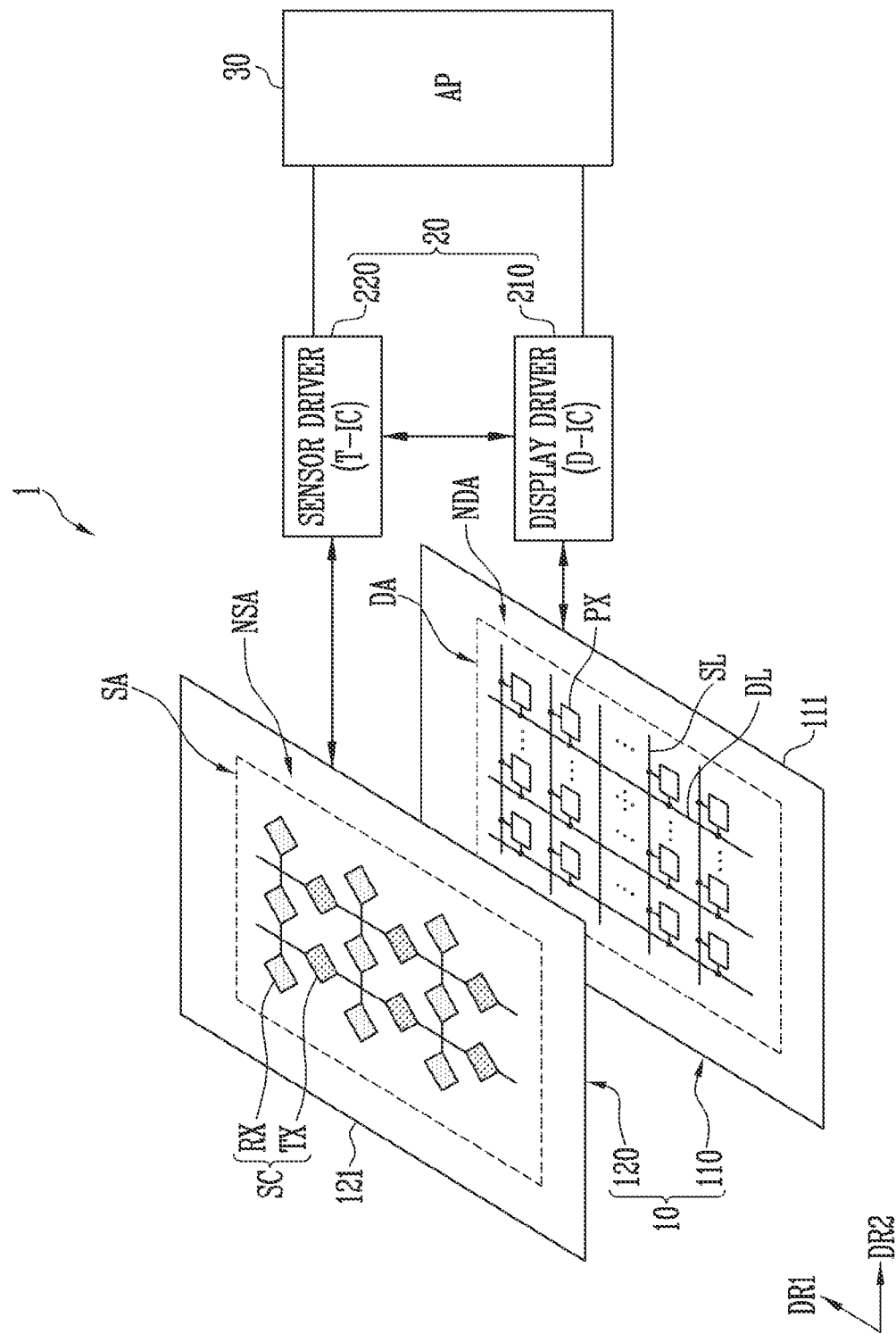
FIG. 1 is a diagram illustrating a display device in accordance with one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it may be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it may be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Furthermore, the expression "the same" may include "substantially the same". In other words, the expression "the same" may include a range that may be tolerated by those skilled in the art. Similarly, other expressions may also be expressions from which the term "substantially" has been omitted.

Some embodiments are described and illustrated in the accompanying drawings in connection with functional blocks, units, and/or modules. Those skilled in the art will understand that such blocks, units, and/or modules are physically implemented by logic circuits, discrete components, microprocessors, hard-wired circuits, memory elements, line connections, and other electronic circuits. They may be formed using semiconductor-based fabrication techniques or other fabrication techniques. The blocks, units, and/or modules implemented by a microprocessor or other similar hardware may be programmed and controlled using software to perform various functions described herein, and/or may be driven by firmware and/or software. In addition, each block, unit, and/or module may be implemented by dedicated hardware, a combination of dedicated hardware to perform some functions and a processor to perform other functions (e.g., one or more programmed microprocessors and related circuits). Furthermore, in some embodiments, the blocks, units and/or modules may be physically separated into two or more individual blocks, units and/or modules that interact with each other. In some embodiments, the blocks, units and/or modules may be physically combined with each other into more complex blocks, units and/or modules.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device 1 in accordance with one or more embodiments of the present disclosure.

Referring to FIG. 1, the display device 1 may include a panel 10, and a driving circuit 20 configured to drive the panel 10. The display device 1 may further include an application processor 30, or may be connected to the application processor 30.

The panel 10 may include a display component 110 configured to display an image, and a sensor component 120 configured to sense a touch, pressure, a fingerprint, hovering, biometric information (e.g., biometric characteristics), or the like. For example, the panel 10 may include pixels PX, and sensors SC located to overlap with at least some of the pixels PX. In an embodiment, the sensors SC may include first sensors TX (e.g., driving electrodes) and second sensors RX (e.g., sensing electrodes). In an embodiment (e.g., in a self-capacitance mode), the sensors SC may be formed of one type (e.g., the same kind) of sensor regardless of whether they are the first sensors TX or the second sensors RX.

The driving circuit 20 may include a display driver 210 configured to drive the display component 110, and a sensor driver 220 configured to drive the sensor component 120. For example, the pixels PX may display an image during each display frame period. For example, the sensors SC may sense an input from a user during each sensing frame period. The sensing frame period and the display frame period may be independent from each other, and different from each other. The sensing frame period and the display frame period may be synchronized with each other, or may not be synchronized with each other.

In an embodiment, the display component 110 and the sensor component 120 may be separately fabricated from each other, and may then be disposed and/or coupled with (e.g., connected to or attached to) each other, such that at least portions thereof overlap with each other. In another embodiment, the display component 110 and the sensor component 120 may be integrally fabricated with each other. For example, the sensor component 120 may be directly formed on at least one substrate (e.g., an upper and/or lower substrate of the display panel, or a thin film encapsulation layer) that forms the display component 110, or on other insulating layers or on various functional layers (e.g., an optical layer or a passivation layer).

Although FIG. 1 illustrates that the sensor component 120 is disposed on a front side of the display component 110 (e.g., on an upper surface on which an image is displayed), the position of the sensor component 120 is not limited thereto. For example, in an embodiment, the sensor component 120 may be disposed on a rear surface or on opposite surfaces of the display component 110. In an embodiment, the sensor component 120 may be disposed on a peripheral area of at least one side of the display component 110.

The display component 110 may include a display substrate 111, and a plurality of pixels PX formed on the display substrate 111. The pixels PX may be disposed in a display area DA of the display substrate 111.

The display substrate 111 may include the display area DA formed to display an image, and a non-display area NDA provided around the periphery of the display area DA. In an embodiment, the display area DA may be disposed in a central portion of the display component 110, and the non-display area NDA may be disposed in the peripheral area of the display component 110 to enclose (e.g., surround around a periphery of) the display area DA.

The display substrate 111 may be a rigid substrate or a flexible substrate, and the material or properties thereof are not particularly limited. For example, the display substrate 111 may be a rigid substrate made of glass or reinforced glass, or a flexible substrate formed of a thin film made of plastic or a metal.

Scan lines SL, data lines DL, and the pixels PX connected to the scan lines SL and the data lines DL may be disposed in the display area DA. The pixels PX may be selected by scan signals, each of which has a turn-on level and are supplied from the scan lines SL, may be supplied with data signals from the data lines DL, and may emit light having a luminance corresponding to the data signals. Consequently, an image corresponding to the data signals is displayed on the display area DA. In the present disclosure, the structure of the pixels PX and a method of driving the pixels PX are not particularly limited. For example, each of the pixels PX may be implemented as a pixel that employs various suitable structures and driving methods known to those having ordinary skill in the art.

An internal circuit component and/or various lines, which are connected to the pixels PX of the display area DA, may be disposed in the non-display area NDA. For example, a plurality of lines for supplying power and various control signals to the display area DA may be disposed in the non-display area NDA. In addition, a scan driver and the like may be disposed in the non-display area NDA.

In the present disclosure, the type of the display component 110 is not particularly limited. For example, the display component 110 may be implemented as a self-emissive kind of display panel, such as an organic light emitting display panel. However, in the case in which the display component 110 is implemented as a self-emissive kind, each of the pixels PX is not limited to the case where the pixel includes an organic light emitting element. For example, the light emitting element of each of the pixels PX may be formed of an organic light emitting diode, an inorganic light emitting diode, a quantum dot/well light emitting diode, or the like. A plurality of light emitting elements may be provided in each of the pixels PX. Here, the plurality of light emitting elements may be connected in series, parallel, or series-parallel to each other. As another example, the display component 110 may be implemented as a non-emission kind of display panel, such as a liquid crystal display panel. In the case in which the display component 110 is implemented as a non-emission kind, the display device 1 may further include a light source, such as a back-light unit (e.g., a back-light).

The sensor component 120 may include a sensor substrate 121, and a plurality of sensors SC formed on the sensor substrate 121. The sensors SC may be disposed in a sensing area SA on the sensor substrate 121.

The sensor substrate 121 may include the sensing area SA capable of sensing a touch input or the like, and a peripheral area NSA formed around the periphery of the sensing area SA. In an embodiment, the sensing area SA may be disposed to overlap with at least one area of the display area DA. For example, the sensing area SA may be an area corresponding to the display area DA (e.g., an area overlapping with the display area DA). The peripheral area NSA may be an area corresponding to the non-display area NDA (e.g., an area overlapping with the non-display area NDA). In this case, when a touch input or the like is provided on the display area DA, the sensor component 120 may detect the touch input.

The sensor substrate 121 may be a rigid substrate or a flexible substrate, and may be formed of at least one insulating layer. Furthermore, the sensor substrate 121 may be a transparent or translucent light-transmissive substrate, but the present disclosure is not limited thereto. In other words, the material or properties of the sensor substrate 121 are not particularly limited. For example, the sensor substrate 121 may be a rigid substrate made of glass or reinforced glass, or a flexible substrate formed of a thin film made of plastic or a metal. Furthermore, in an embodiment, at least one substrate (e.g., the display substrate 111, an encapsulation substrate, and/or a thin film encapsulation layer) that forms the display component 110, or at least one insulating layer, functional layer, or the like that is disposed inside and/or outside the display component 110, may be used as the sensor substrate 121.

The sensing area SA may be an area (e.g., an active area of the sensor) capable of responding to a touch input. As such, the sensors SC for sensing the touch input or the like may be disposed in the sensing area SA. In an embodiment, the sensors SC may include the first sensors TX and the second sensors RX.

For example, the first sensors TX may each extend in a first direction DR1. The second sensors RX may extend in a second direction DR2. The second direction DR2 may be different from the first direction DR1. For example, the second direction DR2 may be a direction crossing the first direction DR1. In an embodiment, the extension direction and the arrangement direction of the first sensors TX may comply with any suitable configurations. The first sensors TX may each have a structure in which first cells, each having a relatively large surface area, and first bridges, each having a relatively small surface area, are connected to each other. Although FIG. 1 illustrates a case in which each of the first cells has a diamond form, it may have various suitable forms, such as a circular form, a rectangular form, a triangular form, or a mesh form. For example, the first bridges may be integrally formed with the first cells in the same layer as each other. In another embodiment, the first bridges may be formed at (e.g., in or on) a layer different from a layer in which the first cells are formed, and may electrically connect adjacent first cells to each other.

For example, the second sensors RX may each extend in the second direction DR2. The second sensors RX may be arranged along the first direction DR1. In an embodiment, the extension direction and the arrangement direction of the second sensors RX may comply with other suitable configurations. The second sensors RX may each have a shape in which second cells, each having a relatively large surface area, and second bridges, each having a relatively small surface area, are connected to each other. Although FIG. 1 illustrates that the second cells each have a diamond form, it may have various suitable forms, such as a circular form, a rectangular form, a triangular form, or a mesh form. For example, the second bridges may be integrally formed with the second cells in the same layer as each other. In an embodiment, the second bridges may be formed at (e.g., in or on) a layer different from a layer in which the second cells are formed, and may electrically connect adjacent second cells to each other.

In an embodiment, the first sensors TX and the second sensors RX may each include at least one of a metal, a transparent conductive material, or one or more various other conductive materials, and thus, may have electrical conductivity. For example, the first sensor TX and the second sensors RX may include at least one of various suitable metals including gold (Au), silver (Ag), aluminum (Al), molybdenum (Mo), chrome (Cr), titanium (Ti), nickel (Ni), neodymium (Nd), copper (Cu), platinum (Pt), and/or the like, or a suitable alloy thereof. In some embodiments, the first sensors TX and the second sensors RX may have a mesh form. Furthermore, the first sensor TX and the second sensors RX may include at least one of various suitable transparent conductive materials including a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), a carbon nanotube, and/or graphene. In addition, the first sensors TX and the second sensors RX may include at least one of various suitable conductive materials, and thus, may have electrical conductivity. Furthermore, the first sensors TX and the second sensors RX may each have a single-layer structure or a multi-layered structure, and a cross-sectional structure thereof is not particularly limited.

In the peripheral area NSA of the sensor component 120, sensor lines may be intensively disposed to electrically connect the first and second sensors TX and RX to the sensor driver 220 or the like.

The driving circuit 20 may include a display driver 210 configured to drive the display component 110, and a sensor driver 220 configured to drive the sensor component 120. In an embodiment, the display driver 210 and the sensor driver 220 may be formed of separate integrated circuits or chips (ICs) from each other. In an embodiment, the display driver 210 and the sensor driver 220 may be at least partially integrated into one IC.

The display driver 210 may be electrically connected to the display component 110, and configured to drive the pixels PX. For example, the display driver 210 may include a data driver and a timing controller. The scan driver may be separately mounted in the non-display area NDA of the display component 110. In an embodiment, the display driver 210 may include all or at least some of the data driver, the timing controller, and the scan driver.

The timing controller included in the display driver 210 may control the data driver. For example, the timing controller may supply a control signal and digital data to the data driver. In response to the control signal, the data driver may convert the digital data to an analog data signal, and may supply the analog data signal to the data lines DL. A first oscillator configured to generate a first clock signal may be provided in the display driver 210. The timing controller may divide the first clock signal supplied from the first oscillator, and generate various control signals and synchronization signals. For example, the timing controller may divide the first clock signal, and generate a vertical synchronization signal Vsync and a horizontal synchronization signal Hsync. Here, the horizontal synchronization signal Hsync may control a period during which a data signal is supplied, and may be referred to as a driving signal. Furthermore, a frequency of the driving signal may be referred to as a driving frequency.

The sensor driver 220 may be electrically connected to the sensor component 120, and configured to drive the sensor component 120. The sensor driver 220 may include a sensor transmitter and a sensor receiver. In an embodiment, the sensor transmitter and the sensor receiver may be integrated with each other into one IC, but the present disclosure is not limited thereto.

The sensor driver 220 may supply control signals to the sensor transmitter and the sensor receiver, so that the sensor component 120 may sense a touch. The sensor transmitter may supply a touch signal to the first sensors TX (and/or the second sensors RX). The sensor receiver may receive a sensing signal corresponding to the touch signal from the sensors RX (and/or the first sensors TX). A second oscillator configured to generate a second clock signal may be provided in the sensor driver 220. The sensor driver 220 may divide the second clock signal supplied from the second oscillator, and generate various control signals or the like. For example, the sensor driver 220 may divide the second clock signal, and generate a touch signal. Here, a frequency of the touch signal may be referred to as a touch frequency.

In an embodiment, the frequency of the touch signal may be determined (e.g., set or predetermined) not to interfere with the frequency of the driving signal. For example, the frequency of the touch signal may be a frequency of 200 Khz or more. The frequency of the driving signal may be a frequency of 500 Khz or more. Here, the frequency of the touch signal and the frequency of the driving signal may be set to various values in response to the resolution, the size, and the like of the panel.

In the case where multiplication frequencies of the touch signal interfere with multiplication frequencies of the driving signal, jitter noise may increase, and thus, a ghost touch may occur. Therefore, the frequency of the touch signal may be experimentally determined, such that a harmonic may be prevented or substantially prevented from occurring between the frequency of the touch signal and the frequency of the driving signal. In this case, the frequency of the touch signal may be generated to be synchronous and/or asynchronous with that of the horizontal synchronization signal Hsync and/or the vertical synchronization signal Vsync.

The first oscillator and the second oscillator may each be changed in an oscillation frequency in response to the temperature or the like. For example, a cycle (e.g., a first cycle) of the first clock signal output from the first oscillator may be changed in response to a change in temperature. For example, a cycle (e.g., a second cycle) of the second clock signal output from the second oscillator may be changed in response to a change in temperature.

Here, if the first cycle and the second cycle are changed at the same rate as each other, a harmonic may not occur between the frequency of the touch signal and the frequency of the driving signal. However, because the first oscillator and the second oscillator are different from each other in physical characteristics, distribution, and the like, the first cycle of the first clock signal and the second cycle of the second clock signal may be changed differently from each other in response to the temperature, and thus, a harmonic may occur between the frequency of the touch signal and the frequency of the driving signal.

According to one or more embodiments of the present disclosure, a method of automatically determining whether or not a defect is present in the case where the first cycle of the first clock signal and the second cycle of the second clock signal are changed differently from each other may be provided. In one or more embodiments of the present disclosure, in the case where the first cycle of the first clock signal and the second cycle of the second clock signal are changed differently from each other, the frequency (e.g., the first cycle) of the first clock signal and/or the frequency (e.g., the second cycle) of the second clock signal may be changed, so that a harmonic may be prevented from occurring between the frequency of the touch signal and the frequency of the driving signal. More detailed description thereof will be provided below.

The application processor 30 may be electrically connected to the display driver 210 and the sensor driver 220. The application processor 30 may provide timing signals and grayscale signals (e.g., data) for a display frame period to the display driver 210. Furthermore, the application processor 30 may provide timing signals to the sensor driver 220. The application processor 30 may correspond to at least one of a graphics processing unit (GPU), a central processing unit (CPU), an application processor (AP), or the like.

Figure 2:
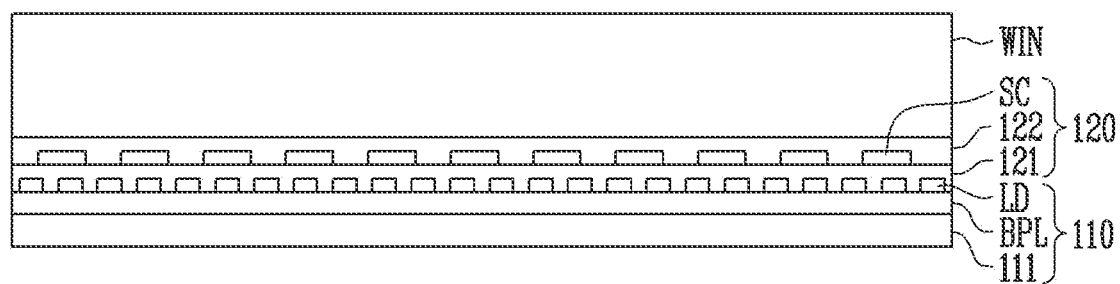
FIG. 2 is a sectional view illustrating an embodiment of the display device of FIG. 1.

FIG. 2 is a sectional view illustrating an embodiment of the display device 1 of FIG. 1.

Referring to FIGS. 1 and 2, the sensor component 120 is placed on the display component 110, and a window WIN may be placed on the sensor component 120.

The display component 110 may include a display substrate 111, a circuit element layer BPL formed on the display substrate 111, and light emitting elements LD formed on the circuit element layer BPL. The circuit element layer BPL may include the scan lines SL, the data lines DL, and pixel circuits (e.g., a transistor and a capacitor) configured to drive the light emitting elements LD of the pixels PX.

The sensor component 120 may include a sensor substrate 121, sensors SC formed on the sensor substrate 121, and a protective layer 122 covering the sensors SC. In FIG. 2, according to an embodiment, the sensor substrate 121 is illustrated in the form of an encapsulation layer that covers the pixels PX. In an embodiment, the sensor substrate 121 may be provided separately from the encapsulation layer that covers the pixels PX.

The window WIN may be a protective component, which is disposed on the uppermost surface of a module of the display device 1, and may be a transparent or substantially transparent light-transmissive substrate. The window WIN may have a multilayered structure including at least one selected from among a glass substrate, a plastic film, and/or a plastic substrate. The window WIN may include a rigid or flexible substrate, and the constituent material of the window WIN is not particularly limited.

In some embodiments, the display device 1 may further include, between the window WIN and the sensor component 120, a polarizing plate (or a different type of reflection prevention layer) for preventing or substantially preventing reflection of external light.

Figure 3:
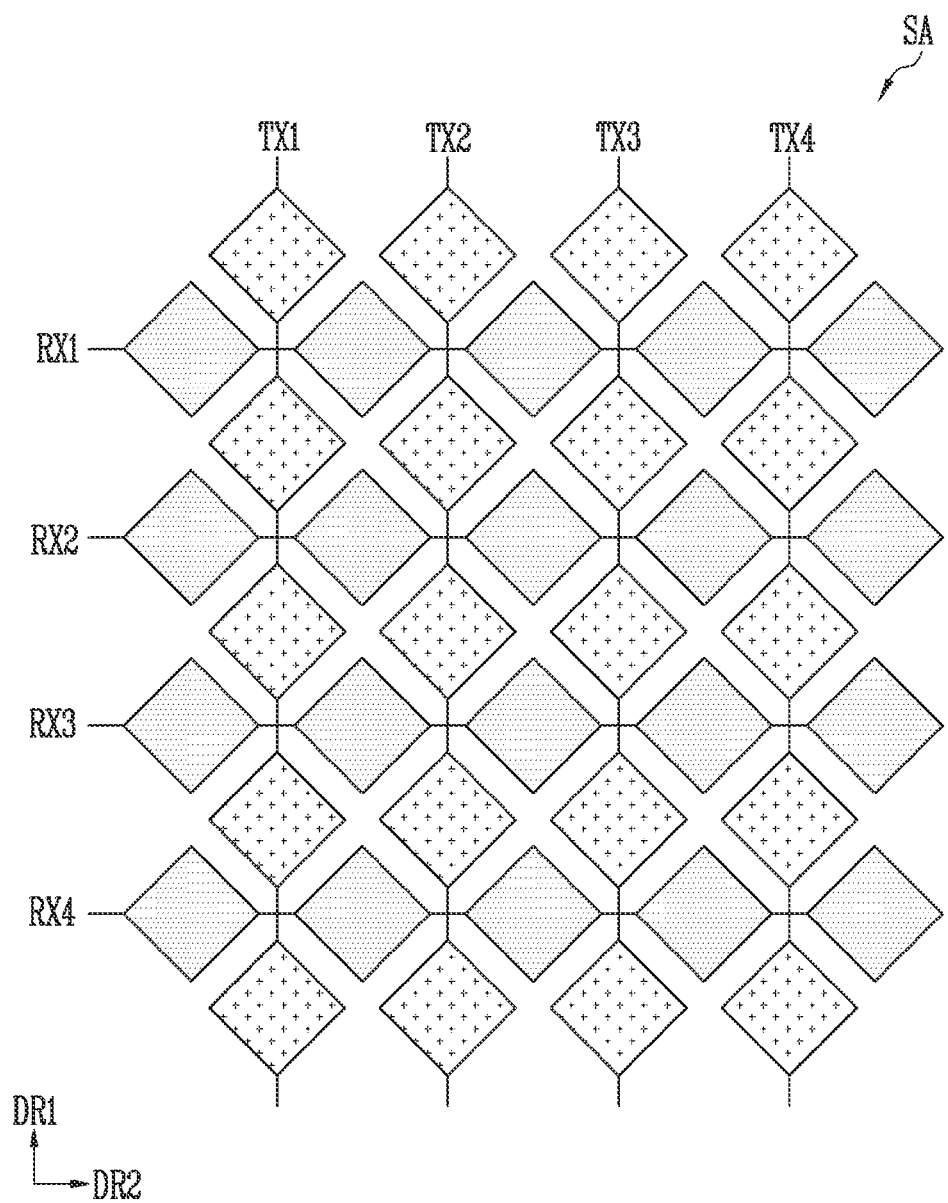
FIG. 3 is a view illustrating sensors included in the display device of FIG. 2 in accordance with an embodiment.

FIG. 3 is a view illustrating sensors included in the display device 1 of FIG. 2 in accordance with an embodiment.

Referring to FIGS. 1 to 3, first sensors TX1, TX2, TX3, and TX4 and second sensors RX1, RX2, RX3, and RX4 may be located in the sensing area SA. For convenience of illustration, four first sensors TX1 to TX4 and four second sensors RX1 to RX4 are shown as disposed in the sensing area SA. However, the present disclosure is not limited thereto, and y (e.g., where y is a natural number) to p (e.g., where p is a natural number greater than y) first sensors TX and second sensors RX may be disposed in the display device 1.

The first sensors TX1 to TX4 and the second sensors RX1 to RX4 may be the same as the first sensors TX and the second sensors RX described above with reference FIG. 1, and thus, redundant description thereof may not be repeated.

Figure 4:
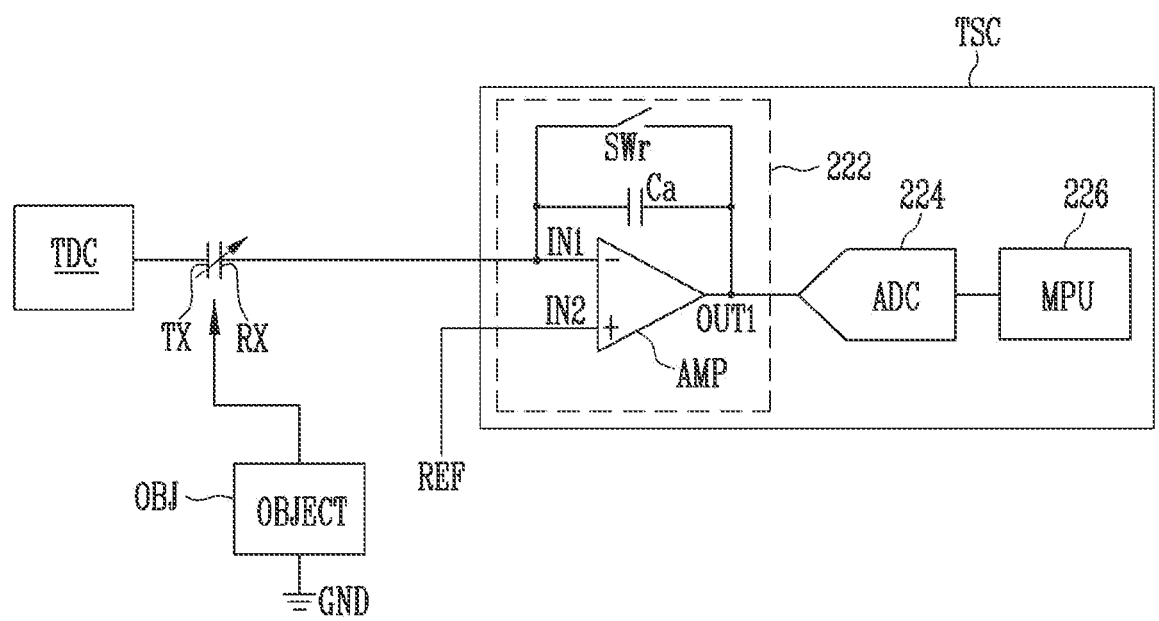
FIGS. 4 and 5 are views illustrating a mutual sensing period.
Figure 5:
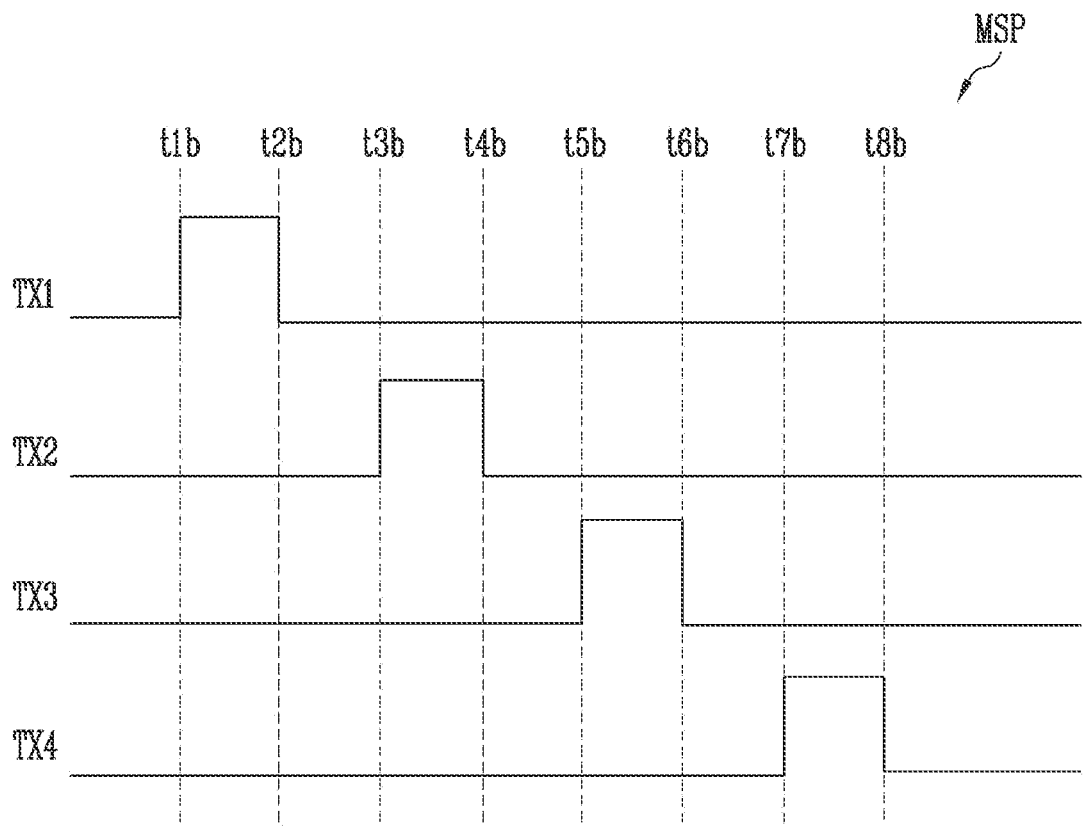

FIGS. 4 and 5 are views illustrating a mutual sensing period MSP.

Referring to FIGS. 1 to 5, the mutual sensing period MSP may be a period in which the sensor component 120 and the sensor driver 220 are driven in a mutual capacitance mode. FIG. 4 illustrates a driving operation of the sensor component 120 and the sensor driver 220, centered on any one sensor channel 222.

The sensor driver 220 may include a sensor receiver TSC and a sensor transmitter TDC. In the mutual sensing period MSP, the sensor transmitter TDC may be connected to the first sensors TX, and the sensor receiver TSC may be connected to the second sensors RX.

The sensor receiver TSC may include an operational amplifier AMP, an analog-digital converter 224, and a processor 226. For example, each sensor channel 222 may be implemented as an analog front end (AFE) including at least one operational amplifier AMP. The analog-digital converter 224 and the processor 226 may be provided in each sensor channel 222, or may be shared by a plurality of sensor channels 222.

A first input terminal IN1 of the operational amplifier AMP may be connected to a corresponding second sensor RX. A second input terminal IN2 of the operational amplifier AMP may be connected to a reference signal source (e.g., a reference signal REF). For example, the first input terminal IN1 may be an inverting terminal, and the second input terminal IN2 may be a non-inverting terminal. The reference signal REF may be a ground voltage, or a voltage having a suitable magnitude (e.g., a certain or predetermined magnitude). In an embodiment, the reference signal REF may be a signal that is provided through the corresponding second sensor and another second sensor.

The analog-digital converter 224 may be connected to an output terminal OUT1 of the operational amplifier AMP. The analog-digital converter 224 may convert an output of the operational amplifier AMP to a digital sensing value, and may output the digital sensing value. A capacitor Ca and a switch SWr may be connected in parallel between the first input terminal IN1 and the output terminal OUT1.

Referring to FIG. 5, during the mutual sensing period MSP, the sensor driver 220 (e.g., the sensor receiver TDC) may sequentially supply first touch signals (e.g., signals for sensing) to the first sensors TX1 to TX4. For example, the first touch signals may be supplied to the first sensor TX1 two times t1*b* and *t*2*b*, the first touch signals may be supplied to the first sensor TX2 two times t3*b* and *t*4*b*, the first touch signals may be supplied to the first sensor TX3 two times t5*b* and *t*6*b*, and the first touch signals may be supplied to the first sensor TX4 two times t7*b* and *t*8*b*. The number of times the first touch signals are supplied to each of the first sensors TX1 to TX4 may be greater than two, depending on embodiments.

Each of the first touch signals may correspond to a rising transition and/or a falling transition. For example, the first touch signal of the time point t1*b* may correspond to a rising transition. In other words, at the time point t1*b*, the first touch signal may increase from a low level to a high level. The touch signal of the time point t2*b* may correspond to a falling transition. In other words, at the time point t2*b*, the first touch signal may decrease from a high level to a low level.

The sensor receiver TSC may include a plurality of sensor channels 222 connected to a plurality of second sensors RX. Each of the sensor channels 222 may receive first sensing signals (e.g., first sampling signals) from a corresponding second sensor corresponding to the first touch signals. For example, at the time point t1*b*, in response to a first touch signal applied to the first sensor TX1, the sensor channels 222 connected to the second sensors RX1 to RX4 may independently receive first sensing signals. At the time point t2*b*, in response to a first touch signal applied to the first sensor TX1, the sensor channels 222 connected to the second sensors RX1 to RX4 may independently receive first sensing signals.

In the sensing area SA, depending on a position of an object OBJ, such as the finger of a user, mutual capacitances between the first sensors TX1 to TX4 and the second sensors RX1 to RX4 may be changed, so that the first sensing signals received to the sensor channels 222 may also be different from each other. A touch position of the object OBJ may be detected by using a difference between the first sensing signals.

The sensor channel 222 may generate an output signal corresponding to a difference in voltage between the first input terminal IN1 and the second input terminal IN2. For example, the sensor channel 222 may amplify a differential voltage between the first input terminal IN1 and the second input terminal IN2 by a degree corresponding to a gain (e.g., a certain or predetermined gain), and may output the amplified voltage.

In an embodiment, the sensor channel 222 may be implemented as an integrator. In this case, the capacitor Ca and the switch SWr may be connected in parallel between the first input terminal IN1 and the output terminal OUT of the operational amplifier AMP. For example, as the switch SWr is turned on before a first sampling signal is received, charges of the capacitor Ca may be initialized. The switch SWr may be in a turned-off state at a time point at which the first sampling signal is received.

The analog-digital converter 224 may convert an analog signal input from each of the sensor channels 222 to a digital signal. The processor 226 may analyze the digital signal to detect an input from the user. The processor 226 may be included in the application processor 30.

Figure 6:
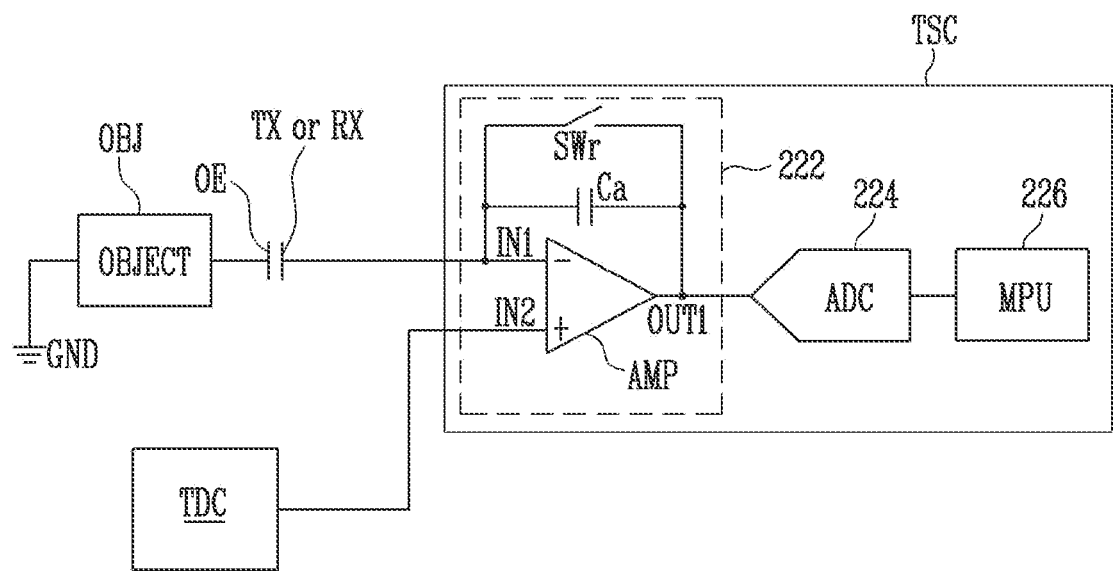
FIGS. 6-8 are views illustrating a first self sensing period and a second self sensing period.
Figure 7:
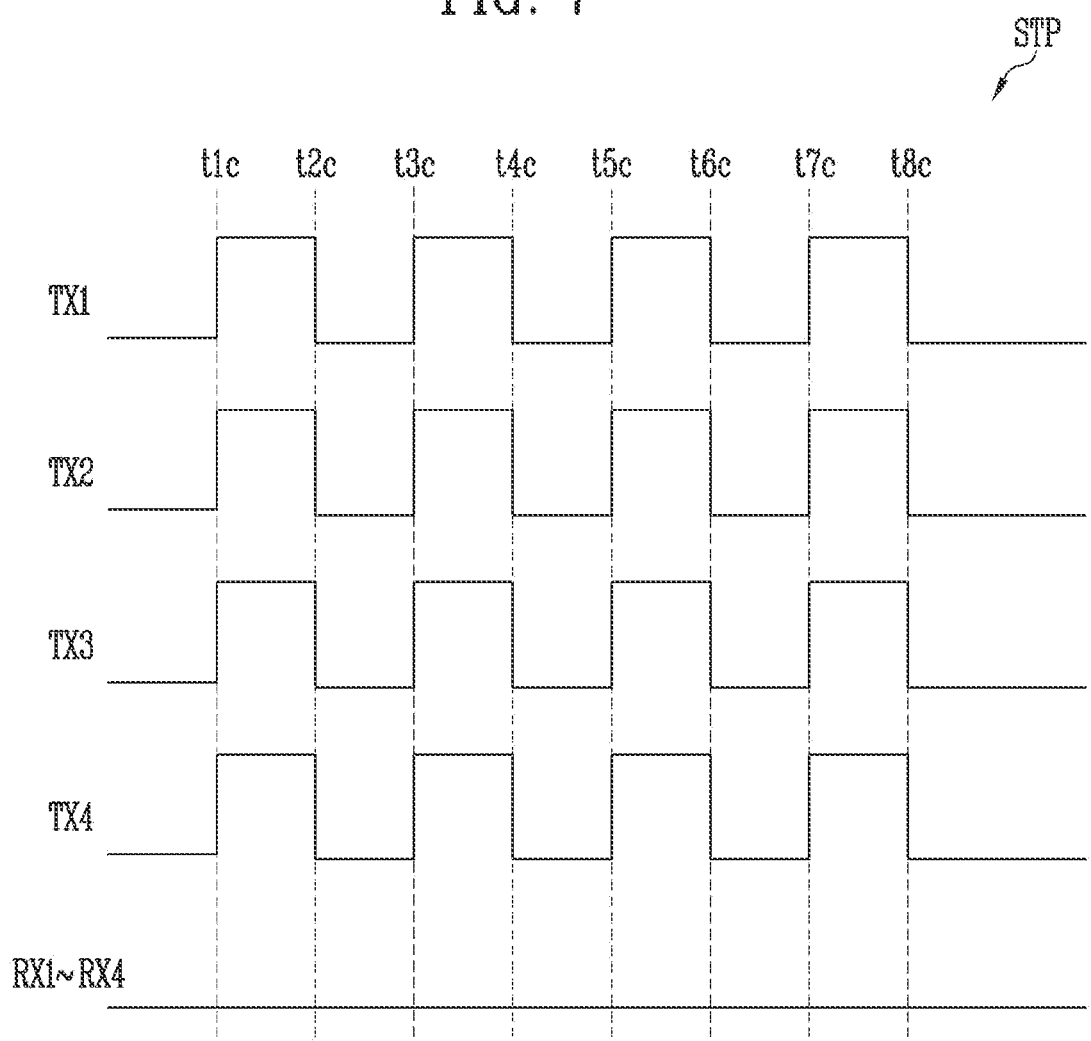
Figure 8:
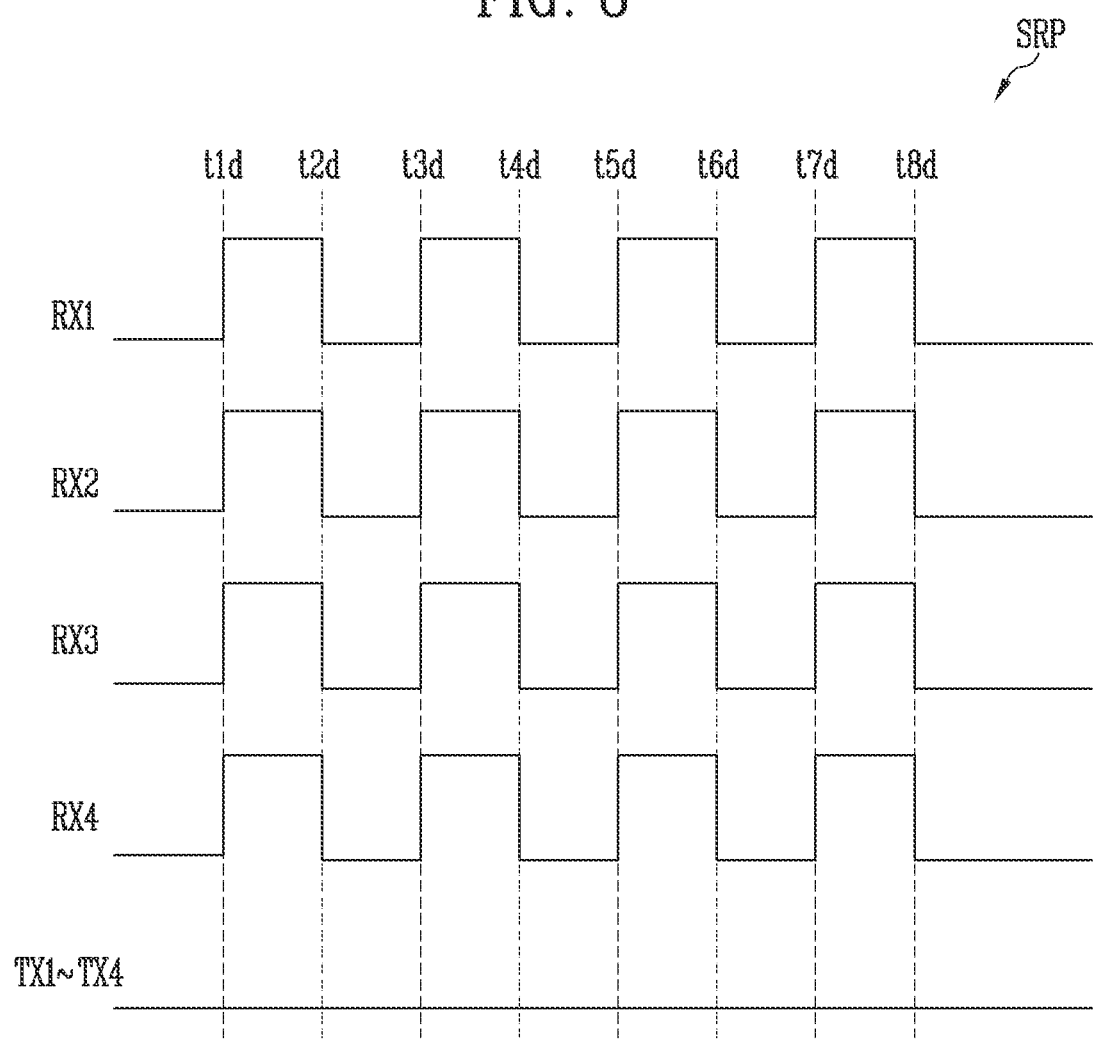

FIGS. 6 through 8 are views illustrating a first self sensing period and a second self sensing period. FIG. 6 illustrates a configuration of the sensor component 120 and the sensor driver 220, centered on any one sensor channel 222. The internal configuration of the sensor receiver TSC and the sensor transmitter TDC may be the same or substantially the same as that illustrated in FIG. 4, and thus, redundant description thereof may not be repeated. Hereinafter, differences from the description above with reference to FIG. 4 may be mainly described.

Referring to FIGS. 6 to 8, the first self-sensing period STP may be a period in which the sensor component 120 and the sensor driver 220 are driven in a self-capacitance mode. In the first self-sensing period STP, the sensor transmitter TDC may be connected to the second input terminal IN2 of each sensor channel 222, and the first input terminal IN1 of each sensor channel 222 may be connected to the corresponding first sensor. In an embodiment, the sensor transmitter TDC may also be connected to the first input terminal IN1. In this case, the reference signal REF (e.g., refer to FIG. 4) may be applied to the second input terminal IN2.

Referring to FIG. 7, during the first self-sensing period STP, the sensor transmitter TDC may supply a second touch signal to the second input terminal IN2 of each sensor channel 222. Here, the second touch signal may be supplied to the first sensor connected to the first input terminal IN1 depending on characteristics of the operational amplifier AMP. In an embodiment, the sensor driver 220 may concurrently (e.g., simultaneously or substantially simultaneously) supply second touch signals to the first sensors TX1 to TX4 during the first self-sensing period STP. For example, referring to FIG. 7, at each time point $t1c$, $t2c$, $t3c$, $t4c$, $t5c$, $t6c$, $t7c$, $t8c$, the second touch signals may be concurrently (e.g., simultaneously or substantially simultaneously) supplied to the first sensors TX1 to TX4. Here, the second sensors RX1 to RX4 may each receive a separate reference signal (e.g., a ground voltage) or may be floated. Each of the second touch signals may correspond to a rising transition and/or a falling transition.

The first sensors TX1 to TX4 may have a self-capacitance. Here, in the case where an object OBJ, such as the finger of the user, is close to the first sensors TX1 to TX4, the self-capacitance of the first sensors TX1 to TX4 may be changed depending on a capacitance formed with a surface of the object OBJ. A second touch signal in which the self-capacitance is reflected may be referred to as a second sensing signal (e.g., a second sampling signal). A touch position of the object OBJ with respect to the second direction DR2 may be detected by using a difference between the second sensing signals for the first sensors TX1 to TX4 (e.g., refer to FIG. 3).

Referring to FIG. 8, the second self-sensing period SRP may be a period in which the sensor component 120 and the sensor driver 220 are driven in a self-capacitance mode. In the second self-sensing period SRP, the sensor transmitter TDC may be connected to the second input terminal IN2 of each sensor channel 222, and the first input terminal IN1 of each sensor channel 222 may be connected with the corresponding second sensor.

For example, during the second self-sensing period SRP, the sensor transmitter TDC may supply a third touch signal to the second input terminal IN2 of each sensor channel 222. Here, the third touch signal may be supplied to the second sensor connected to the first input terminal IN1 depending on characteristics of the operational amplifier AMP. In an embodiment, the sensor driver 220 may concurrently (e.g., simultaneously or substantially simultaneously) supply third touch signals to the second sensors RX1 to RX4 during the second self-sensing period SRP. For example, referring to FIG. 8, at each time point $t1d$, $t2d$, $t3d$, $t4d$, $t5d$, $t6d$, $t7d$, $t8d$, the third touch signals may be concurrently (e.g., simultaneously or substantially simultaneously) supplied to the second sensors RX1 to RX4. Here, the first sensors TX1 to TX4 may each receive a separate reference signal (e.g., a ground voltage) or may be floated. Each of the third touch signals may correspond to a rising transition or a falling transition.

The second sensors RX1 to RX4 may have a self-capacitance. Here, in the case where an object OBJ, such as the finger of the user, is close to the second sensors RX1 to RX4, the self-capacitance of the second sensors RX1 to RX4 may be changed depending on a capacitance formed with a surface of the object OBJ. A third touch signal in which the self-capacitance is reflected may be referred to as a third sensing signal (e.g., a third sampling signal). A touch position of the object OBJ with respect to the third direction DR1 may be detected by using a difference between the third sensing signals for the second sensors RX1 to RX4 (e.g., refer to FIG. 3).

Figure 9:
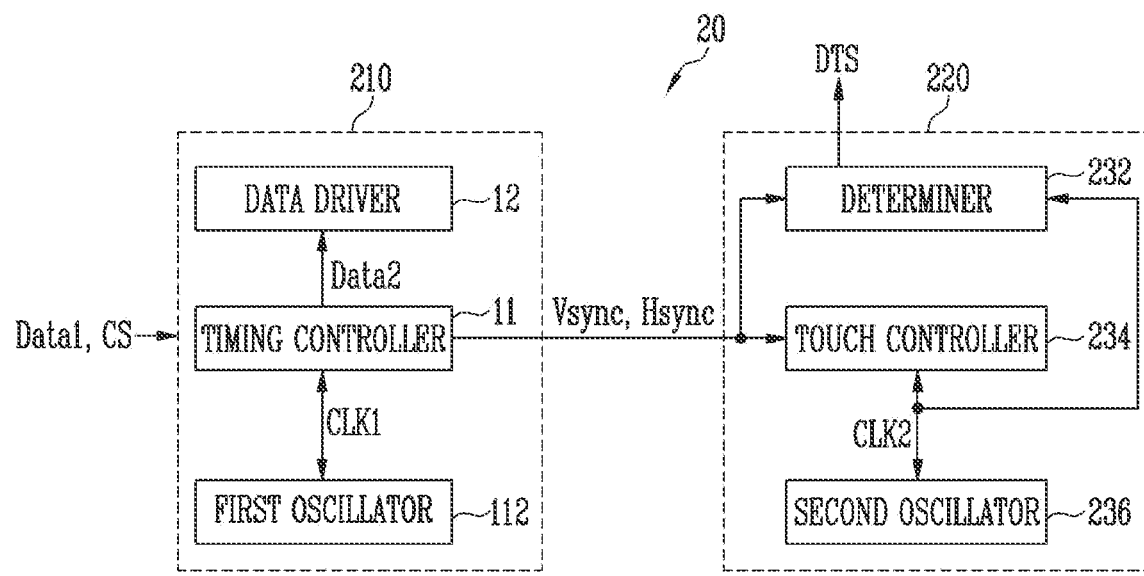
FIG. 9 is a view illustrating a driving circuit in accordance with an embodiment of the present disclosure.

FIG. 9 is a view illustrating a driving circuit 20 in accordance with an embodiment of the present disclosure.

Referring to FIG. 9, the driving circuit 20 may include a display driver 210 and a sensor driver 220.

The display driver 210 may include a timing controller 11, a data driver 12, and a first oscillator 112. For convenience of illustration, FIG. 9 illustrates that the first oscillator 112 is located outside the timing controller 11, but the present disclosure is not limited thereto, and the first oscillator 112 may be generally included inside the timing controller 11.

The first oscillator 112 may generate a first clock signal CLK1 to be used in the display driver 210. Here, the first clock signal CLK1 may have a relatively high frequency (e.g., a frequency of 1 Mhz or more).

The timing controller 11 may be supplied with a control signal CS and first data Data1 from an external device (e.g., the application processor 30). The timing controller 11 supplied with the control signal CS may divide the first clock signal CLK1 based on the control signal CS, and may generate a vertical synchronization signal Vsync, a horizontal synchronization signal Hsync, a data enable signal, and the like. The timing controller 11 may use the vertical synchronization signal Vsync, the horizontal synchronization signal Hsync, the data enable signal, and the like to generate a control signal to be supplied to the data driver 12 or the like.

Each cycle of the vertical synchronization signal Vsync may correspond to a corresponding display frame period. The display frame period may refer to a period in which an image of one screen is displayed on the display component 110. Each cycle of the horizontal synchronization signal Hsync may correspond to a corresponding horizontal period. The horizontal period may refer to a period in which a data signal is supplied to pixels located in one horizontal line (e.g., a pixel row in which pixels connected to the same scan line as each other are located).

The timing controller 11 supplied with the first data Data1 may correct the first data Data1, and may generate second data Data2 to supply the second data Data2 to the data driver 12. Any suitable method known to those having ordinary skill in the art may be used as a method of generating the second data Data2 using the first data Data1 by the timing controller 11. For example, the timing controller 11 may generate the second data Data2, taking into account optical characteristics of the pixels PX, a threshold voltage of a driving transistor included in each of the pixels PX, degradation of a light emitting element, or the like. The data driver 12 supplied with the second data Data2 may generate a data signal, and may supply the data signal to the data lines DL during a horizontal period.

In an embodiment of the present disclosure, the data driver 12, the timing controller 11, and the first oscillator 112 may be integrated into a single IC. As another example, the timing controller 11 and the first oscillator 112 may be integrated into a single IC, and the data driver 12 may be integrated into a separate IC. As another example, the timing controller 11, the first oscillator 112, and at least some components of the data driver 12 may be integrated into a single IC.

The sensor driver 220 may include a determiner (e.g., a determination circuit) 232, a touch controller 234, and a second oscillator 236. For convenience, FIG. 9 illustrates that the second oscillator 236 is located outside the touch controller 234, but the present disclosure is not limited thereto, and the second oscillator 236 may be generally included inside the touch controller 234. Furthermore, the touch controller 234 may include at least some of the components of the determiner 232 therein.

The second oscillator 236 may generate a second clock signal CLK2 to be used in the sensor driver 220. Here, the second clock signal CLK2 may have a relatively high frequency (e.g., a frequency of 1 Mhz or more).

The touch controller 234 may control the overall operations of the sensor driver 220. The sensor transmitter TDC and the sensor receiver TSC may be included in the touch controller 234. The touch controller 234 may divide the second clock signal CLK2, and may generate various signals. For example, the touch controller 234 may divide the second clock signal CLK2, and may generate a first touch signal shown in FIG. 5, a second touch signal shown in FIG. 7, and a third touch signal shown in FIG. 8. In other words, the touch controller 234 may divide the second clock signal CLK2, and may generate touch signals to be supplied to the first sensors TX and/or the second sensors RX.

The touch controller 234 may be supplied with a vertical synchronization signal Vsync and/or a horizontal synchronization signal Hsync from the display driver 210 (e.g., the timing controller 11). Here, the horizontal synchronization signal Hsync may control a period during which a data signal is supplied, and may be referred to as a driving signal, as described above. The touch controller 234 may generate a touch signal in synchronization or asynchronization with the vertical synchronization signal Vsync and/or the horizontal synchronization signal Hsync. Here, the frequency of the touch signal may be determined (e.g., may be preset or predetermined), such that a harmonic is prevented from occurring between the frequency of the touch signal and the frequency of the driving signal. The touch controller 234 may generate a touch signal at a desired frequency (e.g., a preset or predetermined frequency).

In an embodiment, the frequency of the driving signal and the frequency of the touch signal may be different from each other. In the case where multiplication frequencies of the touch signal interfere with multiplication frequencies of the driving signal, a harmonic may occur. In this case, jitter noise may increase, and a ghost touch or the like may also occur. According to one or more embodiments of the present disclosure, the touch controller 234 may generate a touch signal at a desired frequency (e.g., a preset or predetermined frequency), so that a harmonic may be prevented from occurring between the frequency of the touch signal and the frequency of the driving signal.

The first oscillator 112 and the second oscillator 236 may be changed in frequency (or in cycle) in response to the temperature or the like. Here, in the case where the first oscillator 112 and the second oscillator 236 are the same or substantially the same (or similar) to each other in characteristics (e.g., physical characteristics and/or distribution), the first cycle of the first clock signal CLK1 and the second cycle of the second clock signal CLK2 may be changed at the same or substantially the same (or similar) rate as each other. In this case, a harmonic may not occur between the frequency of the touch signal and the frequency of the driving signal.

However, in the case where the first oscillator 112 and the second oscillator 236 are different from each other in characteristics, the first cycle and the second cycle may be changed at different rates from each other. In the case when the first cycle and the second cycle are changed at different rates from each other, a harmonic between the frequency of the driving signal and the frequency of the touch signal may occur in a specific band. For example, even if a touch signal is generated at a desired frequency (e.g., a preset or predetermined frequency) from the touch controller 234, a harmonic between the frequency of the touch signal and the frequency of the driving signal may occur due to a difference in the characteristics between the first oscillator 112 and the second oscillator 236, and thus, the driving reliability may deteriorate.

In an embodiment of the present disclosure, the determiner 232 may be provided in the sensor driver 220. The determiner 232 may count the cycles of the vertical synchronization signal Vsync and/or the horizontal synchronization signal Hsync using the second clock signal CLK2 supplied from the second oscillator 236, and may generate at least one count value CN (e.g., refer to FIG. 10). In the case where the count value CN is not included in (e.g., is under or over) a suitable range (e.g., a preset or predetermined range), the display device 1 may be determined to be defective. In the case where the count value CN is not included in the suitable range, the determiner 232 may supply a detection signal DTS to an external device. As such, the determiner 232 may include storage (memory, a register, or the like), in which threshold values corresponding to the suitable range are stored.

In an embodiment of the present disclosure, the touch controller 234, the determiner 232, and the second oscillator 236 may be integrated into a single IC. As another example, the touch controller 234 and the second oscillator 236 may be integrated into a single IC, and the determiner 232 may be integrated into a separate IC. As another example, the touch controller 234, the determiner 232, and at least some components of the second oscillator 236 may be integrated into a single IC.

Figure 10:
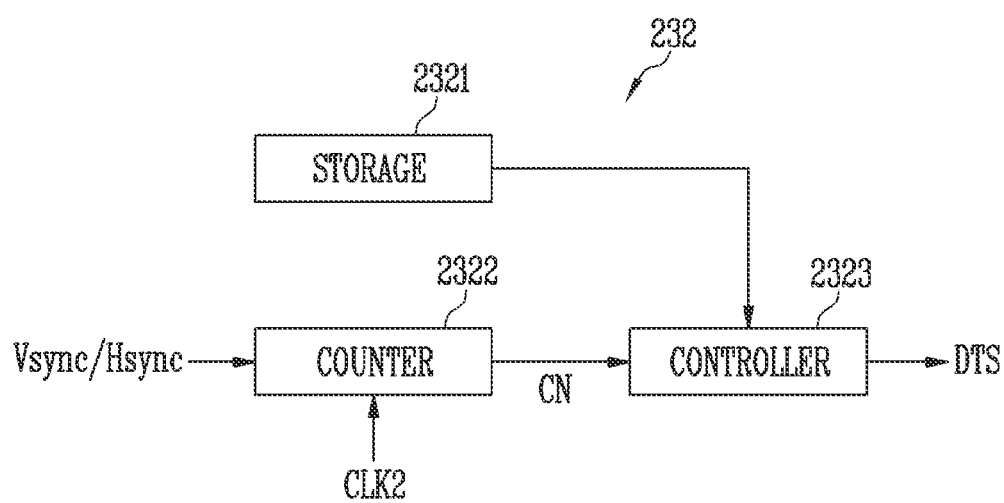
FIG. 10 is a diagram illustrating an embodiment of a determiner illustrated in FIG. 9.

FIG. 10 is a diagram illustrating an embodiment of the determiner 232 illustrated in FIG. 9.

Referring to FIG. 10, the determiner 232 may include storage 2321, a counter 2322, and a controller 2323.

Threshold values corresponding to a suitable range (e.g., a preset or predetermined range) may be stored in the storage 2321. For example, the storage 2321 may store threshold values corresponding to a first range determined (e.g., set or predetermined) in response to an enable section (e.g., a high level section) of a horizontal synchronization signal Hsync, and threshold values corresponding to a second range determined (e.g., set or predetermined) in response to a disable section (e.g., a low level section) of the horizontal synchronization signal Hsync.

The storage 2321 may store threshold values corresponding to a third range determined (e.g., set or predetermined) in response to an enable section (e.g., a high level section) of a vertical synchronization signal Vsync, and threshold values corresponding to a fourth range determined (e.g., set or predetermined) in response to a disable section (e.g., a low level section) of the vertical synchronization signal Vsync.

The counter 2322 may count, using the second clock signal CLK2, the cycles of the horizontal synchronization signal Hsync, and may output a corresponding count value CN (e.g., the number of second clock signals in the enable section, and the number of second clock signals in the disabled section).

The counter 2322 may count, using the second clock signal CLK2, the cycles of the vertical synchronization signal Vsync, and may output a corresponding count value CN (e.g., the number of second clock signals in the enable section, and the number of second clock signals in the disabled section).

The controller 2323 may determine whether the count value CN (e.g., a first count value) corresponding to the high level section of the horizontal synchronization signal Hsync or the count value CN (e.g., a second count value) corresponding to the low level section of the horizontal synchronization signal Hsync is included in the first range or the second range included in the storage 2321, and may supply a detection signal DTS corresponding to a result of the determination to the external device.

The controller 2323 may determine whether the count value CN (e.g., a third count value) corresponding to the high level section of the vertical synchronization signal Vsync or the count value CN (e.g., a fourth count value) corresponding to the low level section of the vertical synchronization signal Vsync is included in the third range or the fourth range included in the storage 2321, and may supply a detection signal DTS corresponding to a result of the determination to the external device. The controller 2323 may be replaced with the touch controller 234. In this case, the controller 2323 may be omitted.

In an embodiment, the determiner 232 may generate a count value CN in response to the horizontal synchronization signal Hsync or the vertical synchronization signal Vsync. In an embodiment, the determiner 232 may generate a count value CN in response to the horizontal synchronization signal Hsync and the vertical synchronization signal Vsync.

The controller 2323 may determine whether each of the count values CN are included in the first to fourth ranges, and may supply the detection signal to the external device in response to a result of the determination.

Figure 11:
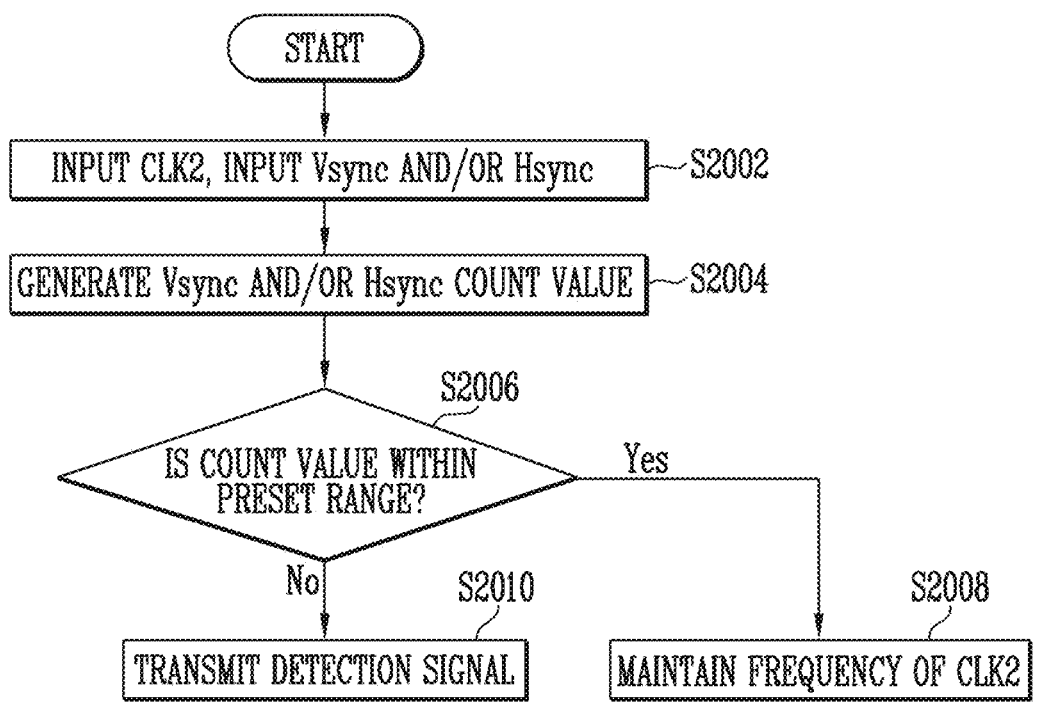
FIG. 11 is a flowchart illustrating a method of driving the driving circuit illustrated in FIGS. 9 and 10.
Figure 12:
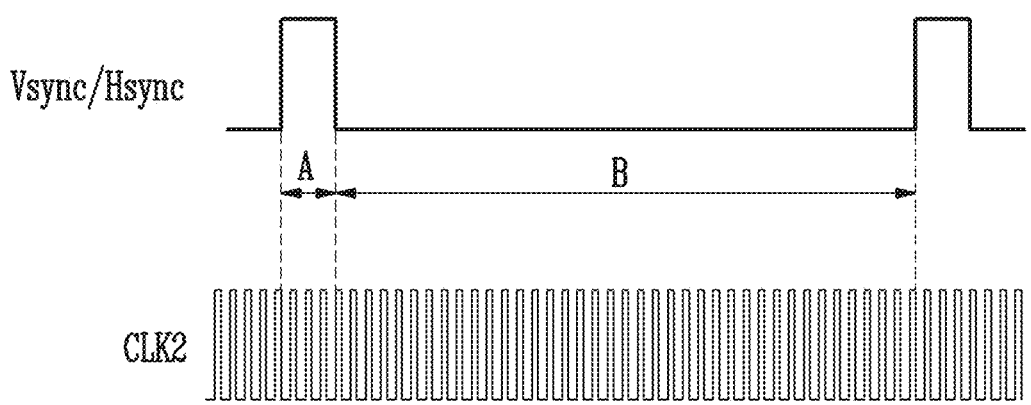
FIGS. 12-13B are diagrams illustrating a count value generation process of the determiner.
Figure 13A:
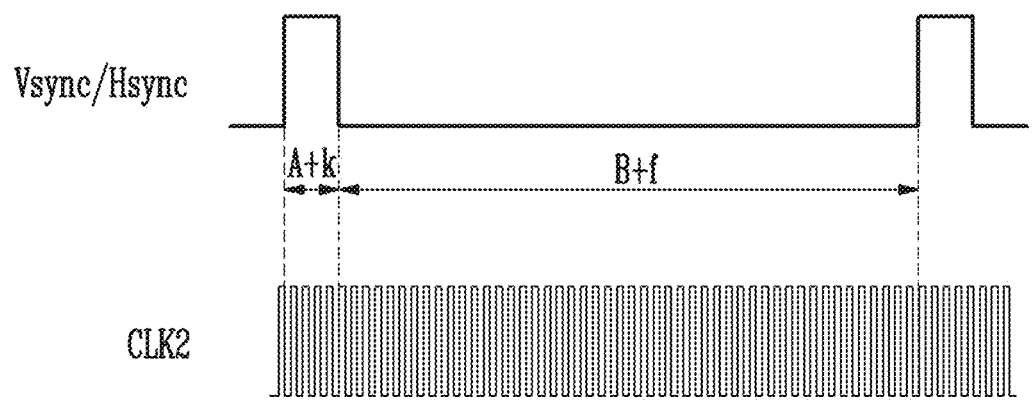
Figure 13B:
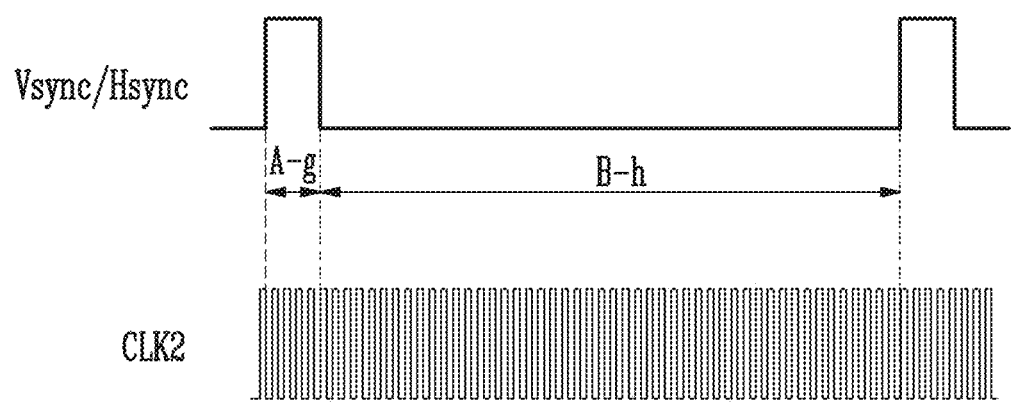

FIG. 11 is a flowchart illustrating a method of driving the driving circuit 20 illustrated in FIGS. 9 and 10. FIGS. 12 through 13B are diagrams illustrating a count value generation process of the determiner 232.

Referring to FIG. 10, the counter 2322 is supplied with a second clock signal CLK2 from the second oscillator 236 (e.g., at block S2002). The counter 2322 is supplied with a vertical synchronization signal Vsync and/or a horizontal synchronization signal Hsync from the display driver 210 (at block S2002). Hereinafter, for convenience, the driving method with reference to FIG. 10 will be described in more detail using the horizontal synchronization signal Hsync supplied to the counter 2323, but the present disclosure is not limited thereto, and the driving method with reference to FIG. 10 may use the vertical synchronization signal Vsync supplied to the counter 2323 in the same manner.

As illustrated in FIGS. 12 through 13B, the counter 2322 supplied with the horizontal synchronization signal Hsync and the second clock signal CLK2 counts the cycles of the horizontal synchronization signal Hsync using the second clock signal CLK2, and generates at least one count value CN in response to a result of the count (e.g., at block S2004).

The count value CN generated from the counter 2322 may be supplied to the controller 2323. The controller 2323 may be supplied with the threshold values corresponding to the first range and the threshold values corresponding to the second range from the storage 2321.

The controller 2323 supplied with the count value CN and the threshold values determines whether the count value CN is included in the first range or the second range (e.g., at block S2006). In the case where the count value CN is included in the suitable range, the frequency of the second clock signal CLK2 is maintained (e.g., at block S2008). Thereafter, blocks S2002 to S2006 may be repeated in real time or in each cycle.

Blocks S2004 to S2008 will be described in more detail hereinafter. The counter 2322 may count the second clock signal CLK2 during the high level section of the horizontal synchronization signal Hsync (e.g., a section in which a high level voltage is supplied), as illustrated in FIG. 12, and may generate a count value (CN) "A" (e.g., where "A" is a natural number). Furthermore, the counter 2322 may count the second clock signal CLK2 during the low level section of the horizontal synchronization signal Hsync (e.g., a section in which a low level voltage is supplied), as illustrated in FIG. 12, and generate a count value (CN) "B" (e.g., "B" is a natural number). Here, the count value (CN) "A" and the count value (CN) "B" may have values included in the suitable range. In the case where the count value CN is included in the suitable range, the cycle of the first oscillator 112 and the cycle of the second oscillator 236 may be changed at a similar or the same or substantially the same rate as each other, so that a harmonic may be prevented from occurring between the frequency of the touch signal and the frequency of the driving signal. In the case where the count values (CN) "A" and "B" are included in the suitable range, the frequency of the second clock signal CLK2 is maintained.

In the case where the count value CN generated from the counter 2322 is not included in the suitable range, the controller 2323 may supply a detection signal DTS to an external test device (e.g., at block S2010). Here, the detection signal DTS may be supplied to the external test device during a processing operation of the display device 1. In the case where the detection signal DTS is supplied, the display device 1 may be determined to be defective. In other words, in an embodiment of the present disclosure, a defect due to a difference in the characteristics between the first oscillator 112 and the second oscillator 236 may be detected during the processing operation. Accordingly, the driving reliability may be secured.

Blocks S2004, S2006, and S2010 will be described in more detail hereinafter. The counter 2322 may count the second clock signal CLK2 during the high level section of the horizontal synchronization signal Hsync, as illustrated in FIGS. 13A and 13B, and may generate a count value (CN) "A+k" (e.g., where "k" is a natural number) or "A-g" (e.g., where "g" is a natural number). Furthermore, the counter 2322 may count the second clock signal CLK2 during the low level section of the horizontal synchronization signal Hsync, and generate a count value (CN) "B+f" (e.g., where "f" is a natural number) or "B-h" (e.g., where "h" is a natural number).

Referring to FIG. 13A, the controller 2323 may determine whether the count value CN "A+k" generated during the high level section of the horizontal synchronization signal Hsync is included in the first range. Furthermore, the controller 2323 may determine whether the count value CN "B+f" generated during the low level section of the horizontal synchronization signal Hsync is included in the second range. In the case where the count value CN "A+k" or the count value CN "B+f" is not included in the suitable range, the controller 2323 may generate a detection signal DTS, and may supply the detection signal DTS to the external device.

Referring to FIG. 13B, the controller 2323 may determine whether the count value CN "A-g" generated during the high level section of the horizontal synchronization signal Hsync is included in the suitable range. Furthermore, the controller 2323 may determine whether the count value CN "B-h" generated during the low level section of the horizontal synchronization signal Hsync is included in the suitable range. In the case where the count value CN "A-g" or the count value CN "B-h" is not included in the suitable range, the controller 2323 may generate a detection signal DTS, and may supply the detection signal DTS to the external device.

As described above, the first cycle of the first clock signal CLK1 and the second cycle of the second clock signal CLK2 may be changed in response to a change in temperature. In the case where the first cycle of the first clock signal CLK1 is changed, the frequency (e.g., the horizontal synchronization signal Hsync) of the driving signal may be changed. Furthermore, in the case where the second cycle of the second clock signal CLK2 is changed, the frequency of the touch signal may be changed.

The count value CN generated from the counter 2322 may be generated by counting the cycles of the horizontal synchronization signal Hsync using the second clock signal CLK2. Therefore, a change rate of the first cycle and the second cycle may be determined using the count value CN. Accordingly, whether or not a harmonic has occurred between the frequency of the touch signal and the frequency of the driving signal may be determined.

Figure 14:
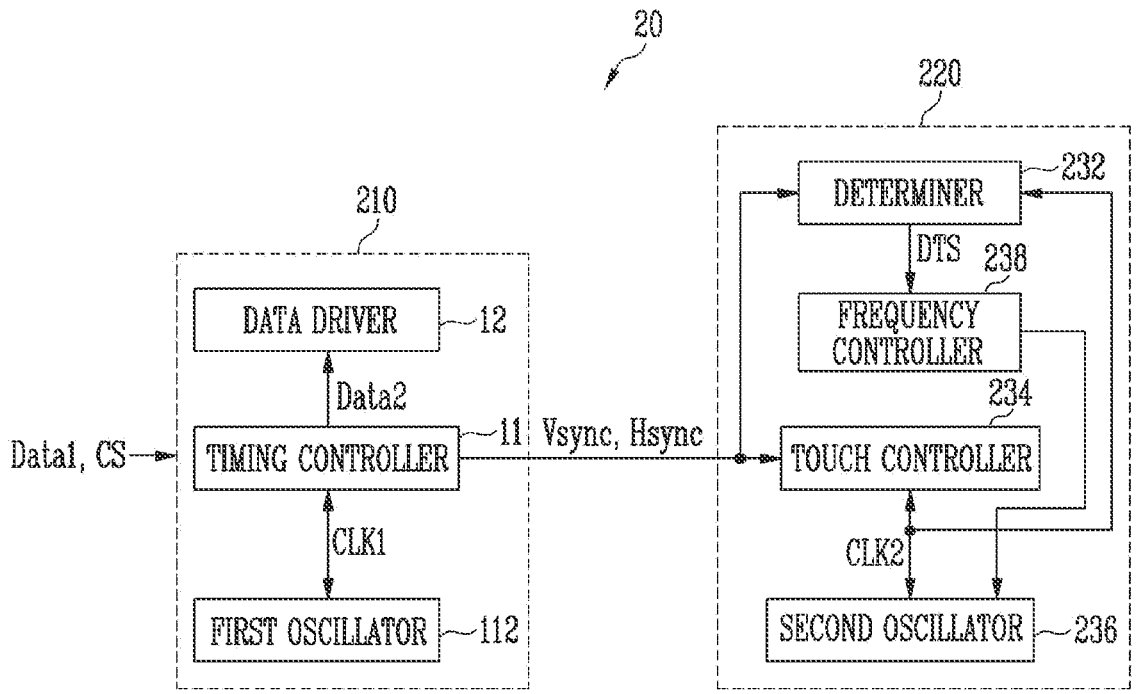
FIG. 14 is a diagram illustrating the driving circuit in accordance with an embodiment of the present disclosure.

FIG. 14 is a diagram illustrating a driving circuit 20 in accordance with an embodiment of the present disclosure. In the following description with reference to FIG. 14, the same reference numerals are used to designate the same or substantially the same components as those described above with reference to FIG. 9, and thus, redundant description thereof may not be repeated.

Referring to FIG. 14, the driving circuit 20 may include a display driver 210 and a sensor driver 220.

The sensor driver 220 may include a determiner (e.g., a determination circuit) 232, a touch controller 234, a second oscillator 236, and a frequency controller 238.

The frequency controller 238 may change the frequency of the second oscillator 236 in a case where the detection signal DTS is input from the determiner 232. Here, the frequency controller 238 may change the frequency of the second oscillator 236, such that the count value CN may be included in a suitable range (e.g., a preset or predetermined) range. As such, the detection signal DTS may include information about whether the count value CN is a value less than the suitable range, or a value greater than the suitable range.

In the case where the frequency of the second oscillator 236 is changed, the count value CN generated from the counter 2322 may be included in the suitable range. In this case, the supply of the detection signal DTS from the determiner 232 to the frequency controller 238 may be interrupted. In the case where the detection signal DTS is not supplied, the frequency controller 238 may maintain a current frequency of the second oscillator 236, rather than changing the frequency of the second oscillator 236. For example, the frequency controller 238 may be implemented in a separate or in at least one of the other ICs of the sensor driver 220.

Figure 15:
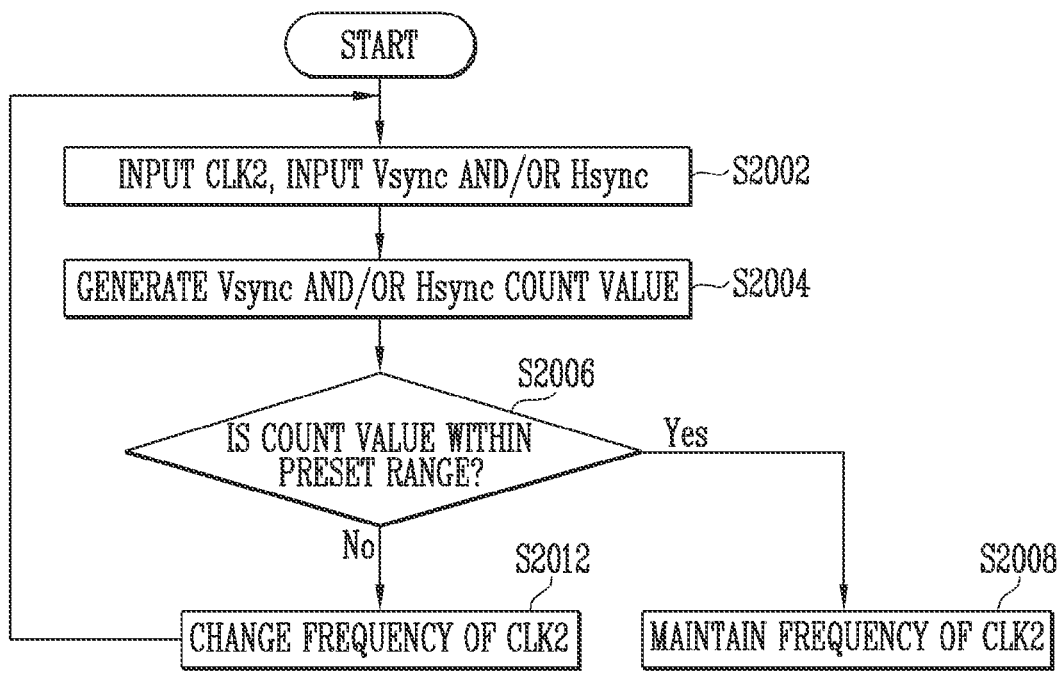
FIG. 15 is a flowchart illustrating a method of driving the driving circuit illustrated in FIG. 14.
Figure 16A:
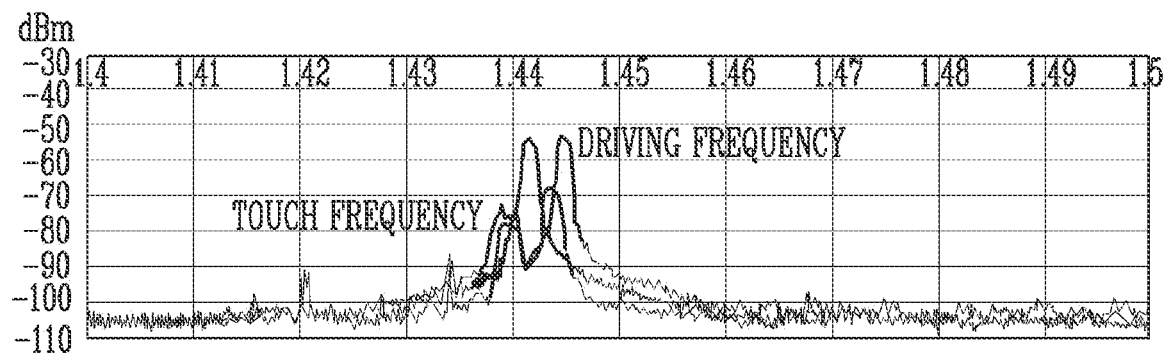
FIGS. 16A and 16B are diagrams illustrating a result of a simulation by the driving method of FIG. 15.
Figure 16B:
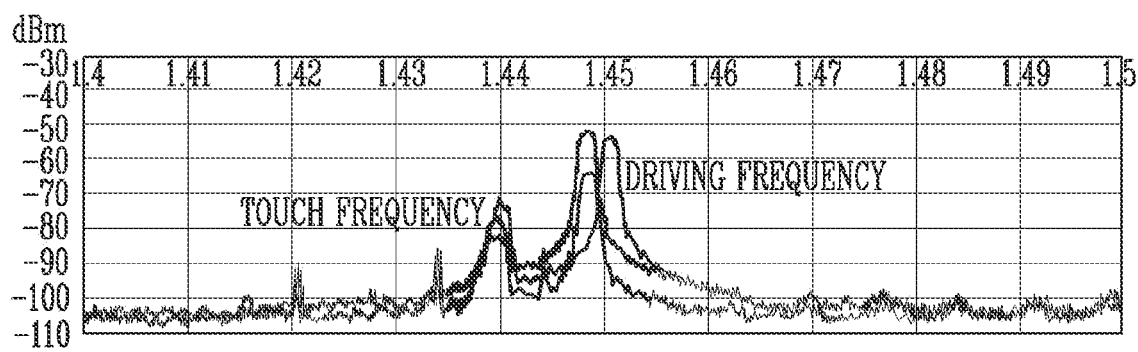

FIG. 15 is a flowchart illustrating a method of driving the driving circuit 20 illustrated in FIG. 14. FIGS. 16A and 16B are diagrams illustrating a result of a simulation by the driving method of FIG. 15. In the following description with reference to FIG. 15, the same reference numerals are used to designate the same or substantially the same processes as those described above with reference to FIG. 11, and thus, redundant description thereof may not be repeated.

Referring to FIGS. 10, 14, and 15, the counter 2322 may be supplied with a second clock signal CLK2, and a vertical synchronization signal Vsync, and/or a horizontal synchronization signal Hsync (e.g., at block S2002). The counter 2322 supplied with the second clock signal CLK2 may count the cycles of the vertical synchronization signal Vsync and/or the horizontal synchronization signal Hsync using the second clock signal CLK2, and may generate at least one count value CN in response to a result of the count (e.g., at block S2004).

The count value CN generated from the counter 2322 may be supplied to the controller 2323. The controller 2323 determines, using the threshold values supplied from the storage 2321, whether the count value CN is included in the suitable range (e.g., at block S2006). In the case where the count value CN is included in the suitable range, the frequency of the second clock signal CLK2 is maintained (e.g., at block S2008).

In the case where the count value CN generated from the counter 2322 is not included in the suitable range, the controller 2323 may supply the detection signal DTS to the frequency controller 238. The frequency controller 238 supplied with the detection signal DTS may control the second oscillator 236, and may change the frequency of the second clock signal CLK2 (e.g., at block S2012). After the frequency of the second clock signal CLK2 is changed, blocks S2002, S2004, and S2006 may be repeated. At block S2006, in the case where the count value CN is included in the suitable range, the frequency of the second clock signal CLK2 is maintained (e.g., block S2008). In an embodiment, blocks S2002, S2004, S2006, and S2012 may be repeated until the count value CN is included in the suitable range (e.g., at block S2006).

At block S2006, in the case where the count value CN is included in the suitable range, the detection signal DTS may not be supplied to the frequency controller 238, so that the frequency of the second clock signal CLK2 may be maintained.

In an embodiment, the frequency controller 238 may be replaced with the touch controller 234 or the controller 2323. In other words, the function of the frequency controller 238 may be integrated into the controller 2323, or may be integrated into the touch controller 234.

In accordance with an embodiment of the present disclosure, in the case where the cycle of the vertical synchronization signal Vsync and/or the horizontal synchronization signal Hsync is changed (e.g., is not included in the suitable range) in response to a change in temperature, the driving circuit 20 may change the frequency of the second clock signal CLK2 in response to the change in the cycle of the vertical synchronization signal Vsync and/or the horizontal synchronization signal Hsync. In this case, the frequency of the touch signal may be changed at a rate at which the frequency of the driving signal is changed, so that a harmonic may be prevented from occurring between the frequency of the touch signal and the frequency of the driving signal.

Because the cycle of the vertical synchronization signal Vsync and/or the horizontal synchronization signal Hsync is changed in response to a change in temperature, the count value CN may not be included in the suitable range. Here, if the frequency of the second clock signal CLK2 is not changed, a harmonic may occur between the frequency of the driving signal and the frequency of the touch signal, for example, as illustrated in FIG. 16A.

However, in an embodiment of the present disclosure, in the case where the count value CN is not included in the suitable range by a change in a cycle of the vertical synchronization signal Vsync and/or the horizontal synchronization signal Hsync, the frequency of the second clock signal CLK2 may be changed. For example, the frequency of the second clock signal CLK2 may be changed, such that the count value CN is included in the suitable range. When the frequency of the second clock signal CLK2 is changed so that the count value CN is included in the suitable range, a harmonic may be prevented from occurring between the frequency of the driving signal and the frequency of the touch signal, for example, as illustrated in FIG. 16B.

Figure 17A:
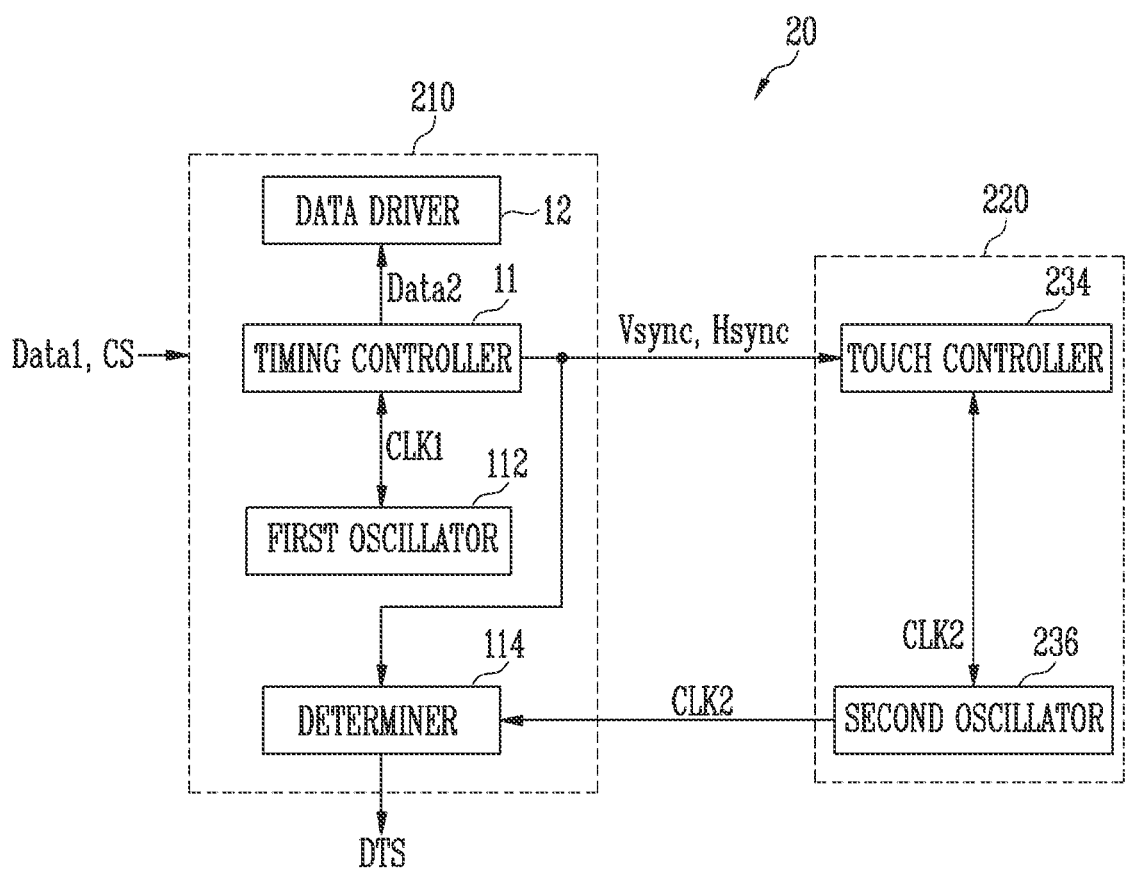
FIGS. 17A-17C are diagrams illustrating a driving circuit in accordance with one or more embodiments of the present disclosure.
Figure 17B:
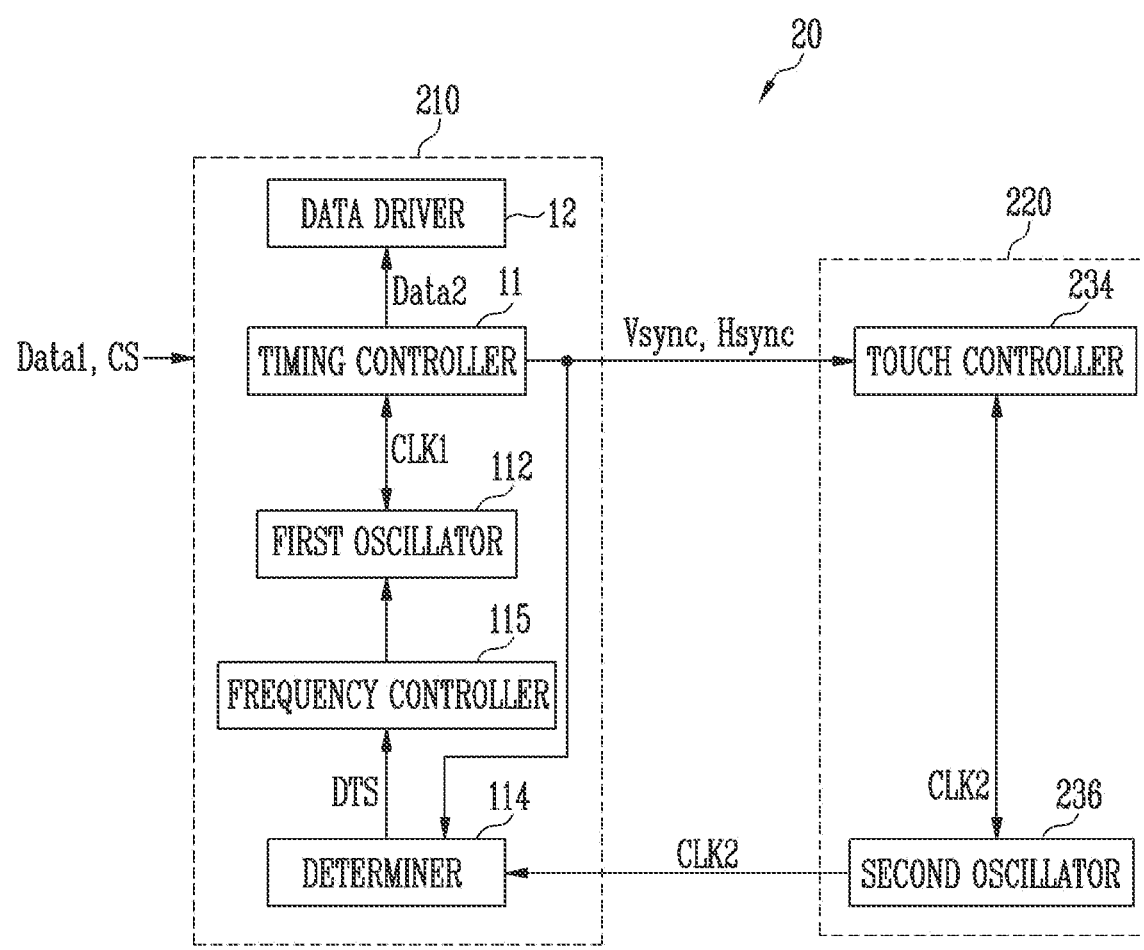
Figure 17C:
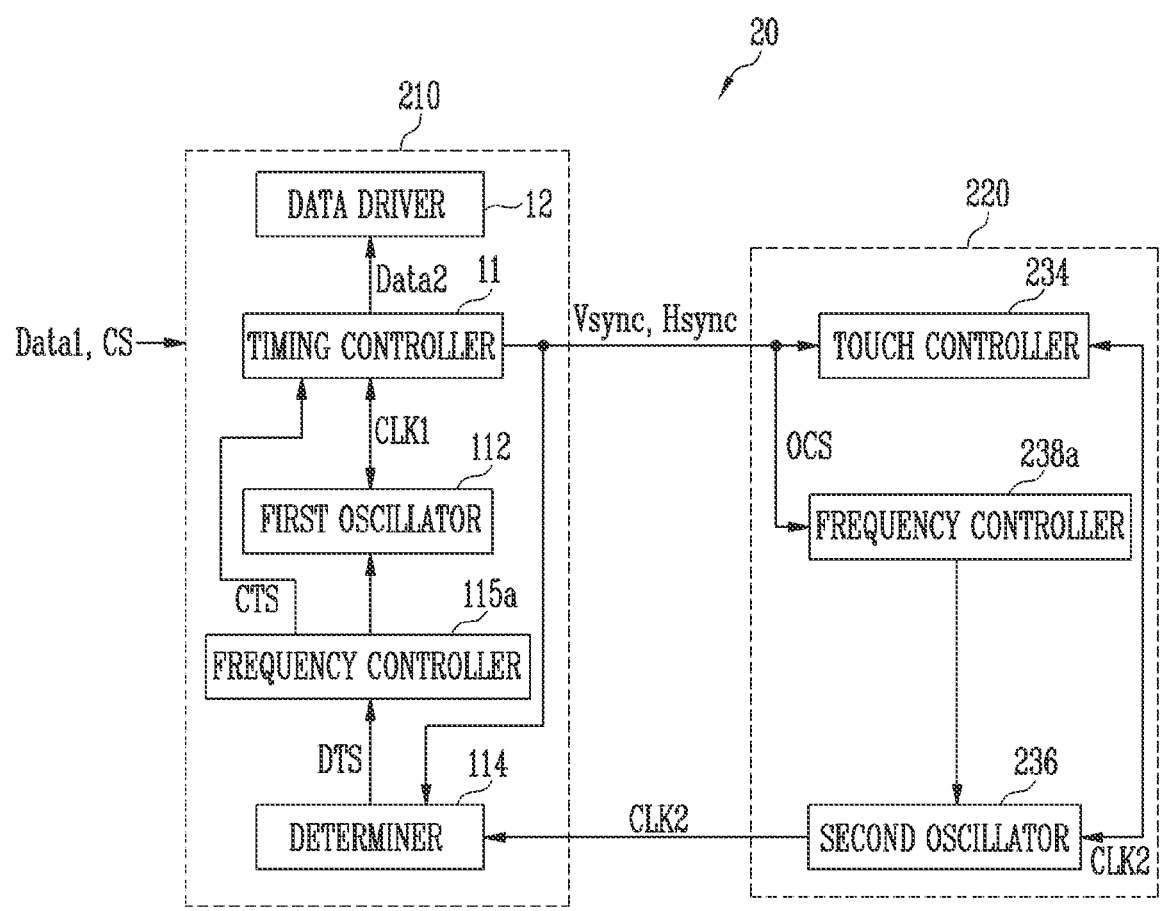

FIGS. 17A through 17C are diagrams illustrating a driving circuit 20 in accordance with one or more embodiments of the present disclosure. The general configuration of the driving circuit 20 of FIG. 17A may be similar to that of FIG. 9, except that components of the determiner 114 may be included in the display driving component 210. The general configuration of the driving circuit 20 of each of FIGS. 17B and 17C may be similar to that of FIG. 14, except that components of the determiner 114 and the frequency controller 115 may be included in the display driving component 210. In the following description of FIGS. 17A to 17C, the same reference numerals are used to designate the same or substantially the same (or similar) components as those described above with reference to FIGS. 9 to 14, and thus, redundant description thereof may not be repeated.

Referring to FIG. 17A, the driving circuit 20 in accordance with an embodiment of the present disclosure may include a display driver 210 and a sensor driver 220.

The sensor driver 220 may include a touch controller 234 and a second oscillator 236.

The display driver 210 may include a timing controller 11, a data driver 12, a first oscillator 112, and a determiner (e.g., a determination circuit) 114. Here, the first oscillator 112 and/or the determiner 114 may be included in the timing controller 11. However, for convenience, the first oscillator 112 and the determiner 114 are illustrated as being located outside the timing controller 11.

The determiner 114 may have the same or substantially the same configuration as that of the determiner 232 illustrated in FIG. 10. The determiner 114 may be supplied with a second clock signal CLK2 from the second oscillator 236, and may be supplied with a vertical synchronization signal Vsync and/or a horizontal synchronization signal Hsync from the timing controller 11. The determiner 114 may count the cycles of the vertical synchronization signal Vsync and/or the horizontal synchronization signal Hsync using the second clock signal CLK2, and may generate a count value CN. In the case where the count value CN is not included in the suitable range, the determiner 114 may generate a detection signal DTS. The detection signal DTS generated from the determiner 114 may be supplied to an external test device. In the case where the detection signal DTS is supplied, the display device 1 may be determined to be defective. In other words, in an embodiment of the present disclosure, a defect due to a difference in the characteristics between the first oscillator 112 and the second oscillator 236 may be detected during the processing operation. Accordingly, the driving reliability may be secured.

Referring to FIG. 17B, the driving circuit 20 in accordance with an embodiment of the present disclosure may include a display driver 210 and a sensor driver 220.

The sensor driver 220 may include a touch controller 234 and a second oscillator 236.

The display driver 210 may include a timing controller 11, a data driver 12, a first oscillator 112, a determiner (e.g., a determination circuit) 114, and a frequency controller 115 (e.g., a first frequency controller). Here, the first oscillator 112, the determiner 114, and/or the frequency controller 115 may be included in the timing controller 11. However, for convenience, the first oscillator 112, the determiner 114, and/or the frequency controller 115 are illustrated as being located outside the timing controller 11.

The determiner 114 may have the same or substantially the same configuration as that of the determiner 232 illustrated in FIG. 10. The determiner 114 may be supplied with a second clock signal CLK2 from the second oscillator 236, and may be supplied with a vertical synchronization signal Vsync and/or a horizontal synchronization signal Hsync from the timing controller 11. The determiner 114 may count the cycles of the vertical synchronization signal Vsync and/or the horizontal synchronization signal Hsync using the second clock signal CLK2, and may generate a count value CN. In the case where the count value CN is not included in the suitable range, the determiner 114 may generate a detection signal DTS. The detection signal DTS generated from the determiner 114 may be supplied to the frequency controller 115.

The frequency controller 115 may control the first oscillator 112 when the detection signal DST is supplied thereto, and may change the frequency of the first clock signal CLK1. For example, the frequency controller 115 may change the frequency of the first clock signal CLK1, such that the count value CN may be included in the suitable range. As such, the detection signal DTS may include information about whether the count value CN is a value less than the suitable range, or a value greater than the suitable range. When the frequency controller 115 changes the frequency of the first clock signal CLK1 such that count value CN may be included in the suitable range, a harmonic may be prevented from occurring between the frequency of the touch signal and the frequency of the driving signal.

In an embodiment, the frequency controller 115 may be replaced with the timing controller 11. In other words, the function of the frequency controller 115 may be implemented in the timing controller 11. In this case, the detection signal DTS may be supplied to the timing controller 11.

In an embodiment of the present disclosure, in the case where the count value CN is not included in the suitable range (e.g., in the case where the detection signal DTS is generated), the frequencies of the first clock signal CLK1 and the second clock signal CLK2 may be changed. This will be described in more detail hereinafter with reference to FIG. 17C, and redundant description of the same or substantially the same components as those described above with reference to FIG. 17B may not be repeated.

Referring to FIG. 17C, a frequency controller 115a (e.g., a first frequency controller) may control the first oscillator 112 when the detection signal DST is supplied thereto, and may change the frequency of the first clock signal CLK1. Furthermore, the frequency controller 115a may generate a control signal CTS when the detection signal DTS is supplied thereto, and may supply the generated control signal CTS to the timing controller 11. The timing controller 11 supplied with the control signal CTS may supply an oscillation change signal OCS (e.g., a signal the same or substantially the same as the detection signal DTS) to a frequency controller 238a (e.g., a second frequency controller).

The frequency controller 238a supplied with the oscillation change signal OCS may control the second oscillator 236, and may change the frequency of the second clock signal CLK2. In an embodiment, the frequency controller 115a may change the frequency of the first clock signal CLK1, such that the count value CN may be included in the suitable range. The frequency controller 238a may change the frequency of the second clock signal CLK2, such that the count value CN may be included in the suitable range. In the case where the frequencies of the first oscillator 112 and the second oscillator 236 are changed, the frequency of the touch signal and the frequency of the driving signal may be changed, so that a harmonic may be prevented from occurring between the frequency of the touch signal and the frequency of the driving signal.

In an embodiment, the frequency controller 115a may be replaced with the timing controller 11. In other words, the function of the frequency controller 115 may be implemented in the timing controller 11. In this case, the detection signal DTS may be supplied to the timing controller 11.

In an embodiment, the frequency controller 238a may be replaced with the touch controller 234. In other words, the function of the frequency controller 238a may be implemented in the touch controller 234. In this case, the oscillation change signal OCS may be supplied to the touch controller 11.

Figure 18:
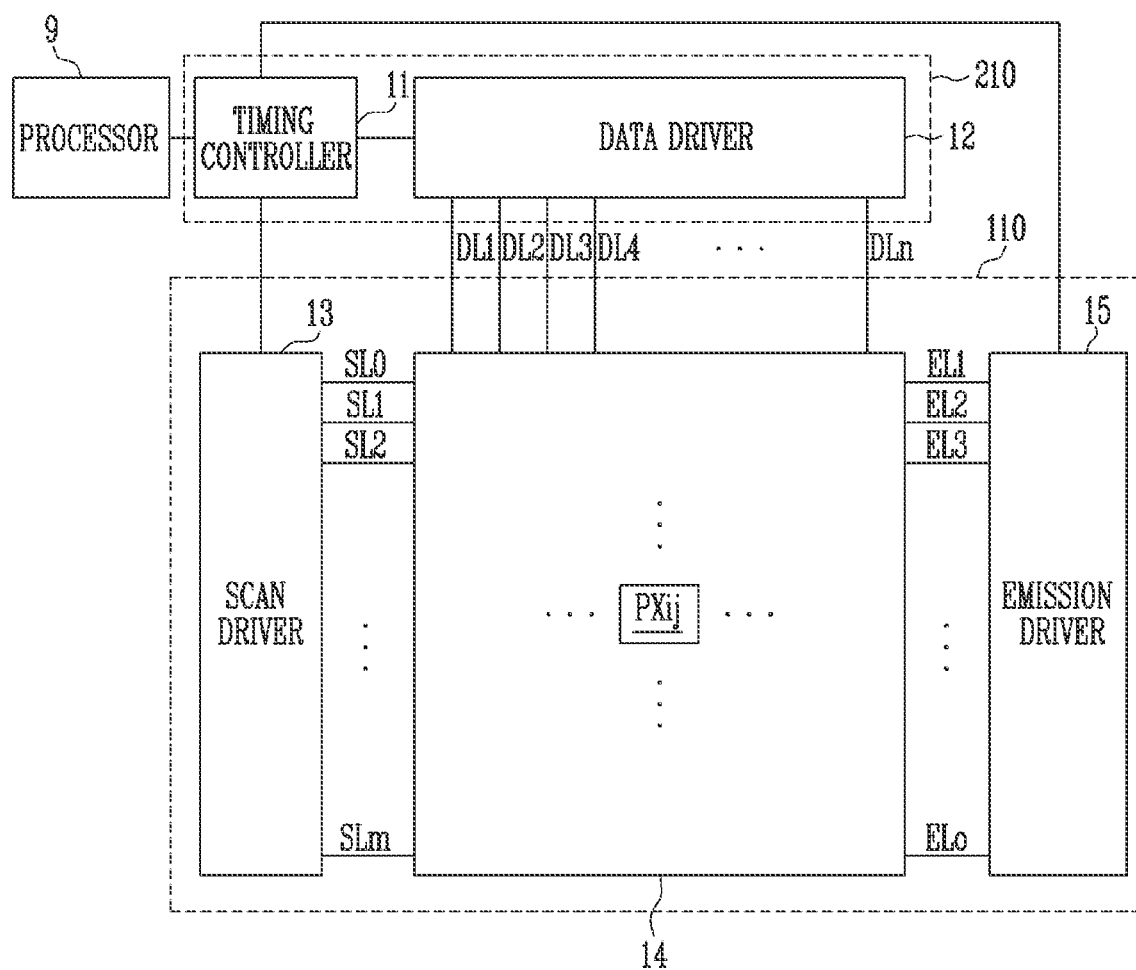
FIG. 18 is a diagram illustrating a display component and a display driver in accordance with an embodiment of the present disclosure.

FIG. 18 is a diagram illustrating a display component 110 and a display driver 210 in accordance with an embodiment of the present disclosure.

Referring to FIG. 18, the display driver 210 may include a timing controller 11 and a data driver 12. The display component 110 may include a scan driver 13 and an emission driver 15. Here, as described above, the configurations of the foregoing functional components pertaining to, for example, whether to integrate the foregoing functional components on one IC or a plurality of ICs, or whether to mount the functional components on a display substrate 111, may be variously modified depending on specifications of the display device 1. In addition, the timing controller 11 may include components including the first oscillator 112, the determiner 114, and the frequency controller 115, 115a illustrated in FIGS. 17A to 17C.

The timing controller 11 may receive, from the processor 9, grayscale signals (e.g., the first data Data1 illustrated in FIG. 9) and timing signals (e.g., the control signal CS illustrated in FIG. 9) for each display frame period. The processor 9 may correspond to at least one of a graphics processing unit (GPU), a central processing unit (CPU), an application processor (AP), or the like. For example, the processor 9 may correspond to the application processor 30 of FIG. 1.

The grayscale signals may be supplied on a horizontal line basis during each horizontal period. The horizontal line may refer to pixels (e.g., a pixel row) connected to the same scan line as each other.

The timing controller 11 may render the grayscale signals in consideration of the specifications of the display device 1 (or the pixel component 14). For example, the processor 9 may provide a red grayscale signal, a green grayscale signal, and a blue grayscale signal for each unit dot. For example, in the case in which the pixel component 14 has an RGB stripe structure, pixels may correspond one to one with the respective grayscale signals. In this case, rendering of the grayscale signals may be unnecessary. However, for example, in the case where the pixel circuit 14 has a RGBG type structure (e.g., a PENTILE® structure), because adjacent unit dots may share a pixel, the pixels may not correspond one to one with the respective grayscale signals. In this case, rendering of the grayscale signals may be desired. Rendered or unrendered grayscale signals (e.g., the second data Data2 shown in FIG. 9) may be provided to the data driver 12. Furthermore, the timing controller 11 may provide a data control signal to the data driver 12.

The data driver 12 may generate, using the grayscale signals and the data control signal that are received from the timing controller 11, data voltages (e.g., data signals) to be provided to data lines DL1, DL2, DL3, . . . , and DLn.

The scan driver 13 may generate scan signals to be provided to the scan lines SL0 to SLm (e.g., where m is a natural number), using a clock signal, a scan start signal, and the like that are received from the timing controller 11. The scan driver 13 may sequentially supply the scan signals, each having a turn-on level pulse, to the scan lines SL0 to SLm. For example, the scan driver 13 may supply the scan signals, each having a turn-on level, to the scan lines at a cycle corresponding to the cycle of the horizontal synchronization signal Hsync during an active period during which the grayscale signals are supplied. The scan driver 13 may include scan stages configured in the form of a shift register. The scan driver 13 may generate the scan signals in such a way as to sequentially transmit a scan start signal having a turn-on level pulse to a subsequent scan stage under the control of a clock signal.

The emission driver 15 may generate, using emission control signals (e.g., a clock signal, an emission stop signal, and the like) received from the timing controller 11, emission signals to be provided to the emission lines EL1 to ELo (e.g., where o is a natural number). The emission driver 15 may sequentially supply the emission signals, each having a turn-on level pulse, to the emission lines EL1 to ELo. The emission driver 15 may include emission stages, each of which is configured in the form of a shift register. The emission driver 15 may generate emission signals in such a way as to sequentially transmit an emission stop signal having a turn-off level pulse to a subsequent emission stage under the control of a clock signal.

The pixel component 14 includes pixels PX. Each of the pixels PX may be connected to a corresponding data line and a corresponding scan line. For example, the pixel PXij may be connected to an i-th scan line and a j-th data line. The pixels may include pixels configured to emit a first color of light, pixels configured to emit a second color of light, and pixels configured to emit a third color of light. The first color, the second color, and the third color may be different colors from each other. For example, the first color may be one of red, green, or blue. The second color may be one of red, green, or blue, and may be different from that of the first color. The third color may be the remaining color from among red, green, and blue. Furthermore, in lieu of red, green, and blue, magenta, cyan, and yellow may be used as the first to third colors.

Figure 19:
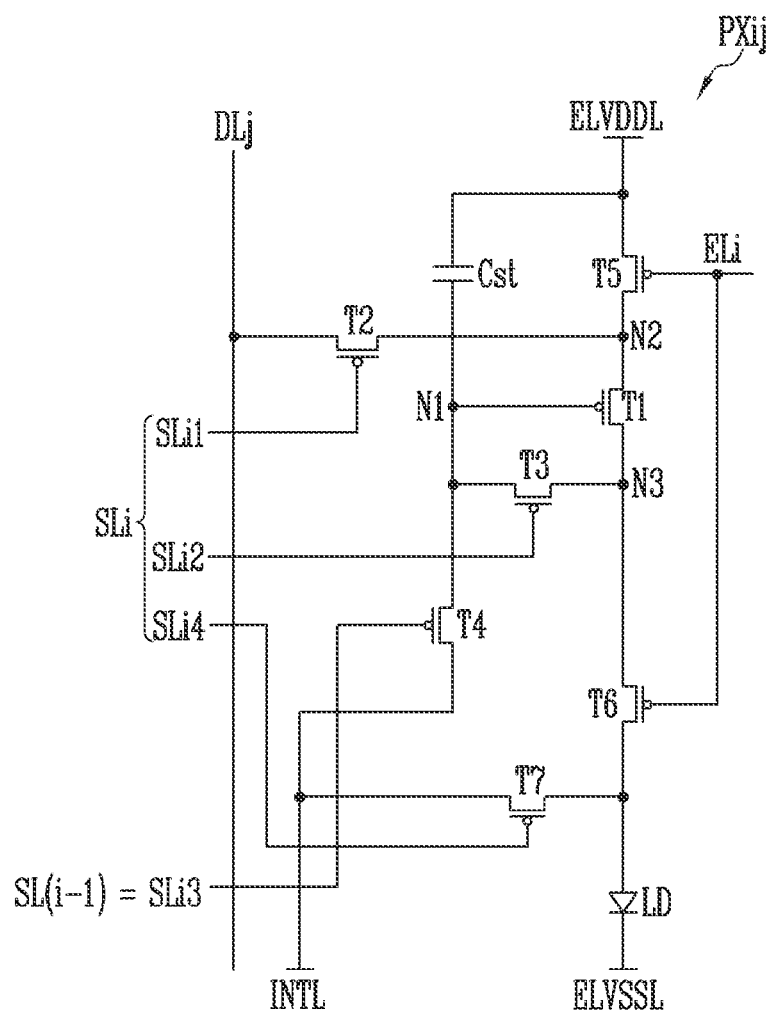
FIG. 19 is a diagram illustrating an embodiment of a pixel included in the display component of FIG. 18.

FIG. 19 is a diagram illustrating a pixel PXij in accordance with an embodiment of the present disclosure.

Referring to FIG. 19, the pixel PXij includes transistors T1, T2, T3, T4, T5, T6, and T7, a storage capacitor Cst, and a light emitting element LD.

Hereinafter, a circuit configured of P-type transistors will be described in more detail by way of example. However, those skilled in the art may understand how to design a circuit configured of N-type transistors by changing the polarity of the voltage to be applied to a gate terminal of each transistor. Likewise, those skilled in the art may understand how to design a circuit configured of a combination of a P-type transistor and an N-type transistor. Each transistor may be configured in various suitable forms, such as a thin film transistor (TFT), a field effect transistor (FET), and/or a bipolar junction transistor (BJT).

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode connected to a scan line SLi1, a first electrode connected to a data line DLj, and a second electrode connected to the second node N2. The second transistor T2 may be referred to as a scan transistor.

The third transistor T3 may include a gate electrode connected to a scan line SLi2, a first electrode connected to the first node N1, and a second electrode connected to the third node N3. The third transistor T3 may be referred to as a diode connection transistor.

The fourth transistor T4 may include a gate electrode connected to a scan line SLi3, a first electrode connected to the first node N1, and a second electrode connected to an initialization line INTL. The fourth transistor T4 may be referred to as a gate initialization transistor.

The fifth transistor T5 may include a gate electrode connected to an i-th emission line ELi, a first electrode connected to a first power line ELVDDL, and a second electrode connected to the second node N2. The fifth transistor T5 may be referred to as an emission transistor. In an embodiment, the gate electrode of the fifth transistor T5 may be connected to an emission line different from the emission line to which a gate electrode of the sixth transistor T6 is connected.

The sixth transistor T6 may include the gate electrode connected to the i-th emission line ELi, a first electrode connected to the third node N3, and a second electrode connected to an anode of the light emitting element LD. The sixth transistor T6 may be referred to as an emission transistor. In an embodiment, the gate electrode of the sixth transistor T6 may be connected to an emission line different from the emission line to which a gate electrode of the fifth transistor T5 is connected.

The seventh transistor T7 may include a gate electrode connected to a scan line SLi4, a first electrode connected to the initialization line INTL, and a second electrode connected to the anode of the light emitting element LD. The seventh transistor T7 may be referred to as a light-emitting-element initialization transistor.

The storage capacitor Cst may include a first electrode connected to the first power line ELVDDL, and a second electrode connected to the first node N1.

The light emitting element LD may include the anode connected to the second electrode of the sixth transistor T6, and a cathode connected to a second power line ELVSSL. The light emitting element LD may be a light emitting diode. The light emitting element LD may be formed of an organic light emitting diode, an inorganic light emitting diode, a quantum dot/well light emitting diode, or the like. The light emitting element LD may emit light having any one of a first color, a second color, and a third color. Although FIG. 9 illustrates that one light emitting element LD may provided in each pixel, a plurality of light emitting elements may be provided in each pixel in some other embodiments. Here, the plurality of light emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. For example, the first power voltage may be greater than the second power voltage. For example, the initialization voltage may be the same as or greater than the second power voltage. For example, the initialization voltage may correspond to the lowest data voltage from among the data voltages that may be provided. In an embodiment, the magnitude of the initialization voltage may be less than the magnitudes of the data voltages that may be provided.

Figure 20:
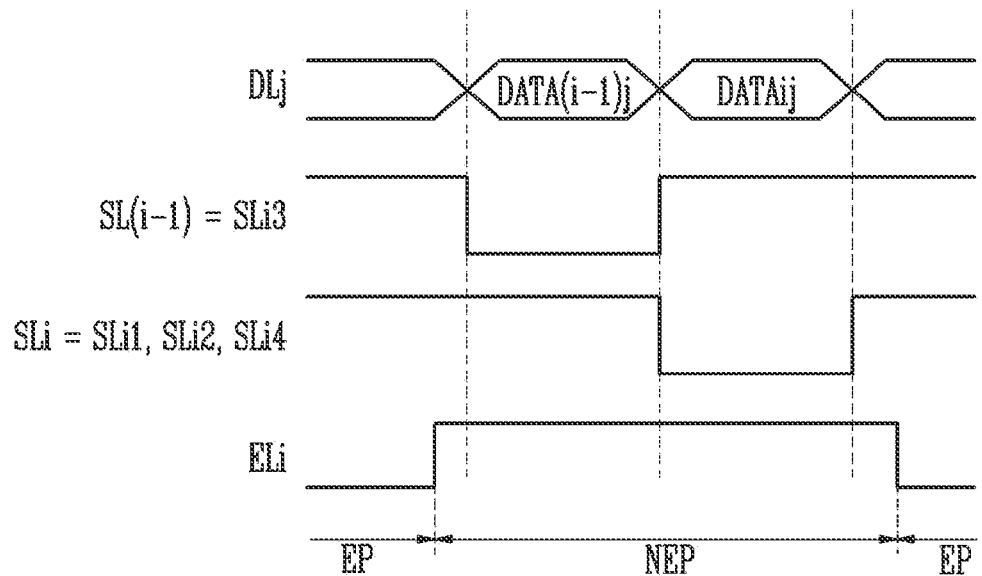
FIG. 20 is a waveform diagram illustrating a method of driving the pixel illustrated in FIG. 19.

FIG. 20 is a waveform diagram illustrating a method of driving the pixel of FIG. 19.

Hereinafter, for convenience, the scan lines SLi1, SLi2, and SLi4 may be referred to as an i-th scan line SLi, and that the scan line SLi3 may be referred to as an i−1-th scan line SL(i−1). Here, a connection relationship between the scan lines SLi1, SLi2, SLi3, and SLi4 may be changed in various suitable ways depending on embodiments. For example, the scan line SLi4 may be an i−1-th scan line or an i+1-th scan line.

First, an emission signal having a turn-off level (e.g., a logic high level) may be applied to the i-th emission line ELi. A data voltage DATA(i−1)j for an i−1-th pixel may be applied to the data line DLj. A scan signal having a turn-on level (e.g., a logic low level) may be applied to the scan line SLi3. Whether the logic level is high or low may be variously changed depending on whether the transistor is a P-type or an N-type.

Here, because a scan signal having a turn-off level is applied to the scan lines SLi1 and SLi2, the second transistor T2 is turned off, so that the data voltage DATA(i−1)j for the i−1-th pixel may be prevented from being drawn into the pixel PXij.

Here, because the fourth transistor T4 is turned on, the first node N1 is connected to the initialization line INTL, and the voltage of the first node N1 is initialized. Because an emission signal having a turn-off level is applied to the emission line Eli, the transistors T5 and T6 are turned off, and the light emitting element LD may be prevented from being unnecessarily operated during an initialization voltage application process.

Next, a data voltage DATAij for the i-th pixel PXij is applied to the data line DLj, and a scan signal having a turn-on level is applied to the scan lines SLi1 and SLi2. Thus, the transistors T2, T1, and T3 enter a state capable of conducting electricity, and the data line DLj and the first node N1 are electrically connected to each other. Therefore, a compensation voltage obtained by subtracting a threshold voltage of the first transistor T1 from the data voltage DATAij is applied to the second electrode (e.g., the first node N1) of the storage capacitor Cst. The storage capacitor Cst may maintain a voltage corresponding to the difference between the first power voltage and the compensation voltage during a period. The period may be referred to as a threshold voltage compensation period or a data write period.

Furthermore, in the case in which the scan line SLi4 is an i-th scan line, the seventh transistor T7 is turned on, so that the anode of the light emitting element LD and the initialization line INTL may be connected to each other, and the light emitting element LD may be initialized to the amount of charges corresponding to the difference between the initialization voltage and the second power voltage.

Thereafter, as an emission signal having a turn-on level is applied to the i-th emission line ELi, the transistors T5 and T6 may conduct electricity. Therefore, a driving current path that connects the first power line ELVDDL, the fifth transistor T5, the first transistor T1, the sixth transistor T6, the light emitting element LD, and the second power line ELVSSL to one another may be formed.

The amount of driving current that flows through the first electrode and the second electrode of the first transistor T1 may be adjusted in response to the voltage maintained in the storage capacitor Cst. The light emitting element LD may emit light having a desired luminance corresponding to the amount of driving current. The light emitting element LD may emit light until an emission signal having a turn-off level is applied to the emission line ELi When the emission signal is at a turn-on level, pixels that receive the corresponding emission signal may be in a display state. Therefore, the period during which the emission signal is at a turn-on level may be referred to as an emission period EP (e.g., an emission enable period). Furthermore, when the emission signal is at a turn-off level, pixels that receive the corresponding emission signal may be in a non-display state. Therefore, the period during which the emission signal is at a turn-off level may be referred to as a non-emission period NEP (e.g., an emission inhibit period).

The non-emission period NEP described with reference to FIG. 20 may be for preventing the pixel PXij from emitting light having an undesired luminance during the initialization period and the data write period.

While data written in the pixel PXij is maintained (e.g., during one frame period), one or more non-emission periods NEP may be added. Because the emission period EP is reduced, low gray scales may be effectively expressed, or motion in an image may be smoothly blur-processed.

FIGS. 21 through 27 are diagrams illustrating a configuration of a display device in accordance with one or more embodiments. Reference numerals used in FIGS. 21 to 27 may be independent from the reference numerals used in FIGS. 1 to 20.

Figure 21:
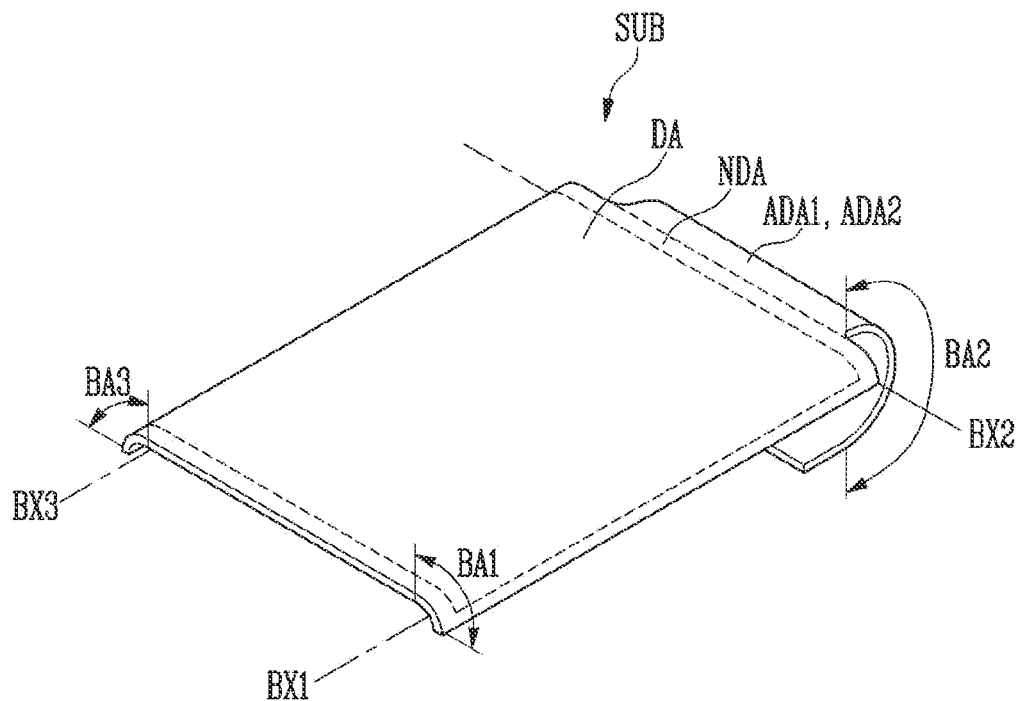
FIGS. 21-27 are diagrams illustrating a configuration of a display device in accordance with one or more embodiments.
Figure 22:
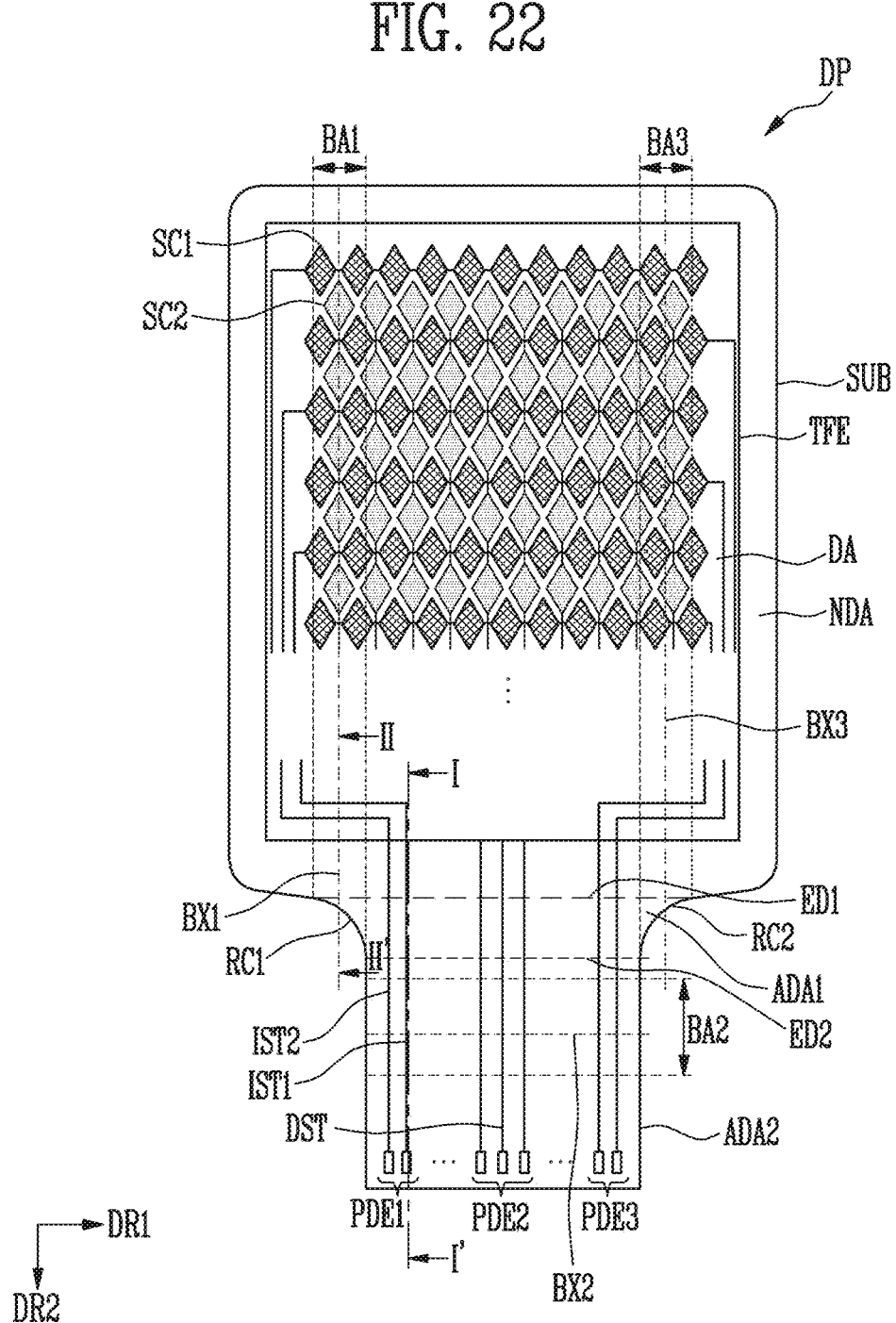

FIG. 21 is a diagram illustrating a substrate in accordance with an embodiment of the present disclosure. FIG. 22 is a diagram illustrating the display device in accordance with an embodiment of the present disclosure.

In the following embodiments, a position in a plan view may be defined in a first direction DR1 and a second direction DR2, and the height may be defined in a third direction DR3 (e.g., refer to FIGS. 22 and 23). The first direction DR1, the second direction DR2, and the third direction DR3 may be perpendicular to each other.

The substrate SUB may include a display area DA, a non-display area NDA, a first additional area ADA1, and a second additional area ADA2.

The display area DA may have a rectangular shape. Each corner of the display area DA may have an angled shape or a curved shape. In the case of a circular display, the display area DA may have a circular shape. Furthermore, the display area DA may have a polygonal shape other than a rectangular shape, an elliptical shape, or the like. As such, the shape of the display area DA may be variously modified depending on the product.

Pixels may be disposed in the display area DA. Depending on the type of display device DP, each of the pixels may include a light emitting diode or a liquid crystal layer.

The non-display area NDA may surround (e.g., around or enclose) the periphery of the display area DA. For example, the non-display area NDA may have a rectangular shape. Each corner of the non-display area NDA may have an angled shape or a curved shape. FIG. 22 illustrates the case where each corner of the non-display area NDA has a curved shape. The non-display area NDA may have a circular shape. Because minimizing or reducing the non-display area NDA may be desired for forming a narrow bezel structure, the shape of the non-display area NDA may be similar to that of the display area DA.

The first additional area ADA1 may be disposed between the non-display area NDA and the second additional area ADA2. The first additional area ADA1 may be connected with the non-display area NDA along a first boundary ED1. The first additional area ADA1 may be connected with the second additional area ADA2 along a second boundary ED2. The first boundary ED1 and the second boundary ED2 may each extend in the first direction DR1.

The first additional area ADA1 may be reduced in width from the first boundary ED1 to the second boundary ED2. In other words, the width of the first additional area ADA1 with respect to the first direction DR1 may be reduced in the second direction DR2. Thus, the first additional area ADA1 may include a first side edge RC1 and a second side edge RC2, which are curved. The side edges RC1 and RC2 may be convex toward the inside of the substrate (e.g., the center of the substrate).

FIG. 22 illustrates the first additional area ADA1 including two side edges RC1 and RC2 in the first direction DR1 and the direction opposite thereto. In an embodiment, the first additional area ADA1 may be made to include only the first side edge RC1 by matching the boundary of the first additional area ADA1 in the first direction DR1 to the boundary of the non-display area NDA. In an embodiment, the first additional area ADA1 may be made to include only the second side edge RC2 by matching the boundary of the first additional area ADA1 with respect to the direction opposite to the first direction DR1 to the boundary of the non-display area NDA.

The second additional area ADA2 may have a rectangular shape. Each corner of the second additional area ADA2 may have an angled shape or a curved shape in the second direction DR2. FIG. 22 illustrates the case where each corner of the second additional area ADA2 has an angled shape in the second direction DR2.

An encapsulation layer TFE may be disposed on the pixels. For example, the encapsulation layer TFE may cover the pixels in the display area DA, and a boundary of the encapsulation layer TFE may be located in the non-display area NDA. The encapsulation layer TFE may cover light emitting elements of the pixels in the display area DA and circuit elements, thus preventing the light emitting elements and circuit elements from being damaged by external water or impacts.

Sensing electrodes SC1 and SC2 (e.g., the sensors TX and RX illustrated in FIG. 1) may be located on the encapsulation layer TFE. The sensing electrodes SC1 and SC2 may sense a touch, hover, gesture, proximity of the body of the user, or the like. The sensing electrodes SC1 and SC2 may be formed in various shapes depending on the manner of sensing, including a resistive type, a capacitive type, an electro-magnetic type (EM), and an optical type. For example, in the case where the sensing electrodes SC1 and SC2 form a capacitive type sensing structure, the sensing electrodes SC1 and SC2 may be driven in a self-capacitance mode, a mutual capacitance mode, or the like.

In the case where the sensing electrodes SC1 and SC2 is driven in the mutual capacitance mode, a touch signal may be transmitted through a sensing line corresponding to the first sensing electrode SC1, and a sensing signal may be received through a sensing line corresponding to the second sensing electrode SC2, which forms mutual capacitance with the first sensing electrode SC1. Mutual capacitance between the first sensing electrode SC1 and the second sensing electrode SC2 may vary when the body of the user is close thereto, so that a touch of the user may be detected by variation in the touch signal resulting from the variation in mutual capacitance. In an embodiment, a touch signal is transmitted through the sensing line corresponding to the second sensing electrode SC2, and a sensing signal may be received through a sensing line corresponding to the first sensing electrode SC1, which forms mutual capacitance with the second sensing electrode SC2.

The pads PED1, PDE2, and PDE3 may be disposed in the second additional area ADA2. The pads PDE1 and PDE3 may be connected to the sensing electrodes SC1 and SC2 disposed over the encapsulation layer by sensing lines IST1 and IST2. The pads PDE1 and PDE3 may be connected to an external touch integrated chip (IC). Furthermore, the pads PDE2 may be connected to the pixels disposed under the encapsulation layer TFE or a driver for the pixels by display lines DST. The driver may include a scan driver, an emission driver, a data driver, and the like. The driver may be disposed under the encapsulation layer TFE, or may be disposed in an external display IC connected to the display device DP through the pads PDE2.

In the case where the display device DP is driven in the mutual capacitance mode, a touch IC may transmit a touch signal through the first sensing line IST1, and may receive a sensing signal through the second sensing line IST2. In an embodiment, a touch signal may be transmitted through the second sensing line IST2, and a sensing signal may be received through the first sensing line IST1. For reference, in the case in which the display device DP is driven in the self-capacitance mode, there may be no difference in a driving method between the first sensing line IST1 and the second sensing line IST2. The display lines DST may include a control line, a data line, a power line, and the like, and may provide signals to allow the pixels to display an image. Such signals may be provided from the driver, which is connected to the display lines DST.

FIG. 21 illustrates a substrate SUB in a bent state. FIG. 22 illustrates a substrate SUB that is not in the bent state. The display device DP may be bent, as illustrated in FIG. 21, after elements are stacked on the substrate SUB while the substrate SUB is not in the bent state, as illustrated in FIG. 22.

The substrate SUB may include a first bending area BA1 that extends from the first side edge RC1 of the first additional area ADA1 to overlap the non-display area NDA. In addition, the first bending area BA1 may extend to overlap the display area DA. In other words, the display area DA, the non-display area NDA, and the first additional area ADA1 may each partially overlap the first bending area BA1. The first bending area BA1 may have a width in the first direction DR1, and the length thereof may extend in the second direction DR2. A first bending axis BX1 may be defined as a folding line extending in the second direction DR2 in the center of the first bending area BA1. In an embodiment, the first bending area BA1 may be a portion that is reduced in stress by removing some insulating layers, unlike other peripheral portions. In an embodiment, the first bending area BA1 may have the same configuration as the other peripheral portions.

The substrate SUB may include a third bending area BA3, which extends from the second side edge RC2 of the first additional area ADA1 to overlap the non-display area NDA. In addition, the third bending area BA3 may extend to overlap the display area DA. In other words, the display area DA, the non-display area NDA, and the first additional area ADA1 may each partially overlap the third bending area BA3. The third bending area BA3 may have a width in the first direction DR1, and the length thereof may extend in the second direction DR2.

A third bending axis BX3 may be defined as a folding line extending in the second direction DR2 in the center of the third bending area BA3. In an embodiment, the third bending area BA3 may be a portion that is reduced in stress by removing some insulating layers, unlike other peripheral portions. In an embodiment, the third bending area BA3 may have the same configuration as the other peripheral portions.

The second additional area ADA2 may include a second bending area BA2. The second bending area BA2 may have a width in the second direction DR1, and the length thereof may extend in the first direction DR1. A second bending axis BX2 may be defined as a folding line extending in the first direction DR1 in the center of the second bending area BA2. In an embodiment, the second bending area BA2 may be a portion that is reduced in stress by removing some insulating layers, unlike other peripheral portions. In an embodiment, the second bending area BA2 may have the same configuration as the other peripheral portions.

The first to third bending areas BA1, BA2, and BA3 may not overlap each other.

Here, the term "fold" means that the display device may be changed from the original shape thereof to other shapes, rather than being fixed in shape, and encompasses meanings including, being "folded" or "curved" along one or more bending axes, or "rolled" in the manner of a scroll. Thanks to the first and third bending areas BA1 and BA3, side bezel widths with respect to the first direction DR1 of the display device DP and the direction opposite to the first direction DR1 may be reduced. Furthermore, thanks to the second bending area BA2, a side bezel width in the second direction DR2 of the display device DP may be reduced.

Figure 23:
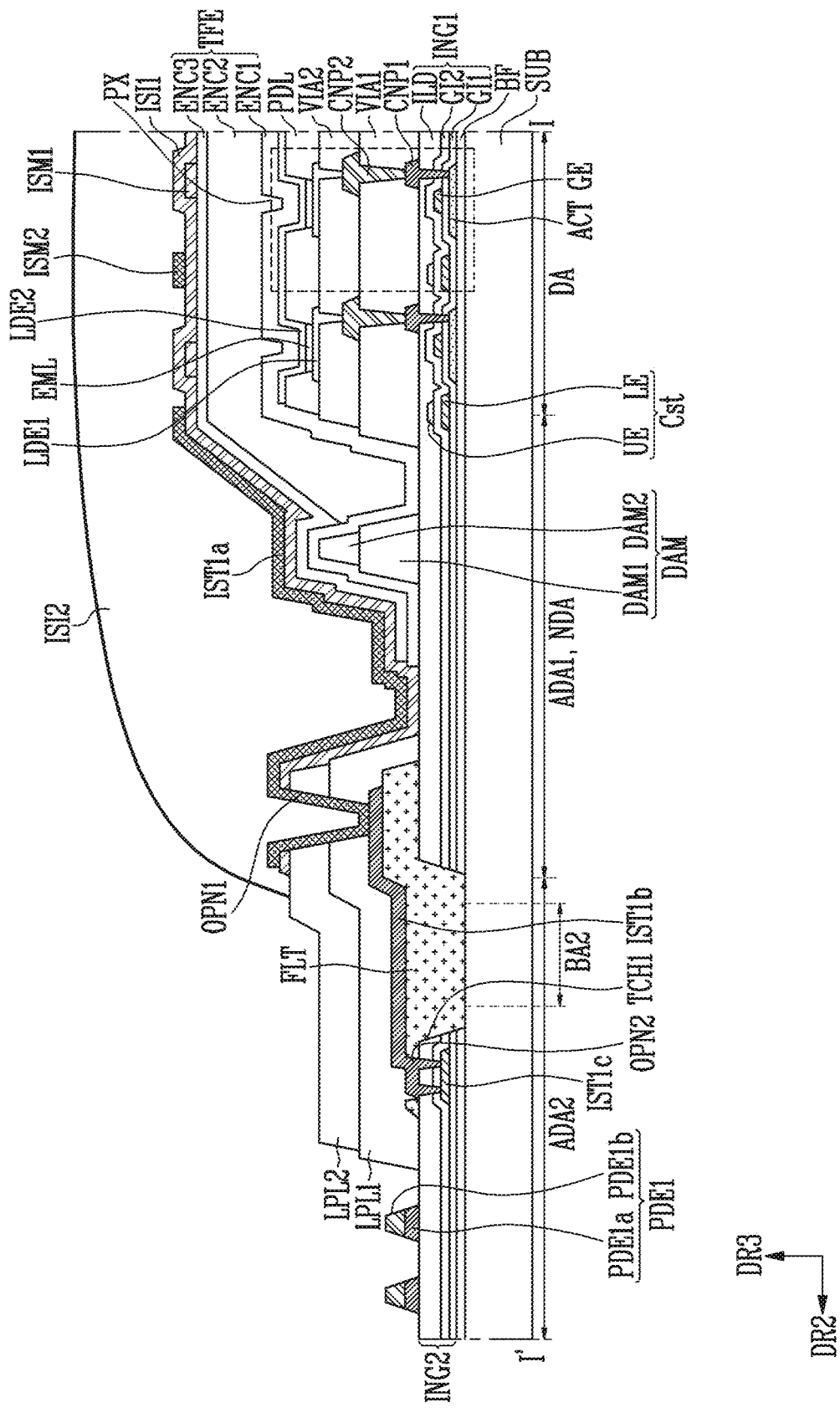

FIG. 23 is a sectional view taken along the line I-I' of FIG. 22 in accordance with an embodiment. As illustrated, the line I-I' of FIG. 22 passes through the first pad PDE1 and the first sensing line IST1.

First, the display area DA will be described. In an embodiment of the present disclosure, a plurality of pixels PXL are provided in the display area DA. Each pixel PX may include a transistor that is connected to a corresponding line among the display lines DST, a light emitting element that is connected to the transistor, and a capacitor Cst. FIG. 23 illustrates one pixel PX for convenience of explanation.

The substrate SUB may be made of an insulating material such as glass or resin. Furthermore, the substrate SUB may be made of material having flexibility so as to be bendable or foldable, and may have a single-layer structure or a multilayered structure.

For example, the substrate SUB may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or cellulose acetate propionate. However, the material that forms the substrate SUB may be changed in various ways, and the substrate SUB may also be made of fiber-reinforced plastic (FRP) or the like.

For example, in the case in which the substrate SUB has a multilayered structure, a single layer or a plurality of layers made of inorganic material such as silicon nitride, silicon oxide, or silicon oxynitride may be interposed between layers among the plurality of layers of the multilayered structure.

A buffer layer BF may cover the substrate SUB. The buffer layer BF may prevent impurities from diffusing into a channel of the transistor. The buffer layer BF may be an inorganic insulating layer formed of an inorganic material. For example, the buffer layer BF may be formed of silicon nitride, silicon oxide, silicon oxynitride, or the like. The buffer layer BF may be omitted depending on the material of the substrate SUB and the processing conditions. In an embodiment, a barrier layer may be further provided.

An active layer ACT may be disposed on the buffer layer BF. The active layer ACT may be patterned to form a channel, a source electrode, and a drain electrode of the transistor, or a line. The active layer ACT is formed of a semiconductor material. The active layer ACT may be a semiconductor pattern formed of polysilicon, amorphous silicon, an oxide semiconductor, or the like. The channel of the transistor may be a semiconductor pattern undoped with impurities and an intrinsic semiconductor. Each of the source electrode, the drain electrode, and the line may be a semiconductor pattern doped with impurities. The impurities may include n-type impurities, p-type impurities, or other metals.

A first gate insulating layer GI1 may cover the active layer ACT. The first gate insulating layer GI may be an inorganic insulating layer formed of inorganic material. Inorganic insulating material such as polysiloxane, silicon nitride, silicon oxide, or silicon oxynitride may be used as the inorganic material.

A gate electrode GE of the transistor and a lower electrode LE of the capacitor Cst may be disposed on the first gate insulating layer GI1. The gate electrode GE may overlap an area that corresponds to the channel. The gate electrode GE and the lower electrode LE may be made of metal. For example, the gate electrode GE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals. The gate electrode GE may have a single-layer structure, but is not limited thereto, and it may have a multilayered structure formed by stacking two or more materials selected from among metals and alloys.

A second gate insulating layer GI2 may cover the gate electrode GE and the lower electrode LE. The second gate insulating layer GI2 may be an inorganic insulating layer formed of inorganic material. Polysiloxane, silicon nitride, silicon oxide, silicon oxynitride, or the like may be used as the inorganic material.

The upper electrode UE of the capacitor Cst may be disposed on the second gate insulating layer GI2. The capacitor upper electrode UE may be formed of metal. For example, the upper electrode UE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals. The upper electrode UE may have a single-layer structure, but is not limited thereto, and may have a multilayered structure formed by stacking two or more materials selected from among metals and alloys.

The lower electrode LE and the upper electrode UE may be provided with the second insulating layer GI2 therebetween, thus forming the capacitor Cst. Although FIG. 23 illustrates that the capacitor Cst has a double-layer electrode structure including the lower electrode LE and the upper electrode UE, in another embodiment, the capacitor Cst may have a triple-layer electrode structure using an active layer ACT, or a triple layer electrode structure or an electrode structure having four or more layers using an electrode provided in the same layer as a first connection pattern CNP1.

The interlayer insulating layer ILD may cover the upper electrode UE. The interlayer insulating layer ILD may be an inorganic insulating layer formed of inorganic material. Polysiloxane, silicon nitride, silicon oxide, silicon oxynitride, or the like may be used as the inorganic material.

In the present embodiment, for the sake of explanation, the first gate insulating layer GI1, the second gate insulating layer GI2, and the interlayer insulating layer ILD may collectively be referred to as a first insulating layer group ING1. The first insulating layer group ING1 may cover a portion of the transistor. In an embodiment, the first insulating layer group ING1 may further include a buffer layer BF.

The first connection pattern CNP1 may be disposed on the interlayer insulating layer ILD. The first connection pattern CNP1 may contact each of the source electrode and the drain electrode of the active layer ACT through contact holes that are formed in the interlayer insulating layer ILD, the second gate insulating layer GI2, and the first gate insulating layer GI1.

The first connection pattern CNP1 may be formed of metal. For example, each of the source electrode SE and the drain electrode DE may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals.

Although not illustrated, in an embodiment, a passivation layer may cover the first connection pattern CNP1. The passivation layer may be an inorganic insulating layer formed of an inorganic material. Polysiloxane, silicon nitride, silicon oxide, silicon oxynitride, or the like may be used as the inorganic material.

A first via layer VIA1 may cover the passivation layer or the transistor. The first via layer VIA1 may be an organic insulating layer formed of an organic material. An organic insulating material such as a polyacryl compound, a polyimide compound, a fluorocarbon compound such as Teflon, or a benzocyclobutene compound may be used as the organic material. The organic layer may be deposited by a method such as evaporation.

A second connection pattern CNP2 may be connected to the first connection pattern CNP1 through an opening in the first via layer VIA1. The second connection pattern CNP2 may be made of at least one of metals such as gold (Au), silver (Ag), aluminum (Al), molybdenum (Mo), chrome (Cr), titanium (Ti), nickel (Ni), neodymium (Nd), and copper (Cu), or an alloy of the metals.

The second via layer VIA2 may cover the first via layer VIA1 and the second connection pattern CNP2. The second via layer VIA2 may be an organic insulating layer formed of an organic material. An organic insulating material such as a polyacryl compound, a polyimide compound, a fluorocarbon compound such as Teflon, or a benzocyclobutene compound may be used as the organic material.

A first light-emitting-element electrode LDE1 may be connected to the second connection pattern CNP2 through an opening in the second via layer VIA2. Here, in an embodiment, the first light-emitting-element electrode LDE1 may be an anode of the light emitting element.

In an embodiment, the configurations of the second via layer VIA2 and the second connection pattern CNP2 may be omitted, and the first light-emitting-element electrode LDE1 may be directly connected to the first contact electrode through the opening in the first via layer VIA1.

The first light-emitting-element electrode LDE1 may be formed of a metal layer made of Ag, Mg, Al, Pt, Pd, Au, Ni, Nd, Ir, Cr, or an alloy thereof, and/or indium tin oxide (ITO), indium zinc oxide (IZO), zinc oxide (ZnO), indium tin zinc oxide (ITZO), or the like. The first light-emitting-element electrode LDE1 may be made of one kind of metal, but is not limited thereto, and may be made of two or more kinds of metals, e.g., an alloy of Ag and Mg.

The first light-emitting-element electrode LDE1 may be formed of a transparent conductive layer so as to realize an image in the downward direction of the substrate SUB, or may be formed of a metal reflective layer and/or a transparent conductive layer so as to realize an image in the upward direction of the substrate SUB.

A pixel-defining layer PDL for defining an emission area of each pixel PXL may be provided on the substrate SUB on which the first light-emitting-element electrode LDE1 or the like is formed. The pixel-defining layer PDL may be an organic insulating layer made of an organic material. An organic insulating material such as a polyacryl compound, a polyimide compound, a fluorocarbon compound such as Teflon, or a benzocyclobutene compound may be used as the organic material.

The pixel-defining layer PDL may expose an upper surface of the first light-emitting-element electrode LDE1 and protrude from the substrate SUB along the perimeter of the pixel PX. An emission layer EML may be provided in an area of the pixel PX enclosed by the pixel-defining layer PDL.

The light emitting layer EML may include low-molecular-weight or high-molecular-weight material. The low-molecular-weight material may include copper phthalocyanine (CuPc), N,N'-Di(naphthalene-1-yl)-N,N'-diphenyl-benzidine (NPB), tris-8-hydroxyquinoline aluminum (Alq3), and the like. Such materials may be formed through a vacuum evaporation method. The high-molecular-weight material may include PEDOT, PPV (poly-phenylenevinylene)-based material, polyfluorene-based material, and the like.

The emission layer EML may have a single-layer structure, or a multilayered structure including various functional layers. In the case where the light emitting layer EML has a multilayered structure, the light emitting layer EML may have a structure in which a hole injection layer (HIL), a hole transport layer (HTL), an emission layer (EML), an electron transport layer (ETL), an electron injection layer (EIL), and the like are stacked in a single structure or a complex structure. The light emitting layer EML may be formed through a screen-printing method, an inkjet-printing method, a laser-induced thermal-imaging (LITI) method, or the like.

In an embodiment, at least a portion of the light emitting layer EML may be integrally formed over a plurality of first light emitting element electrodes LDE1, or may be provided in pieces to respectively correspond to a plurality of first light emitting element electrodes LDE1.

A second light-emitting-element electrode LDE2 may be provided on the light emitting layer EML. The second light-emitting-element electrode LDE2 may be provided for each pixel PX. Alternatively, the second light-emitting-element electrode LDE2 may be provided so as to cover most of the display area DA, and may be shared by a plurality of pixels PX.

The second light-emitting-element electrode LDE2 may be used as a cathode or an anode, depending on the embodiment. In the case where the first light-emitting-element electrode LDE1 is an anode, the second light-emitting-element electrode LDE2 may be used as a cathode. In the case where the first light-emitting-element electrode LDE1 is a cathode, the second light-emitting-element electrode LDE2 may be used as an anode.

The second light-emitting-element electrode LDE2 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like. In an embodiment of the present disclosure, the second light-emitting-element electrode LDE2 may be formed of a multilayered structure having two or more layers including a thin metal layer. For example, the second light-emitting-element electrode LDE2 may be formed of a triple layer structure of ITO/Ag/ITO.

The second light-emitting-element electrode LDE2 may be formed of a metal reflective layer and/or a transparent conductive layer so as to realize an image in the downward direction of the substrate SUB, or may be formed of a transparent conductive layer so as to realize an image in the upward direction of the substrate SUB.

An assembly including the first light-emitting-element electrode LDE1, the light emitting layer EML, and the second light-emitting-element electrode LDE2 may be referred to as a light emitting element.

The encapsulation layer TFE may be provided on the second light-emitting-element electrode LDE2. The encapsulation layer TFE may be formed of a single layer or multiple layers. In an embodiment, the encapsulation layer TFE may include first to third encapsulation layers ENC1, ENC2, and ENC3. The first to third encapsulation layers ENC1, ENC2, and ENC3 may be made of organic material and/or inorganic material. Disposed at the outermost position, the third encapsulation layer ENC3 may be made of inorganic material. For example, the first encapsulation layer ENC1 may be formed of an inorganic layer made of inorganic material, the second encapsulation layer ENC2 may be formed of an organic layer made of organic material, and the third encapsulation layer ENC3 may be formed of an inorganic layer made of inorganic material. In the case of inorganic material, resistance to penetration of water or oxygen is superior compared to organic material, but inorganic material is prone to cracking because it has low flexibility. In the embodiment, since the first encapsulation layer ENC1 and the third encapsulation layer ENC3 are made of inorganic material, and the second encapsulation layer ENC2 is made of organic material, cracks may be prevented from spreading. Here, a layer made of organic material, e.g., the second encapsulation layer ENC2, may be fully covered with the third encapsulation layer ENC3 so that an edge of the second encapsulation layer ENC2 may be prevented from being exposed to the outside. In an embodiment, an organic insulating material such as a polyacryl compound, a polyimide compound, a fluorocarbon compound such as Teflon, or a benzocyclobutene compound may be used as the organic material. Polysiloxane, silicon nitride, silicon oxide, silicon oxynitride, or the like may be used as the inorganic material.

The light emitting layer EML that forms a light emitting element may be easily damaged by external water, oxygen, or the like. The encapsulation layer TFE covers and protect the light emitting layer EML. The encapsulation layer TFE may cover the display area DA and extend to the non-display area NDA, which is formed outside the display area DA. However, insulating layers made of organic material are advantageous in terms of flexibility, elasticity, and the like, but are vulnerable to penetration of water or oxygen compared to insulating layers made of inorganic material. In an embodiment of the present disclosure, to prevent water or oxygen from penetrating into the insulating layers made of organic material, the insulating layers made of organic material may be covered with insulating layers made of inorganic material such that edges of the insulating layers made of organic material are not exposed to the outside. For example, the first via layer VIA1, the second via layer VIA2, and the pixel-defining layer PDL, all of which are made of organic material, may be covered with the first encapsulation layer ENC1 rather than continuously extending to the non-display area NDA. Hence, an upper surface of the pixel-defining layer PDL and sidewalls of the first via layer VIA1, the second via layer VIA2, and the pixel-defining layer PDL may be encapsulated by the encapsulation layer TFE including inorganic material, and may thus be prevented from being exposed to the outside.

The layer structure or material of the encapsulation layer TFE is not limited to the foregoing embodiment, and may be changed in various ways. For example, the encapsulation layer TFE may include a plurality of organic material layers and a plurality of inorganic material layers that are alternately stacked.

A first sensing electrode layer ISM1 may be disposed on the encapsulation layer TFE. In an embodiment, an additional buffer layer may be disposed between the first sensing electrode layer ISM1 and the encapsulation layer TFE. The first sensing electrode layer ISM1 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like.

A first sensing insulating layer ISM may be provided on the first sensing electrode layer IMS1. The first sensing insulating layer ISM may be an inorganic insulating layer formed of an inorganic material. An inorganic insulating material such as polysiloxane, silicon nitride, silicon oxide, or silicon oxynitride may be used as the inorganic material.

A second sensing electrode layer ISM2 may be provided on the first sensing insulating layer ISI1. The second sensing electrode layer ISM2 may be formed of a metal layer made of Ag, Mg, Al, Pt, Pd, Au, Ni, Nd, Ir, Cr, or the like, and/or a transparent conductive layer made of indium tin oxide (ITO), indium zinc oxide (IZO), zinc oxide (ZnO), indium tin zinc oxide (ITZO), or the like.

The fact that various input sensing components may be formed using the first sensing electrode layer ISM1, the first sensing insulating layer ISI1, and the second sensing electrode layer ISM2 will be described below.

In an embodiment of FIG. 23, a first pattern IST1$a$ of the first sensing layer IST1 may be formed by patterning the second sensing electrode layer ISM2. A second sensing insulating layer ISI2 may be provided on the second sensing electrode layer ISM2. The second sensing insulating layer ISI2 may be formed of an organic layer. For example, an organic insulating material such as a polyacryl compound, a polyimide compound, a fluorocarbon compound such as Teflon, or a benzocyclobutene compound may be used as the organic material. For example, the second sensing insulating layer ISI2 may be formed of polymethyl methacrylate, polydimethylsiloxane, polyimide, acrylate, polyethylene terephthalate, polyethylene naphthalate, or the like.

Next, the non-display area NDA, the first additional area ADA1, and the second additional area ADA2 will be described. In a sectional view of FIG. 23, distinguishment of the non-display area NDA and the first additional area ADA1 is not significant. Thus, in the following description, the non-display area NDA and the first additional area ADA1 are not distinguished from each other. In the following description of the non-display area NDA and the second additional area ADA2, explanation of the content the same as that described above will be omitted or simplified to avoid redundancy of explanation.

A dam DAM may be disposed along a boundary of the second encapsulation layer ENC2. For example, the dam DAM may be disposed between a planarization layer FLT and the second encapsulation layer ENC2. The dam DAM may have a multilayered structure including, for example, a first dam DAM1 and a second dam DAM2. For example, the first and second dams DAM1 and DAM2 may be made of organic material. The first and second dams DAM1 and DAM2 may each correspond to any one of the first via layer VIA1, the second via layer VIA2, and the pixel-defining layer PDL. For example, in the case where the first dam DAM1 is formed of the same material as the first via layer VIA1 through the same process, the second dam DAM2 may be formed of the same material as the second via layer VIA2 or the pixel-defining layer PDL through the same process. Alternatively, in the case where the first dam DAM1 is formed of the same material as the second via layer VIA2 through the same process, the second dam DAM2 may be formed of the same material as the pixel-defining layer PDL through the same process. In addition, in the case where a spacer is formed on the pixel-defining layer PDL of the display area DA, the dam DAM may be formed of the same material as the spacer.

The dam DAM may prevent the organic material of the second encapsulation layer ENC2, which has high fluidity, from overflowing out of the dam DAM during a fabrication process. The first and third encapsulation layers ENC1 and ENC3 that are made of inorganic material may extend and cover the dam DAM so that adhesive force with the substrate SUB or other layers over the substrate SUB may be enhanced.

The first pad PDE1 may be disposed on the substrate SUB, and may be spaced apart from the planarization layer FLT. The first pad PDE1 may be supported by a second insulating layer group ING2. Insulating layers of the second insulating layer group ING2 may respectively correspond to the insulating layers of the first insulating layer group ING1. The first pad PDE1 may include a first pad electrode PDE1$a$ and a second pad electrode PDE1$b$. The first pad electrode PDE1$a$ may be formed of the same material as the first connection pattern CNP1. The second pad electrode PDE1$b$ may be formed of the same material as the second connection pattern CNP2.

The planarization layer FLT may be disposed on the substrate SUB, and may be spaced apart from an area that covers the encapsulation layer TFE. The planarization layer FLT may be an organic insulating layer made of an organic material. An organic insulating material such as a polyacryl compound, a polyimide compound, a fluorocarbon compound such as Teflon, or a benzocyclobutene compound may be used as the organic material.

In the present embodiment, the planarization layer FLT may be formed before the first connection pattern CNP1 is formed and after the interlayer insulating layer ILD is formed. Therefore, the planarization layer FLT and the first via layer VIA1 may be formed through different processes. In an embodiment, the planarization layer FLT and the first via layer VIA1 may include different organic materials.

One end of the planarization layer FLT may cover the first insulating layer group ING1. Furthermore, a portion of the planarization layer FLT that corresponds to the second bending area BA2 may be disposed in a first trench TCH1 between the first insulating layer group ING1 and the second insulating layer group ING2. Since the inorganic insulating layers are higher in hardness and lower in flexibility than the organic insulating layers, there is a relatively high probability of the inorganic insulating layers cracking. In the case where cracks occur in the inorganic insulating layers, the cracks spread to lines on the inorganic insulating layers, whereby a defect such as line disconnection may be caused.

Therefore, as illustrated in FIG. 23, the first trench TCH1 may be formed by removing the inorganic insulating layers from the second bending area BA2, so that the first insulating layer group ING1 and the second insulating layer group ING2 may be separated from each other. Although in the present embodiment all of the inorganic insulating layers corresponding to the area of the first trench TCH1 are removed, some inorganic insulating layers may remain in other embodiments. In this case, the some inorganic insulating layers that remain may have slits formed therein so that bending stresses may be dispersed.

A second pattern IST1*b* of the first sensing line IST1 may extend on the planarization layer FLT and may be electrically connected with the first pad PDE1. In the present embodiment, the second pattern IST1*b* may be formed of the same material as the first connection pattern CNP1 through the same process.

A first line-protecting layer LPL1 may cover the planarization layer FLT and the second pattern IST1*b*. Furthermore, a second line-protecting layer LPL2 may cover the first line-protecting layer LPL1. In an embodiment, the configuration of the second line-protecting layer LPL2 may be omitted. The first and second line-protecting layers LPL1 and LPL2 may be formed of organic material. The first and second line-protecting layers LPL1 and LPL2 may each correspond to any one of the first via layer VIA1, the second via layer VIA2, and the pixel-defining layer PDL. For example, in the case where the first line-protecting layer LPL1 is formed of the same material as the first via layer VIA1 through the same process, the second line-protecting layer LPL2 may be formed of the same material as the second via layer VIA2 or the pixel-defining layer PDL through the same process. Alternatively, in the case where the first line-protecting layer LPL1 is formed of the same material as the second via layer VIA2 through the same process, the second line-protecting layer LPL2 may be formed of the same material as the pixel-defining layer PDL through the same process.

The first and second line-protecting layers LPL1 and LPL2 and the first sensing insulating layer ISM may include a first opening OPN1 which exposes the second pattern IST1*b*.

The first pattern IST1*a* may be connected with the second pattern IST1*b* through the first opening OPN1. In the present embodiment, the height of the portion of the first pattern IST1*a* that is disposed on the first insulating layer group ING1 and on one end of the planarization layer FLT may be greater than the height of the portion of the second pattern IST1*b* that is disposed on the planarization layer FLT corresponding to the first trench TCH1.

Therefore, the first pattern IST1*a* and the second pattern IST1*b* may be directly connected to each other without a separate bridge line. Since the bridge line is not provided, reliability of connection between the first pattern IST1*a* and the second pattern IST1*b* may be enhanced. In addition, the length of the non-display area NDA may be reduced by the length of the bridge line, whereby the amount of dead space may be reduced and a thin bezel may be easily embodied.

A third pattern IST1*c* of the first sensing line IST1 may connect the first pad PDE1 and the second pattern IST1*b* to each other. The third pattern IST1*c* may be formed of the same material as the gate electrode GE of the transistor through the same process. In an embodiment, the third pattern IST1*c* may be formed of the same material as the upper electrode UE through the same process. In an embodiment, odd-numbered third patterns IST1*c* may be formed of the same material as the gate electrode GE of the transistor through the same process. Even-numbered third patterns IST1*c* may be formed of the same material as the upper electrode UE through the same process. In contrast, the even-numbered third patterns IST1*c* may be formed of the same material as the gate electrode GE of the transistor through the same process. The odd-numbered third patterns IST1*c* may be formed of the same material as the upper electrode UE through the same process. Hence, a problem of a short-circuit between adjacent lines may be more efficiently prevented.

The second insulating layer group ING2 may include a second opening OPN2, through which the third pattern IST1 is exposed. Furthermore, the planarization layer FLT may include an opening corresponding to the second opening OPN2. The second pattern IST1*b* may be connected with the third pattern IST1*c* through the second opening OPN2.

Figure 24:
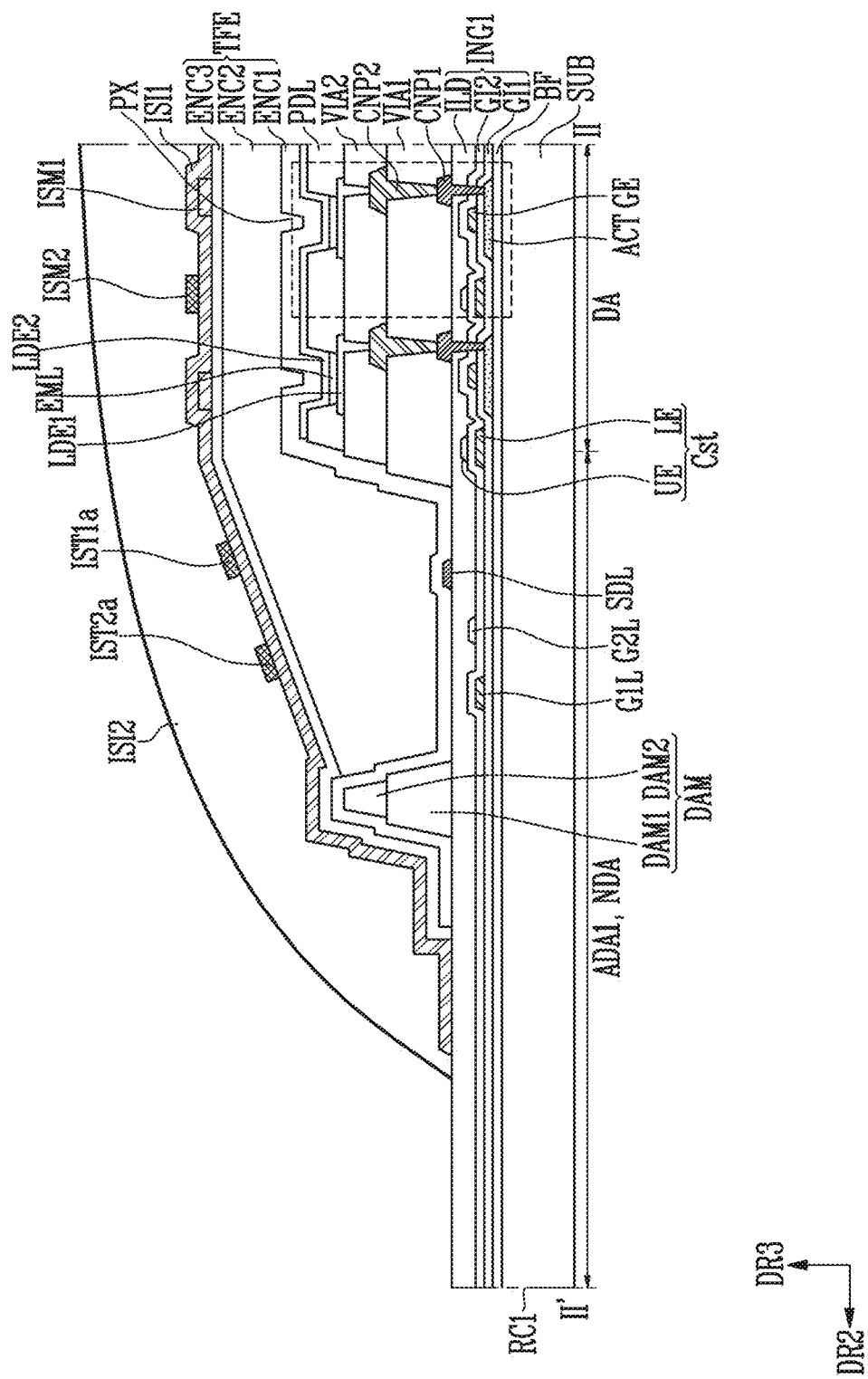

FIG. 24 is a sectional view taken along the line II-II' of FIG. 22 in accordance with an embodiment. Line II-II' of FIG. 22 may correspond to the first bending axis BX1. Here, the same embodiments may be applied not only to the first side edge RC1 but also to the second side edge RC2.

The display lines DST may be formed of a single layer line or multilayered line using at least one of the lines G1L, G2L, and SDL. The line G1L may be formed of the same material as the gate electrode GE through the same process. The line G2L may be formed of the same material as the upper electrode UE through the same process. The line SDL may be formed of the same material as the first connection pattern CNP1 through the same process.

The patterns IST1*a* and IST2*a* of the sensing lines IST1 and IST2 may be disposed on the encapsulation layer TFE and the first sensing insulating layer ISM (based on the third direction DR3), and may be disposed between the dam DAM and the display area DA (based on the second direction DR2). The first sensing insulating layer ISM may be disposed between the encapsulation layer TFE and the sensing lines IST1 and IST2.

Figure 25:
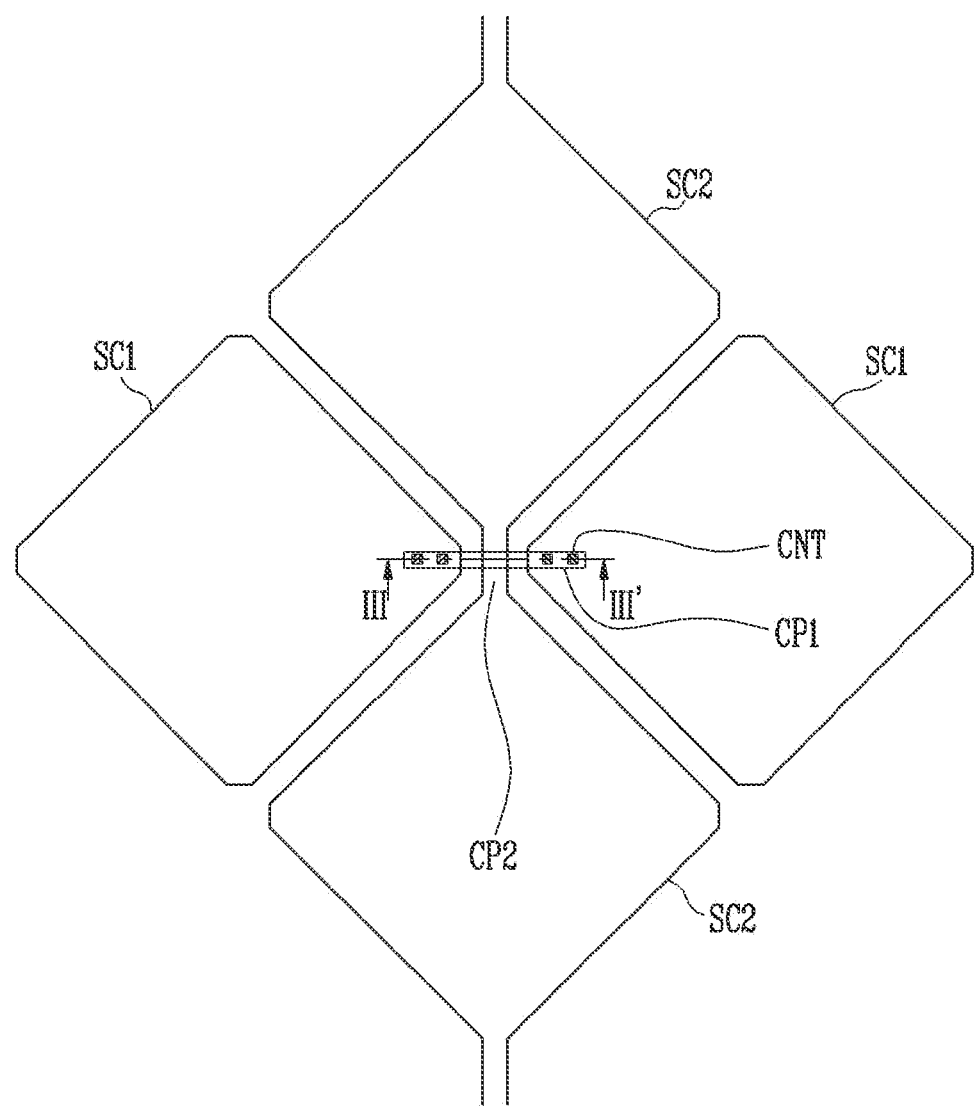
Figure 26:
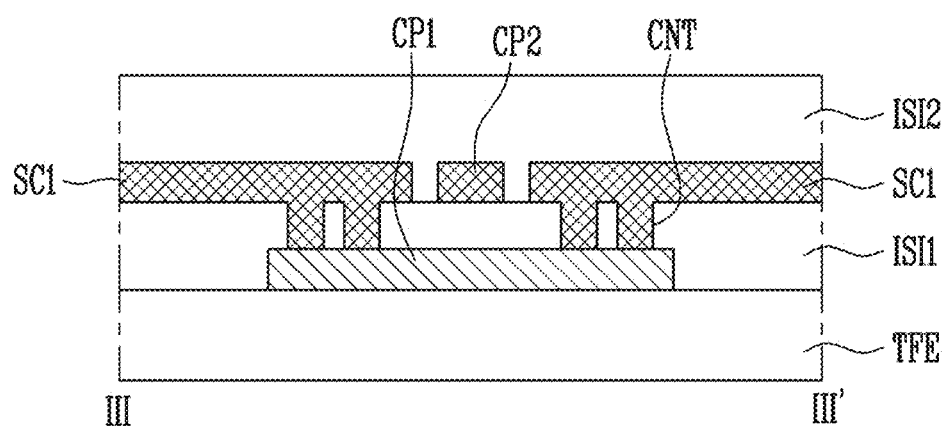

FIGS. 25 and 26 are diagrams illustrating sensing electrodes and bridge electrodes in accordance with an embodiment of the present disclosure. FIG. 26 is a sectional view taken along line III-III' of FIG. 25.

The bridge electrodes CP1 may be disposed on the encapsulation layer TFE by patterning the first sensing electrode layer ISM1.

The first sensing insulating layer ISI1 may cover the bridge electrodes CP1, and may include contact holes CNT that expose portions of the bridge electrodes CP1. The first sensing electrodes SC1 and the second sensing electrodes SC2 may be formed on the first sensing insulating layer ISM by patterning the second sensing electrode layer ISM2. The first sensing electrodes SC1 may be connected to the bridge electrodes CP1 through the contact holes CNT.

The second sensing electrodes SC2 may have a connection pattern CP2 formed on the same layer by patterning the second sensing electrode layer ISM2. Therefore, there may be no need to use a separate bridge electrode to connect the second sensing electrodes SC2 to each other.

In an embodiment, each of the sensing electrodes SC1 and SC2 may cover a plurality of pixels PX. Here, in the case where the sensing electrodes SC1 and SC2 are formed of an opaque conductive layer, each of the sensing electrodes SC1 and SC2 may include a plurality of openings that expose a plurality of pixels PX that are covered by the corresponding sensing electrode SC1 or SC2. For example, each of the sensing electrodes SC1 and SC2 may have a mesh form. In the case in which each of the sensing electrodes SC1 and SC2 is formed of a transparent conductive layer, each sensing electrode SC1, SC2 may be provided in the form of a plate with no opening therein.

Figure 27:
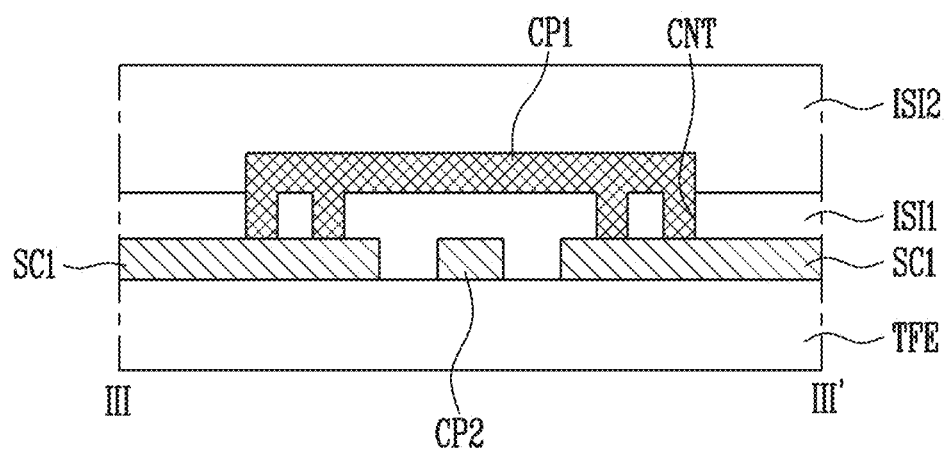

FIG. 27 is a diagram illustrating sensing electrodes and bridge electrodes in accordance with an embodiment of the present disclosure. FIG. 27 is another sectional view taken along line III-III' of FIG. 25.

The first sensing electrodes SC1 and the second sensing electrodes SC2 may be formed by patterning the first sensing electrode layer ISM1, and may be disposed on the encapsulation layer TFE.

The first sensing insulating layer ISM may cover the first sensing electrodes SC1 and the second sensing electrodes SC2, and may include contact holes CNT that expose portions of the first sensing electrodes SC1.

The bridge electrodes CP1 may be formed by patterning the second sensing electrode layer ISM2, and may be disposed on the first sensing insulating layer ISM. The bridge electrodes CP1 may be connected to the first sensing electrodes SC1 through the contact holes CNT.

Figure 28:
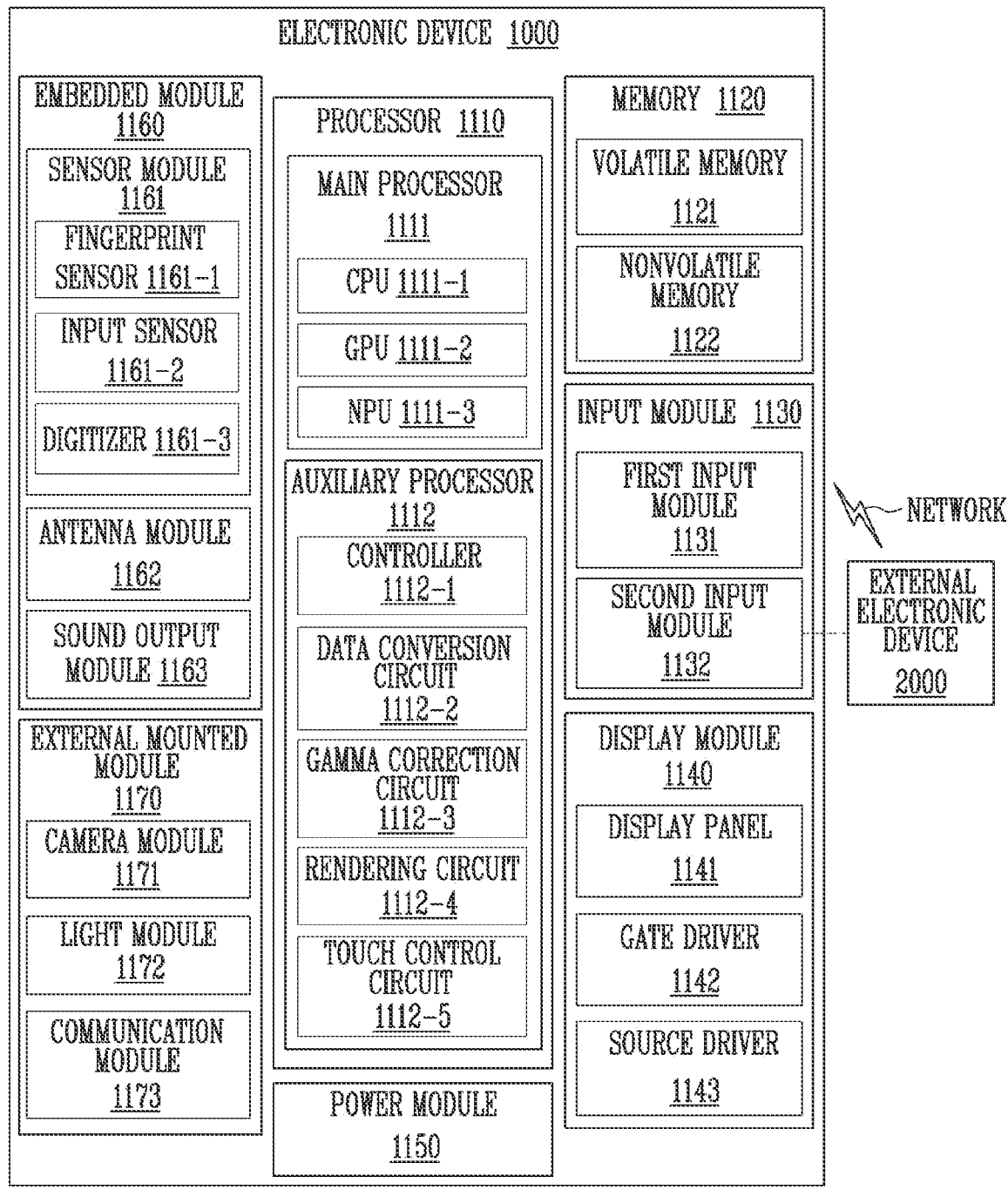
FIG. 28 is a diagram illustrating an electronic device in accordance with an embodiment of the present disclosure.

FIG. 28 is a diagram illustrating an electronic device 1000 in accordance with an embodiment of the present disclosure.

Referring to FIG. 28, the electronic device 1000 in accordance with an embodiment of the present disclosure may output a variety of information through a display module (e.g., a display) 1140. The display module 1140 may correspond to at least a portion of the display device 1 of FIG. 1. When the processor 1110 executes an application stored in a memory 1120, the display module 1140 may provide application information to the user through the display panel 1141. The processor 1110 may be a component corresponding to at least a portion of the application processor 30 illustrated in FIG. 1. The display panel 1141 may be a component corresponding to at least a portion of the display component 110 illustrated in FIG. 1.

The processor 1110 may obtain an external input through an input module (e.g., an input device) 1130 or a sensor module (e.g., a sensor or sensor device) 1161, and execute an application corresponding to the external input. For example, in the case where the user selects a camera icon displayed on the display panel 1141, the processor 1110 may obtain a user input through an input sensor 1161-2, and activate a camera module (e.g., a camera) 1171. The input sensor 1161-2 may be a component corresponding to at least a portion of the sensor component 120 illustrated in FIG. 1. The processor 1110 may transmit image data corresponding to an image captured by the camera module 1171 to the display module 1140. The display module 1140 may display, on the display panel 1141, an image corresponding to the captured image.

As another example, in the case where personal information authentication is executed through the display module 1140, a fingerprint sensor 1161-1 may obtain inputted fingerprint information as input data. The processor 1110 may compare input data obtained through the fingerprint sensor 1161-1 with authentication data stored in the memory 1120, and may execute an application depending on a result of the comparison. The display module 1140 may display, on the display panel 1141, information executed according to the logic of the application.

As a further example, in the case where a music streaming icon displayed on the display module 1140 is selected, the processor 1110 may obtain a user input through the input sensor 1161-2, and activate a music streaming application stored in the memory 1120. When a music playing command is inputted to the music streaming application, the processor 1110 may activate a sound output module (e.g., a sound output device) 1163, and provide sound information corresponding to the music playing command to the user.

Hitherto, the operation of the electronic device 1000 has been schematically described. Hereinafter, the configuration of the electronic device 1000 will be described in more detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In an embodiment, the electronic device 1000 may include a processor 1110, a memory 1120, the input module 1130, the display module 1140, a power module (e.g., a power supply) 1150, an embedded module (e.g., an embedded device) 1160, and an external mounted module (e.g., an external mounted device) 1170. In an embodiment, in the electronic device 1000, at least one of the foregoing components may be omitted, or one or more other components may be added. In an embodiment, some components (e.g., the sensor module 1161, an antenna module (e.g., an antenna) 1162, or the sound output module 1163) from among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In an embodiment, as at least a portion of a data processing or computing operation, the processor 1110 may store, in a volatile memory 1121, a command or data received from another component (e.g., the input module 1130, the sensor module 1161, or a communication module 1173), process the command or data stored in the volatile memory 1121, and store result data in a nonvolatile memory 1122.

The processor 1110 may include a main processor 1111 and an auxiliary processor 1112. Therefore, the auxiliary processor 1112 may include the configuration of the driving circuit 20 shown in FIG. 1.

The main processor 1111 may include one or more of a central processing unit (CPU) 1111-1 and an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU may be a processor specialized to process an artificial intelligence model. The artificial intelligence model may generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may additional or substantially include a software structure, as well as including a hardware structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. The controller 1112-1 may receive an image signal from the main processor 1111, and may convert a data format of the image signal to a format corresponding to specifications of an interface with the display module 1140 and output image data. The controller 1112-1 may output various control signals used to drive the display module 1140.

The auxiliary processor 1112 may further include a data conversion circuit 1112-2, a gamma correction circuit 1112-3, a rendering circuit 1112-4, a touch control circuit 1112-5, and/or the like. The data conversion circuit 1112-2 may receive image data from the controller 1112-1, compensate for the image data so that an image may be displayed at a desired luminance according to characteristics of the electronic device 1000 or settings of the user, or may convert the image data to reduce power consumption or compensate for afterimages.

In an embodiment, the controller 1112-1 and the data conversion circuit 1112-2 may be components corresponding to at least a portion of the timing controller 11 illustrated in FIGS. 9, 14, 17A, 17B, and 17C. The first oscillator 112 illustrated in FIGS. 9, 14, 17A, 17B, and 17C may be provided in the controller 1112-1.

The gamma correction circuit 1112-3 may convert image data, a gamma reference voltage, or the like, so that an image to be displayed on the electronic device 1000 may have desired gamma characteristics. The rendering circuit 1112-4 may receive image data from the controller 1112-1, and render the image data by taking into account pixel arrangement or the like on the display panel 1141 applied to the electronic device 1000.

The touch control circuit 1112-5 may supply a touch signal to the input sensor 1161-2, and receive a sensing signal from the input sensor 1161-2 in response to the touch signal. Furthermore, the touch control circuit 1112-5 may control the frequency of a self-clock signal (e.g., the frequency of the second oscillator 236 illustrated in FIGS. 9, 14, 17A, 17B, and 17C) in response to a vertical synchronization signal Vsync and a horizontal synchronization signal Hsync that are supplied from the controller 1112-1. The touch control circuit 1112-5 may be a component corresponding to at least a portion of the sensor driver 220 illustrated in FIGS. 9, 14, 17A, 17B, and 17C.

In addition, as illustrated in FIGS. 17A, 17B, and 17C, the controller 1112-1 may be supplied with a second clock signal CLK2 from the touch control circuit 1112-5, and control the frequency of the first clock signal CLK1 and/or the frequency of the second clock signal CLK2 in response to the second clock signal CLK2, the vertical synchronization signal Vsync, and the horizontal synchronization signal Hsync.

At least one of the data conversion circuit 1112-2, the gamma correction circuit 1112-3, the rendering circuit 1112-4, or the touch control circuit 1112-5 may be integrated into another component (e.g., the main processor 1111 or the controller 1112-1). At least one of the data conversion circuit 1112-2, the gamma correction circuit 1112-3, or the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the data. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device or the like (e.g., the user or an external electronic device 2000) provided outside the electronic device 1000.

The input module 1130 may include a first input module 1131 to which a command or data is inputted to the user, and a second input module 1132 to which a command or data is inputted from the external electronic device 2000. The first input module 1131 may include a microphone, a mouse, a keyboard, a key (e.g., a button), or a pen (e.g., a passive pen or an active pen). The second input module 1132 may support a designated protocol, which may be connected to the external electronic device 2000 in a wired or wireless manner. In an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, and a source driver 1143. The gate driver 1142 may be a component corresponding to at least a portion of the scan driver 13 illustrated in FIG. 18. The source driver 1143 may be a component corresponding to at least a portion of the data driver 12 illustrated in FIG. 18. The display module 1140 may further include a window, a chassis, and a bracket to protect the display panel 1141.

The display panel 1141 (or a display) may include a liquid crystal display panel, an organic light emitting display panel, or an inorganic light emitting display panel. The type of display panel 1141 is not limited to a particular type. The display panel 1141 may be a rigid type panel, or a flexible type panel, which is rollable or foldable. The display module 1140 may further include a support, a bracket, or a heat dissipater, which supports the display panel 1141.

The gate driver 1142 may be mounted on the display panel 1141 as a driving chip. The gate driver 1142 may be integrated on the display panel 1141. For example, the gate driver 1142 may include an amorphous silicon TFT gate driver circuit, a low temperature polycrystalline silicon (LTPS), a TFT gate driver circuit, or an oxide semiconductor TFT gate driver circuit (OSG), which is internalized in the display panel 1141. The gate driver 1142 may receive a control signal from the controller 1112-1, and output scan signals to the display panel 1141 in response to the control signal.

The display module 1140 may further include an emission driver. The emission driver may be a component corresponding to at least a portion of the emission driver 15 illustrated in FIG. 18. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141.

The source driver 1143 may be integrated into another component (e.g., the controller 1112-1). The functions of the interface conversion circuit and the timing control circuit of the controller 1112-1 may be integrated into the source driver 1143.

The display module 1140 may further include a voltage generation circuit. The voltage generation circuit may output various voltages used to drive the display panel 1141. In an embodiment, the display panel 1141 may include a plurality of pixel columns, each including a plurality of pixels.

In an embodiment, the source driver 1143 may convert data (e.g. output data Dout) that is included in image data received from the processor 1110, and corresponds to red (R), green (G), and blue (B), to a red data signal (or a data voltage), a green data signal, and a blue data signal, and provide the data signals to a plurality of pixel columns included in the display panel 1141 during one horizontal period.

The power module 1150 may supply power to the components of the electronic device 1000. The power module 1150 may include a battery to store power voltage. The battery may include a primary cell, which may not be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators.

The electronic device 1000 may further include the embedded module 1160 and the external mounted module 1170. The embedded module 1160 may include a sensor module 1161, an antenna module 1162, and/or a sound output module 1163. The external mounted module 1170 may include a camera module 1171, a light module 1172, and a communication module 1173.

The sensor module 1161 may sense an input from the body of the user, or an input from a pen of the first input module 1131, and may generate an electric signal or a data value corresponding to the input. The sensor module 1161 may include at least one or more of a fingerprint sensor 1161-1, an input sensor 1161-2, and a digitizer 1161-3.

The fingerprint sensor 1161-1 may generate a data value corresponding to the fingerprint of the user. The fingerprint sensor 1161-1 may include any one of an optical fingerprint sensor and a capacitive fingerprint sensor.

The input sensor 1161-2 may generate a data value corresponding to coordinate information of an input from the body of the user or an input from a pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information, such as a blood pressure, body fluid, or body fat. For example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140. The input sensor 1161-2 may be a component corresponding to at least a portion of the sensor component 120 illustrated in FIG. 1, and may include sensors SC (e.g., first sensors TX and second sensors RX).

The digitizer 1161-3 may generate a data value corresponding to coordinate information of an input from a pen. The digitizer 1161-3 may generate a data value corresponding to the amount of change in magnetic flux by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. The fingerprint sensor 1161-1, the input sensor 1161-2, and the digitizer 1161-3 may be disposed over the display panel 1141. Any one of the fingerprint sensor 1161-1, the input sensor 1161-2, and the digitizer 1161-3, for example, the digitizer 1161-3, may be disposed under the display panel 1141.

At least two or more of the fingerprint sensor 1161-1, the input sensor 1161-2, or the digitizer 1161-3 may be formed to be integrated into a single sensing panel through the same process. In the case where at least two or more of the fingerprint sensor 1161-1, the input sensor 1161-2, and the digitizer 1161-3 are integrated into a single sensing panel, the sensing panel may be disposed between the display panel 1141 and a window disposed over the display panel 1141. In an embodiment, the sensing panel may be disposed on the window, and the position of the sensing panel is not particularly limited.

At least one of the fingerprint sensor 1161-1, the input sensor 1161-2, or the digitizer 1161-3 may be embedded in the display panel 1141. In other words, during a process of forming components (e.g., a light emitting element, a transistor, and the like) included in the display panel 1141, at least one of the fingerprint sensor 1161-1, the input sensor 1161-2, and the digitizer 1161-3 may be formed concurrently (e.g., simultaneously or substantially simultaneously) with the components.

In addition, the sensor module 1161 may generate an electrical signal or a data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used for phone reception. In an embodiment, the receiver may be integrally or separately formed with the speaker. A sound output pattern of the sound output module 1163 may be integrated into the display module 1140.

The camera module 1171 may capture a static image or a video. In an embodiment, the camera module 1171 may include one or more lenses, an image sensor, or an image signal processor. The camera module 1171 may further include an infrared camera capable of sensing the presence of the user, the position of the user, a line of sight of the user, and/or the like.

The light module 1172 may provide light. The light module 1172 may include a light emitting diode or a xenon lamp. The light module 1172 may be operated interlocking with the camera module 1171 or operated independently therefrom.

The communication module 1173 may form a wire or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wire communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The foregoing various types of communication modules 1173 may be implemented as a single chip or may be implemented as respective separate chips.

The input module 1130, the sensor module 1161, the camera module 1171, and the like, interlocking with the processor 1110, may be used to control the operation of the display module 1140

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130 for a certain time, the processor 1110 may convert the operation mode of the electronic device 1000 to a low-power mode or a sleep mode so that power consumption of the electronic device 1000 may be reduced.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is corrected by the data conversion circuit 1112-2 or the gamma correction circuit 1112-3.

Some components from among the foregoing components may be connected to each other by a communication scheme, e.g., a bus, general purpose input/output (GPIO), a serial peripheral interface (SPI), a mobile industry processor interface (MIPI), or a ultra path interconnect (UPI) link, which may be used between peripheral devices, and may thus exchange a signal (e.g., a command or data) therebetween. The processor 1110 may communicate with the display module 1140 through an agreed interface. For example, any one of the foregoing communication schemes may be used, and the interface is not limited to the foregoing communication schemes.

The electronic device 1000 in accordance with various embodiments of the present disclosure may be used to form various kinds of devices. The electronic device 1000 may include, for example, at least one of a potable telecommunication device (e.g., a smartphone), a computer, a portable multimedia device, a portable medical device, a camera, wearable device, or a home appliance. The electronic device 1000 in accordance with an embodiment of the present disclosure is not limited to the foregoing devices.

In accordance with a driving circuit, a display device including the driving circuit, and an electronic device including the display device according to embodiments of the present disclosure, even when a frequency of a driving signal and/or a frequency of a touch signal are changed, a harmonic may be prevented from occurring between the frequency of the driving signal and the frequency of the touch signal.

However, the aspects and features of the present disclosure are not limited to those described above.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A driving circuit comprising:
   a display driver configured to generate a horizontal synchronization signal and a vertical synchronization signal according to a first clock signal of a first oscillator:
   a sensor driver configured to generate a touch signal according to a second clock signal of a second oscillator; and
   a determination circuit configured to detect a cycle of at least one of the horizontal synchronization signal or the vertical synchronization signal according to the second clock signal, and output a detection signal when the cycle is out of a range, wherein the determination circuit is a part of the display driver or the sensor driver, and wherein to detect the cycle of the at least one of the horizontal synchronization signal or the vertical synchronization signal according to the second clock signal, the determination circuit is configured to count a number of times that the second clock signal overlaps with at least one of a high level section or a low level section of the horizontal synchronization signal or the vertical synchronization signal, wherein the determination circuit is configured to detect the cycle of the horizontal synchronization signal according to a first count value of the second clock signal included in the high level section of the horizontal synchronization signal, and a second count value of the second clock signal included in the low level section of the horizontal synchronization signal, wherein the determination circuit is configured to output the detection signal when the first count value or the second count value is out of the range.

2. The driving circuit according to claim 1, wherein the determination circuit is configured to detect the cycle of the vertical synchronization signal according to a third count value of the second clock signal included in the high level section of the vertical synchronization signal, and a fourth count value of the second clock signal included in the low level section of the vertical synchronization signal.

3. The driving circuit according to claim 2, wherein the determination circuit is configured to output the detection signal when the third count value or the fourth count value is out of the range.

4. The driving circuit according to claim 1, wherein the determination circuit comprises:
a counter configured to:
count, according to the second clock signal, at least one section from among the high level section of the horizontal synchronization signal, the low level section of the horizontal synchronization signal, the high level section of the vertical synchronization signal, or the low level section of the vertical synchronization signal; and
generate a count value according to the count;
storage configured to store threshold values of the range; and
a controller configured to receive the count value and the threshold values, and output the detection signal when the cycle is out of the range.

5. The driving circuit according to claim 4, further comprising a frequency controller connected to the second oscillator, and configured to change a frequency of the second clock signal in response to the detection signal.

6. The driving circuit according to claim 5, wherein, when the frequency of the second clock signal is changed by the frequency controller, the count value is changed to be included in the range.

7. The driving circuit according to claim 5, wherein the sensor driver comprises a touch controller configured to supply the touch signal to sensors.

8. The driving circuit according to claim 7, wherein the sensor driver comprises the determination circuit and the frequency controller.

9. The driving circuit according to claim 4, further comprising a first frequency controller connected to the first oscillator, and configured to change a frequency of the first clock signal in response to the detection signal.

10. The driving circuit according to claim 9, wherein, when the frequency of the first clock signal is changed by the first frequency controller, the count value is changed to be included in the range.

11. The driving circuit according to claim 9, wherein the display driver comprises:
a data driver configured to supply a data signal to data lines; and
a timing controller configured to control the data driver.

12. The driving circuit according to claim 11, wherein the display driver comprises the determination circuit and the first frequency controller.

13. The driving circuit according to claim 11,
wherein the first frequency controller is configured to supply a control signal to the timing controller in response to the detection signal, and
wherein the timing controller is configured to supply an oscillation change signal to the sensor driver in response to the control signal.

14. The driving circuit according to claim 13, wherein the sensor driver comprises a second frequency controller connected to the second oscillator, and configured to change a frequency of the second clock signal in response to the oscillation change signal, and
wherein, when the frequency of the second clock signal is changed by the second frequency controller, the count value is changed to be included in the range.

15. A display device comprising:
a display component comprising pixels connected to scan lines and data lines;
a sensor component comprising first sensors and second sensors configured to sense an external input;
a display driver configured to divide a first clock signal of a first oscillator, generate a horizontal synchronization signal and a vertical synchronization signal, and supply a data signal to the data lines;
a sensor driver configured to divide a second clock signal of a second oscillator, and generate a touch signal to be supplied to the first sensors and/or the second sensors; and
a determination circuit configured to detect a cycle of at least one of the horizontal synchronization signal or the vertical synchronization signal according the second clock signal, and output a detection signal when the cycle is out of a range,
wherein to detect the cycle of the at least one of the horizontal synchronization signal or the vertical synchronization signal according to the second clock signal, the determination circuit is configured to count a number of times that the second clock signal overlaps with at least one of a high level section or a low level section of the horizontal synchronization signal or the vertical synchronization signal,
wherein the determination circuit comprises:
a counter configured to count a cycle of at least one of the horizontal synchronization signal or the vertical synchronization signal according to the second clock signal, and generate a count value;
storage configured to store threshold values of the range; and
a controller configured to receive the count value and the threshold values, and output the detection signal when the cycle is out of the range.

16. The display device according to claim 15, further comprising a frequency controller connected to the second oscillator, and configured to change a frequency of the second clock signal in response to the detection signal,
wherein, when the frequency of the second clock signal is changed by the frequency controller, the count value is changed to be included in the range.

17. The display device according to claim 16, wherein the sensor driver comprises the determination circuit and the frequency controller.

18. The display device according to claim 15, further comprising a frequency controller connected to the first oscillator, and configured to change a frequency of the first clock signal in response to the detection signal,
wherein, when the frequency of the first clock signal is changed by the frequency controller, the count value is changed to be included in the range.

19. The display device according to claim 18, wherein the display driver comprises:
a data driver configured to supply a data signal to the data lines; and
a timing controller configured to control the data driver.

20. The display device according to claim 19, wherein the display driver comprises the determination circuit and the frequency controller.

21. The display device according to claim 19,
wherein the frequency controller is configured to supply a control signal to the timing controller in response to the detection signal, and
wherein the timing controller is configured to supply an oscillation change signal to the sensor driver in response to the control signal.

22. The display device according to claim 21, wherein the sensor driver comprises a second frequency controller connected to the second oscillator, and configured to change a frequency of the second clock signal in response to the oscillation change signal, and
wherein, when the frequency of the second clock signal is changed by the second frequency controller, the count value is changed to be included in the range.

23. An electronic device comprising:
a processor:
a display panel configured to be controlled by the processor to display an image;
an input sensor configured to sense an external input;
a controller configured to receive data corresponding to the image via an interface, divide a first clock signal of a first oscillator, and generate a horizontal synchronization signal and a vertical synchronization signal; and
a touch control circuit configured to divide a second clock signal of a second oscillator, and supply a touch signal to the input sensor,
wherein at least one of the controller or the touch control circuit comprises a determination circuit configured to detect a cycle of at least one of the horizontal synchronization signal or the vertical synchronization signal according to the second clock signal, and output a detection signal when the cycle is out of a range, and
wherein to detect the cycle of the at least one of the horizontal synchronization signal or the vertical synchronization signal according to the second clock signal, the at least one of the controller or the touch control circuit is configured to count a number of times that the second clock signal overlaps with at least one of a high level section or a low level section of the horizontal synchronization signal or the vertical synchronization signal,
wherein the determination circuit is configured to detect the cycle of the horizontal synchronization signal according to a first count value of the second clock signal included in the high level section of the horizontal synchronization signal, and a second count value of the second clock signal included in the low level section of the horizontal synchronization signal,
wherein the determination circuit is configured to output the detection signal when the first count value or the second count value is out of the range.

* * * * *